US012783004B2

(12) United States Patent
Choung et al.

(10) Patent No.: US 12,783,004 B2
(45) Date of Patent: Nov. 3, 2026

(54) FOLDABLE ELECTRONIC DEVICE INCLUDING FLEXIBLE DISPLAY

(71) Applicant: Samsung Electronics Co., Ltd., Suwon-si (KR)

(72) Inventors: Taedoo Choung, Suwon-si (KR); Soonik Park, Suwon-si (KR); Hunjo Jung, Suwon-si (KR); Heuisoo Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 18/784,113

(22) Filed: Jul. 25, 2024

(65) Prior Publication Data

US 2025/0053193 A1 Feb. 13, 2025

Related U.S. Application Data

(63) Continuation of application No. PCT/KR2024/010230, filed on Jul. 17, 2024.

(30) Foreign Application Priority Data

Aug. 7, 2023 (KR) ........................ 10-2023-0102946
Oct. 10, 2023 (KR) ........................ 10-2023-0134242

(51) Int. Cl.
*G06F 1/16* (2006.01)

(52) U.S. Cl.
CPC .......... *G06F 1/1616* (2013.01); *G06F 1/1641* (2013.01); *G06F 1/1652* (2013.01); *G06F 1/1681* (2013.01)

(58) Field of Classification Search
CPC .... G06F 1/1616; G06F 1/1641; G06F 1/1652; G06F 1/1681; H04M 1/0216
See application file for complete search history.

(56) References Cited

U.S. PATENT DOCUMENTS 9,348,450 B1 5/2016 Kim
10,342,121 B2 * 7/2019 Koo .................... H05K 1/0306

(Continued)

FOREIGN PATENT DOCUMENTS

CN 209545628 U 10/2019
EP 4 141 611 A1 3/2023

(Continued)

OTHER PUBLICATIONS

International Search Report and written opinion dated Oct. 27, 2024, issued in International application No. PCT/KR2024/010230.

*Primary Examiner* — Allen L Parker
*Assistant Examiner* — Martin Antonio Asmat Uceda
(74) *Attorney, Agent, or Firm* — Jefferson IP Law, LLP

(57) ABSTRACT

A foldable electronic device is provided. The foldable electronic device includes a foldable housing including a first housing, a second housing, and a hinge device configured to connect the first housing and the second housing, and a flexible display disposed to be supported by the foldable housing and including a folding area, a first bending area positioned at one side of the folding area, and a second bending area positioned at the other side of the folding area, the flexible display being configured such that the folding area, the first bending area, and the second bending area are bent when the foldable electronic device is folded, wherein the flexible display includes a display panel, a support plate disposed below the display panel and including patterns for bending disposed in the folding area, the first bending area, and the second bending area, and a first reinforcement plate and a second reinforcement plate disposed between the foldable housing and the support plate, wherein the first reinforcement plate includes a first part having a first thickness and at least extending from the folding area to the first bending area, a second part having a second thickness greater than the first thickness and extending from the first (Continued)

part, and a first buffer member disposed on the first part, wherein the first part is bent together with the support plate by at least a part of a hinge device while the electronic device changes from an unfolded state to a folded state.

20 Claims, 54 Drawing Sheets

(56) References Cited

U.S. PATENT DOCUMENTS

| | | | | |
|---|---|---|---|---|
| 10,515,570 | B2 | 12/2019 | Ha et al. | |
| 11,246,228 | B2 * | 2/2022 | Kim | G06F 1/1641 |
| 11,334,117 | B2 * | 5/2022 | Youn | H10K 77/111 |
| 11,610,520 | B2 * | 3/2023 | Park | G06F 1/1641 |
| 11,615,722 | B2 * | 3/2023 | Morino | G06F 1/1616 345/173 |
| 11,963,318 | B2 * | 4/2024 | Fu | H05K 5/0217 |
| 11,979,997 | B2 * | 5/2024 | Kwak | G06F 1/1641 |
| 12,087,187 | B2 * | 9/2024 | Afsar | G02B 1/14 |
| 12,189,427 | B2 * | 1/2025 | Han | G06F 1/1652 |
| 12,197,255 | B2 * | 1/2025 | Park | G06F 1/1656 |
| 12,332,700 | B2 * | 6/2025 | Yun | G06F 1/1637 |
| 2017/0060188 | A1 * | 3/2017 | Han | G06F 1/1641 |
| 2018/0217639 | A1 * | 8/2018 | Jones | C03C 21/002 |
| 2018/0335679 | A1 * | 11/2018 | Hashimoto | G02F 1/13338 |
| 2020/0119291 | A1 | 4/2020 | Jeon | |
| 2020/0260603 | A1 | 8/2020 | Choi et al. | |
| 2020/0264674 | A1 | 8/2020 | Km et al. | |
| 2020/0389986 | A1 * | 12/2020 | Tsuchihashi | G06F 1/1626 |
| 2021/0007229 | A1 * | 1/2021 | Gu | G06F 1/1601 |
| 2021/0181808 | A1 | 6/2021 | Liao et al. | |
| 2022/0039274 | A1 | 2/2022 | Shin et al. | |
| 2022/0263930 | A1 | 8/2022 | Koh et al. | |
| 2022/0399511 | A1 | 12/2022 | Bok | |
| 2023/0071578 | A1 | 3/2023 | Sim et al. | |
| 2023/0144615 | A1 | 5/2023 | Kim et al. | |
| 2023/0345652 | A1 | 10/2023 | Sakamoto et al. | |
| 2024/0290228 | A1 * | 8/2024 | Zhu | G06F 1/1641 |
| 2025/0220832 | A1 * | 7/2025 | Mao | G06F 1/1652 |
| 2025/0373718 | A1 * | 12/2025 | Liu | H04M 1/0216 |

FOREIGN PATENT DOCUMENTS

| | | | | | |
|---|---|---|---|---|---|
| EP | 4180914 | A1 | * | 5/2023 | H04M 1/0216 |
| KR | 10-2015-0005276 | A | | 1/2015 | |
| KR | 10-2016-0083608 | A | | 7/2016 | |
| KR | 10-2017-0089192 | A | | 8/2017 | |
| KR | 20180006530 | A | * | 1/2018 | H10K 50/8445 |
| KR | 10-2019-0053691 | A1 | | 5/2019 | |
| KR | 10-2020-0041412 | A | | 4/2020 | |
| KR | 10-2020-0097854 | A | | 8/2020 | |
| KR | 10-2020-0101238 | A | | 8/2020 | |
| KR | 10-2021-0150942 | A | | 12/2021 | |
| KR | 10-2021-0154857 | A | | 12/2021 | |
| KR | 10-2022-0008752 | A | | 1/2022 | |
| KR | 10-2022-0016381 | A | | 2/2022 | |
| KR | 10-2022-0057498 | A | | 5/2022 | |
| KR | 10-2022-0119124 | A | | 8/2022 | |
| KR | 10-2022-0120514 | A | | 8/2022 | |
| KR | 20220158185 | A | * | 11/2022 | H04M 1/0268 |
| KR | 10-2022-0166900 | A | | 12/2022 | |
| KR | 10-2023-0035166 | A | | 3/2023 | |
| KR | 10-2023-0041472 | A | | 3/2023 | |
| KR | 10-2023-0055319 | A | | 4/2023 | |
| WO | 2022/070316 | A1 | | 4/2022 | |

* cited by examiner

130 : 410, 420, 430, 440, 450, 461, 462

130 : 410, 420, 430, 440, 450, 461, 462

130 : 410, 420, 430, 440, 450, 468, 468-1, 469, 469-1

FOLDABLE ELECTRONIC DEVICE INCLUDING FLEXIBLE DISPLAY

CROSS-REFERENCE TO RELATED APPLICATION(S)

This application is a continuation application, claiming priority under § 365(c), of an International application No. PCT/KR2024/010230, filed on Jul. 17, 2024, which is based on and claims the benefit of a Korean patent application number 10-2023-0102946, filed on Aug. 7, 2023, in the Korean Intellectual Property Office, and of a Korean patent application number 10-2023-0134242, filed on Oct. 10, 2023, in the Korean Intellectual Property Office, the disclosure of each of which is incorporated by reference herein in its entirety.

TECHNICAL FIELD

The disclosure relates to a foldable electronic device including a flexible display. More particularly, the disclosure relates to a foldable electronic device including a flexible display capable of providing excellent surface quality even though the foldable electronic device operates frequently.

BACKGROUND ART

An electronic device gradually becomes slimmer, and the design factors of the electronic device are being enhanced and improved so that the electronic device has improved rigidity, and the electronic device has distinct functional elements. The electronic device may have a deformable structure so that a user may conveniently carry the electronic device and use a large screen display. An electronic device (e.g., a foldable electronic device) may include at least two foldable housings configured to operate while being folded or unfolded with respect to each other, and a flexible display disposed to be foldably supported by at least two housings. For example, the electronic device may be required to have a stacked structure and/or a support structure of the flexible display that may induce a smooth bending operation of the flexible display in accordance with a folding operation.

The above information is presented as background information only to assist with an understanding of the disclosure. No determination has been made, and no assertion is made, as to whether any of the above might be applicable as prior art with regard to the disclosure.

DISCLOSURE

Technical Problem

A foldable electronic device includes a hinge device, and first and second housings connected in a direction in which the first and second housings are opposite to each other by means of the hinge device. The foldable electronic device operates in an in-folding and/or out-folding manner as the first housing rotates within a range of 0 to 360 degrees relative to the second housing by means of the hinge device (e.g., a hinge module, a hinge structure, or a hinge assembly). The foldable electronic device includes a flexible display disposed to be at least partially supported by the first and second housings in an unfolded state. The flexible display is provided with a supporting force and bending properties by means of a support plate and a plurality of layers (e.g., polymer layers (e.g., buffer layers (cushions)) stacked in an internal space of the electronic device or stacked below a display panel of the flexible display.

The foldable electronic device includes a first hinge plate (e.g., a first wing plate) configured to operate in conjunction with the first housing, and a second hinge plate (e.g., a second wing plate) configured to operate in conjunction with the second housing. For example, the pair of hinge plates defines substantially the same plane as the first and second housings in the unfolded state and support the flexible display in the folded state so that a bending shape (e.g., a water droplet shape) of the flexible display is constantly maintained. Therefore, the flexible display includes a folding area positioned in an area corresponding to the hinge device, a first bending area positioned in an area corresponding to a coupling portion between the first housing and the first hinge plate, and a second bending area positioned in an area corresponding to a coupling portion between the second housing and the second hinge plate. The first and second bending areas are reverse bending sections configured to be bent in the folded state in a direction opposite to a folding area in a standardized bending shape is maintained so that the flexible display is deformed or a folding mark is reduced.

The flexible display includes a first reinforcement plate (e.g., a metal plate) disposed below the support plate and disposed in an area corresponding to at least a part of the first housing, and a second reinforcement plate (e.g., a metal plate) disposed in an area corresponding to at least a part of the second housing. The reinforcement plates assists in reinforcing rigidity for supporting the flexible display.

In the electronic device, defective surfaces, such as folding marks (creases) or sagging, are caused by frequent folding operations in the first and second bending areas corresponding to portions where the first and second housings and the pair of hinge plates are coupled. For this reason, the convenience of use deteriorates. In addition, in case that the reinforcement plates have sufficient thicknesses for improving the durability or reinforcing the rigidity, the reinforcement plates cannot be bent together with the folding areas, and the efficiency in disposing peripheral structures (e.g., the hinge device) is degraded by a rotation trajectory expanding leftward and rightward in the folded state.

Technical Solution

Aspects of the disclosure are to address at least the above-mentioned problems and/or disadvantages and to provide at least the advantages described below. Accordingly, an aspect of the disclosure is to provide a foldable electronic device including a flexible display capable of providing excellent surface quality even though the foldable electronic device operates frequently.

Another aspect of the disclosure is to provide a foldable electronic device including a structure for improving flexibility of a folding area, a first bending area, and/or a second bending area.

Another aspect of the disclosure is to provide a foldable electronic device including a flexible display capable of assisting in improving durability against an external impact.

Another aspect of the disclosure is to provide a foldable electronic device including a flexible display that assists in improving durability and includes reinforcement plates, which are configured to be bent together in a folded state, thereby assisting in improving efficiency in disposing a peripheral structure.

Another aspect of the disclosure is to provide a foldable electronic device including a flexible display capable of providing a structure that improves flexibility of first and second bending areas, which are reversely bent in a folded state, and assisting in reinforcing rigidity of the electronic device.

Additional aspects will be set forth in part in the description which follows and, in part, will be apparent from the description, or may be learned by practice of the presented embodiments.

According to various embodiments, a foldable electronic device may include a foldable housing including a first housing, a second housing, and a hinge device configured to connect the first and second housings. The foldable electronic device may include a flexible display disposed to be supported by the foldable housing and including a folding area, a first bending area positioned at one side of the folding area, and a second bending area positioned at the other side of the folding area, and the folding area, the first bending area, and the second bending area are bent when the foldable electronic device is folded. The flexible display may include a display panel, a support plate disposed below the display panel and including patterns for bending disposed in the folding area, the first bending area, and the second bending area. The flexible display may include a first reinforcement plate and a second reinforcement plate disposed between the foldable housing and the support plate. The first reinforcement plate may include a first part having a first thickness and at least extending from the folding area to the first bending area, a second part having a second thickness larger than the first thickness and extending from the first part, and a first buffer member disposed on the first part. The first part may be bent together with the support plate by means of at least a part of the hinge device while the electronic device changes from an unfolded state to a folded state.

Advantageous Effects

According to the foldable electronic device, at least the section to the reverse bending area from the position corresponding to the folding area includes the reinforcement plates having the thickness less than the thickness of the peripheral portion, which assists in improving the flexibility of the corresponding area of the flexible display. In addition, the foldable electronic device includes the buffer member made of a non-Newtonian material and disposed on the portions of the reinforcement plates having a relatively small thickness, which assists in improving the flexibility in accordance with the folding operation and improving the durability and surface quality of the flexible display against an external impact.

In addition, various effects that can be directly or indirectly identified through the document is provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

In connection with the description of the drawings, the same or similar reference numerals may be used for the same or similar components.

MODE FOR DISCLOSURE

The following description with reference to the accompanying drawings is provided to assist in a comprehensive understanding of various embodiments of the disclosure as defined by the claims and their equivalents. It includes various specific detail to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1A:
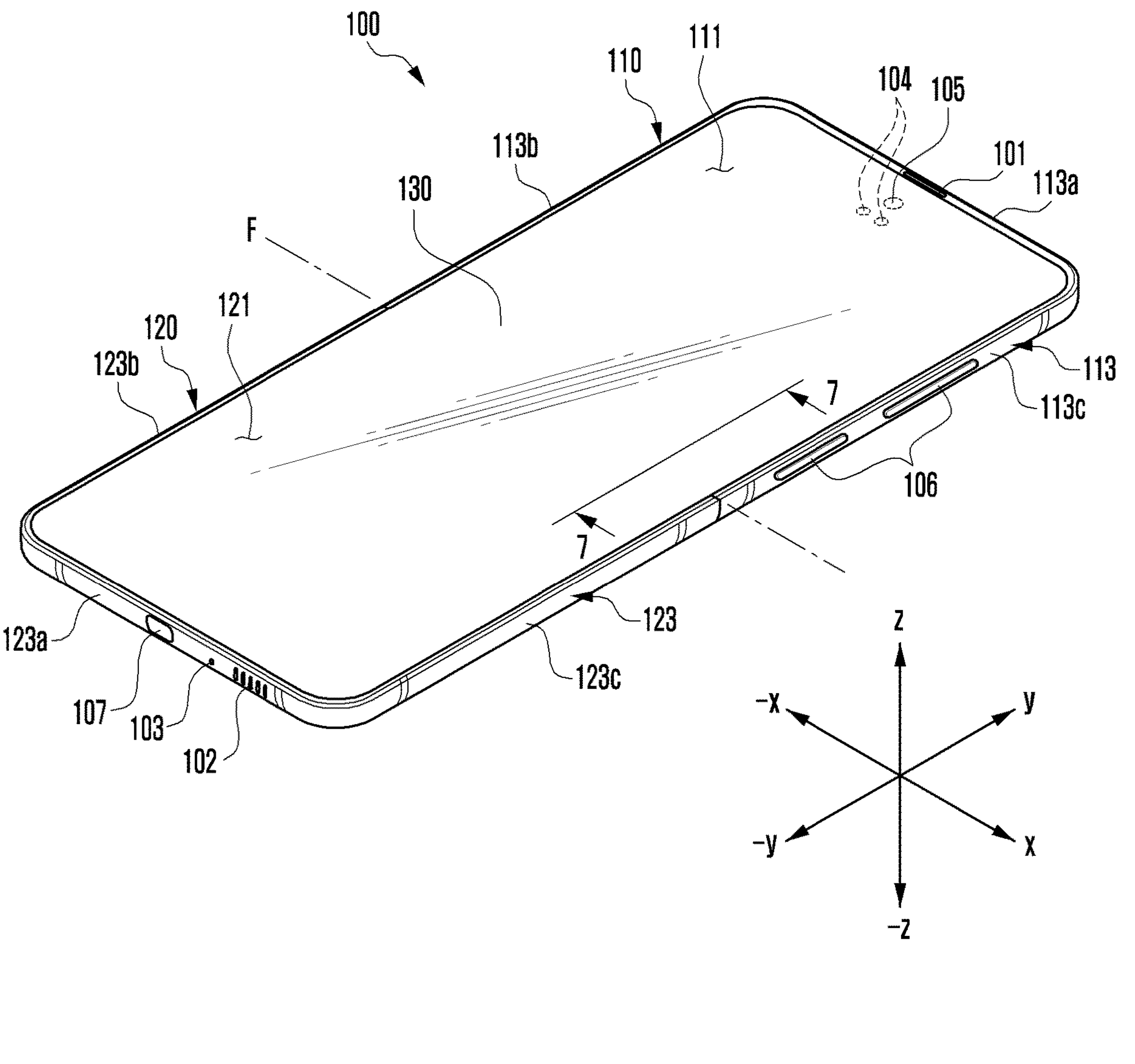
FIG. 1A is a front perspective view of an electronic device in an unfolded state (a folded state or an unfolded state) according to an embodiment of the disclosure.
Figure 1B:
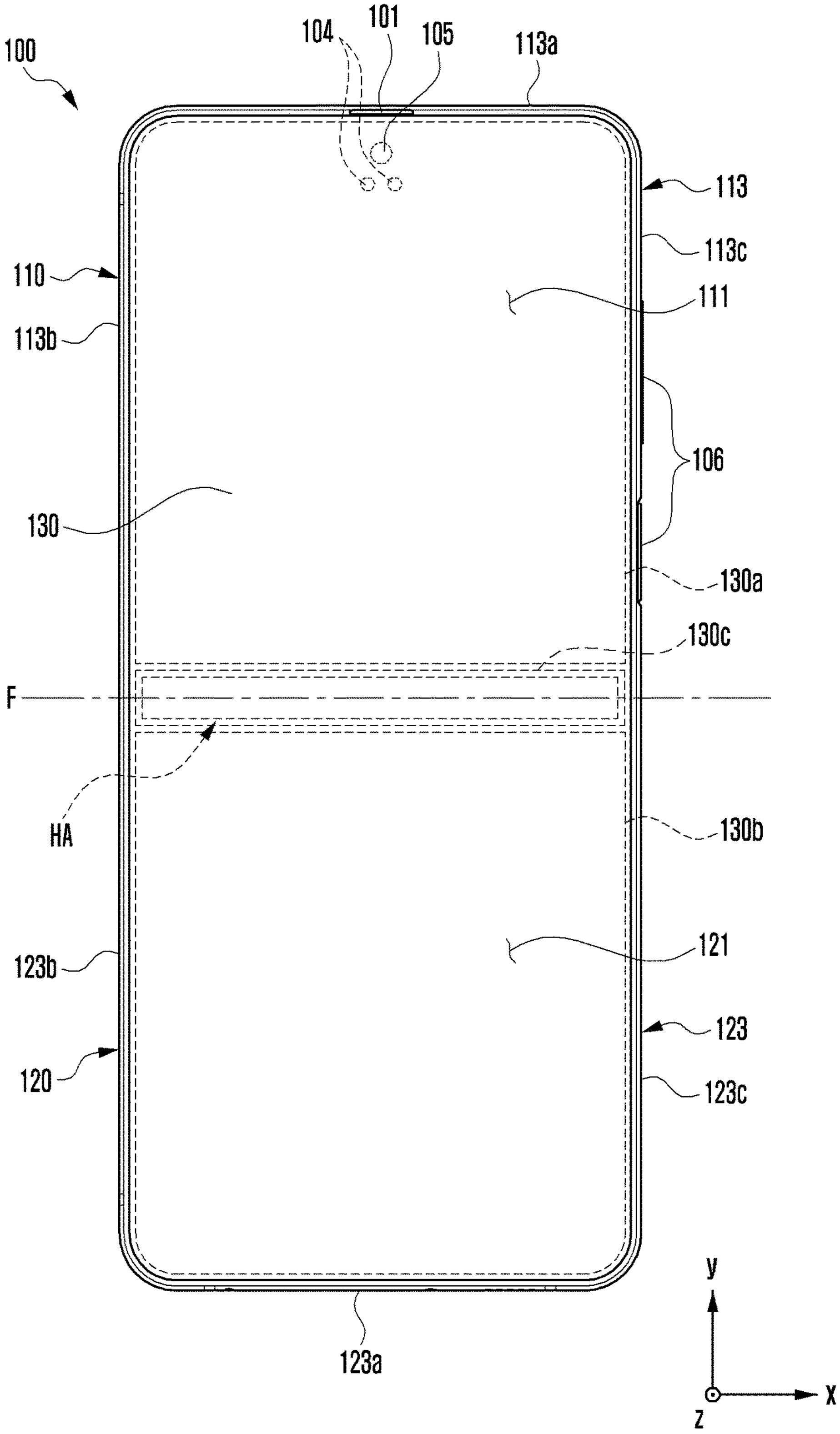
FIG. 1B is a top plan view illustrating a front surface of an electronic device in an unfolded state according to an embodiment of the disclosure.
Figure 1C:
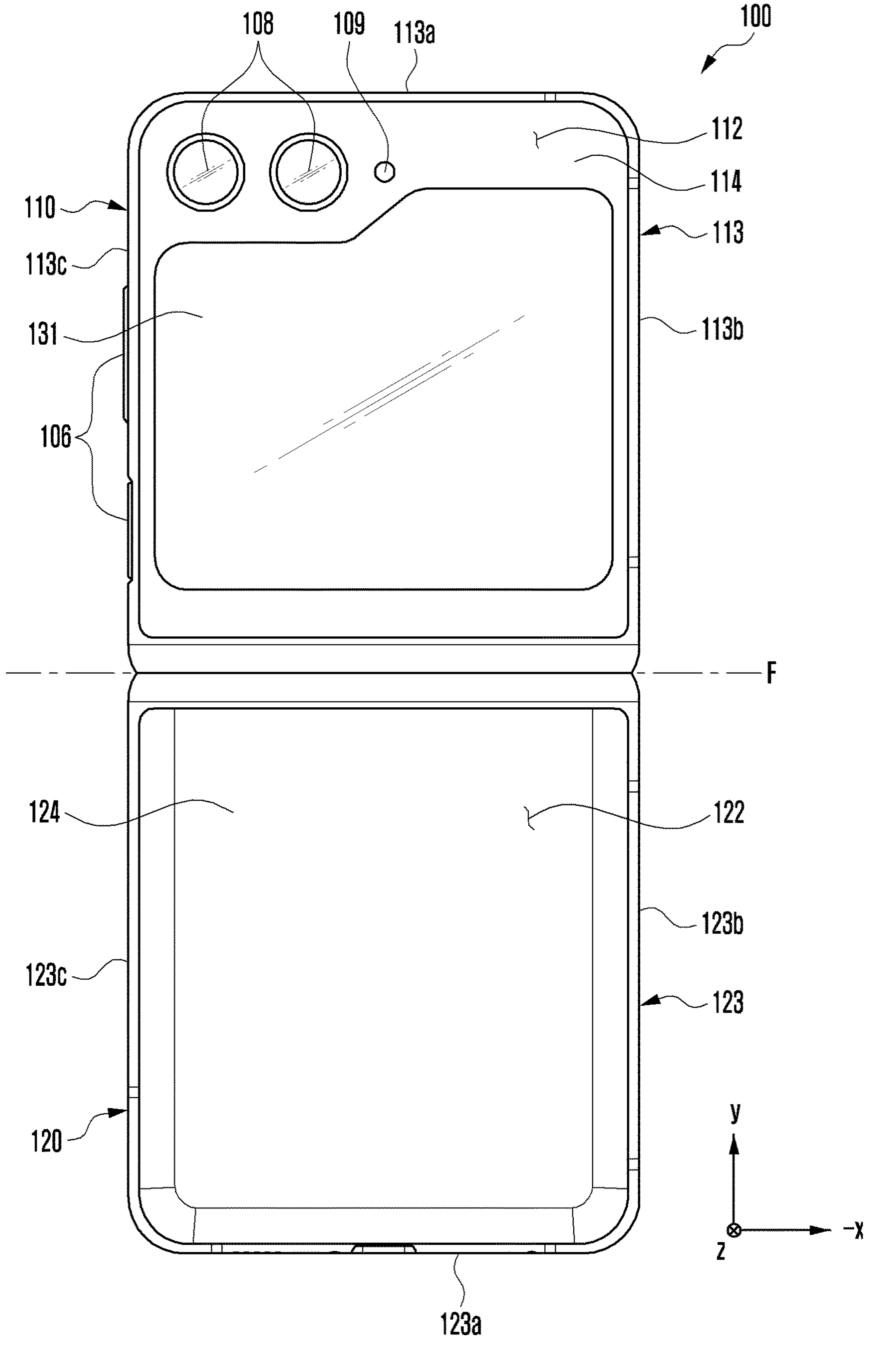
FIG. 1C is a top plan view illustrating a rear surface of an electronic device in an unfolded state according to an embodiment of the disclosure.

FIG. 1A is a perspective view of an electronic device illustrating a flat state or unfolded state of the electronic device according to an embodiment of the disclosure. FIG. 1B is a plan view illustrating a front surface of an electronic device in an unfolded state according to an embodiment of the disclosure. FIG. 1C is a plan view illustrating a rear surface of an electronic device in an unfolded state according to an embodiment of the disclosure.

Figure 2A:
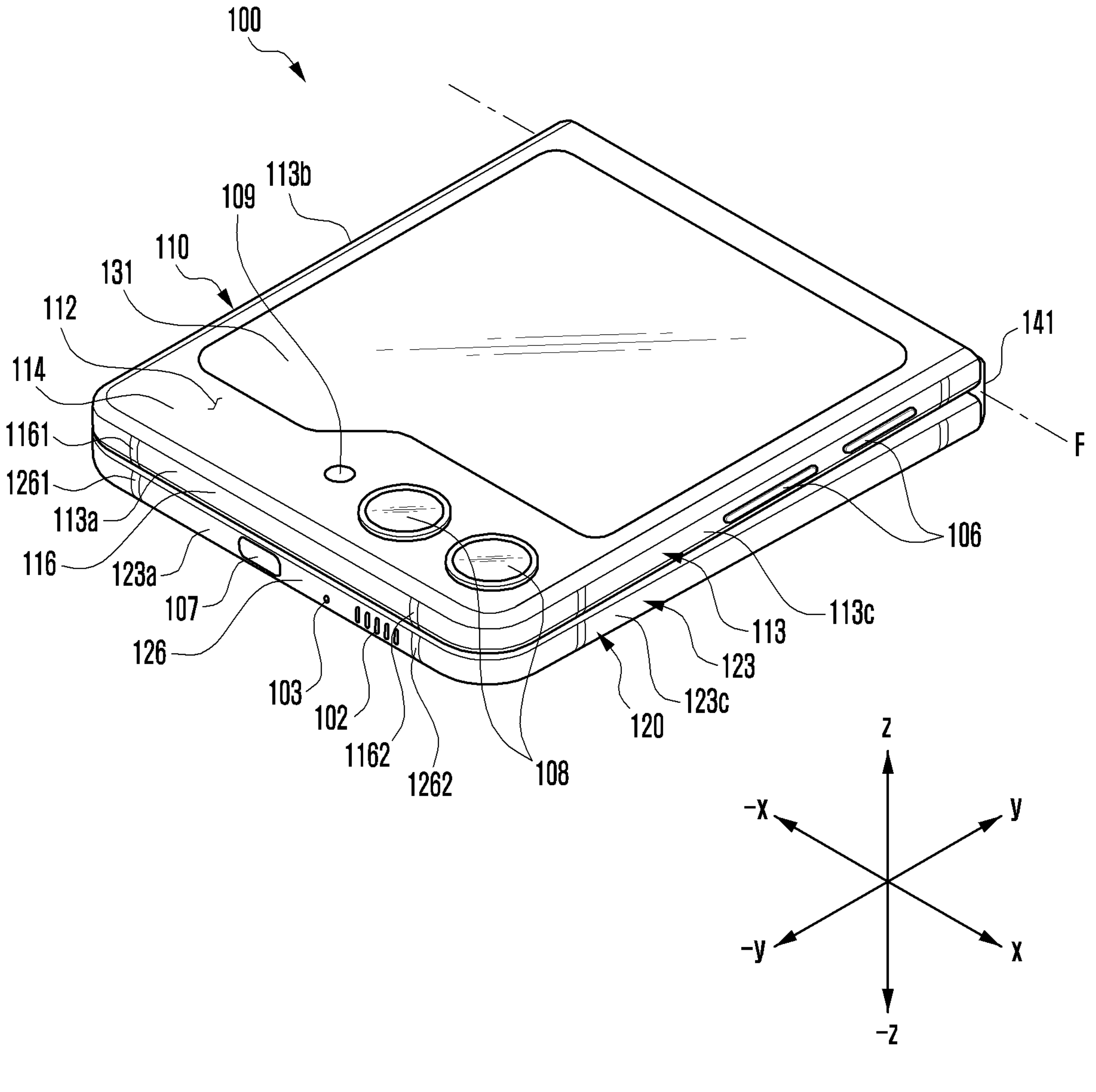
FIG. 2A is a perspective view of an electronic device in a folded state according to an embodiment of the disclosure.
Figure 2B:
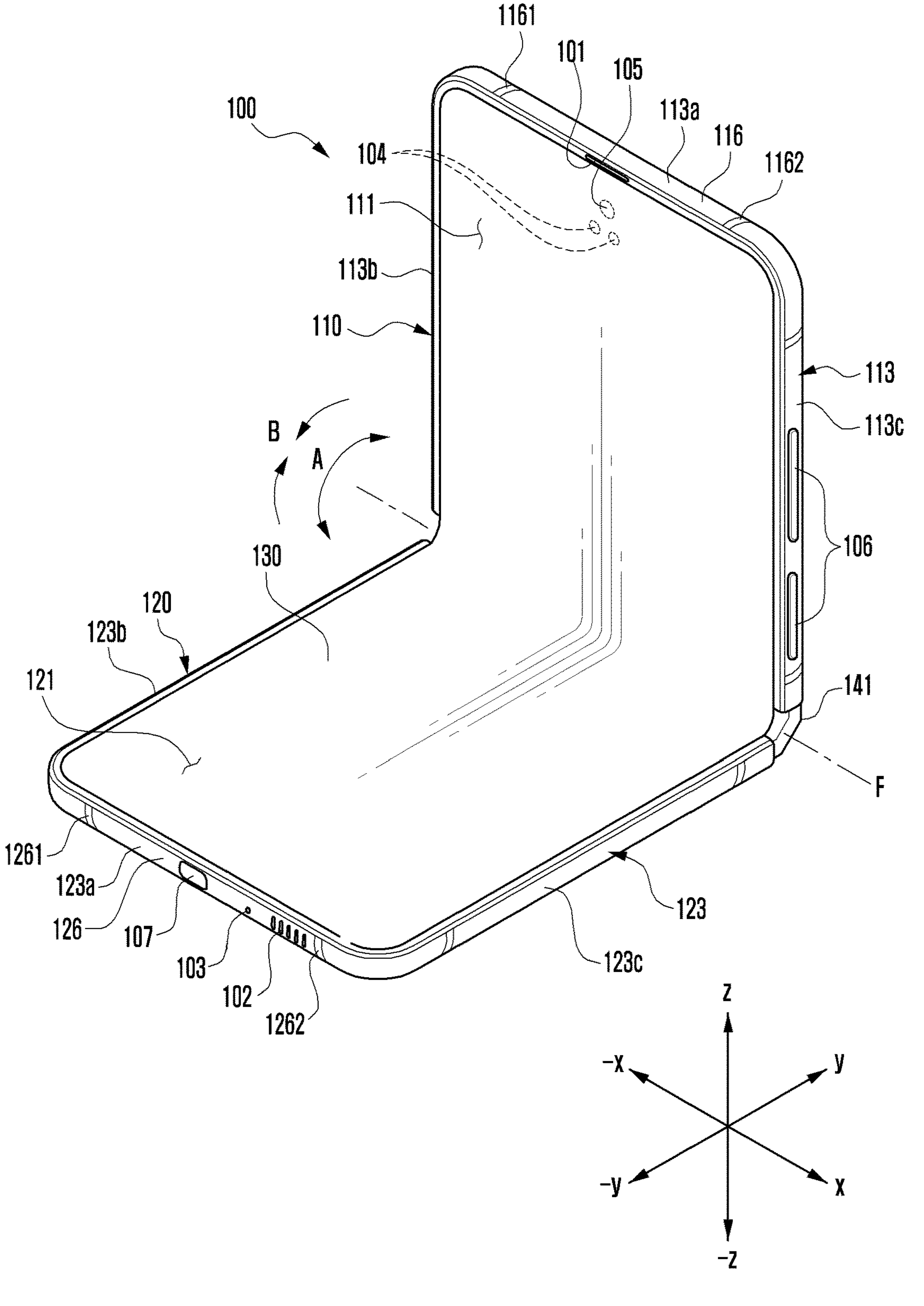
FIG. 2B is a perspective view illustrating an electronic device in an intermediate state according to an embodiment of the disclosure.

FIG. 2A is a perspective view of an electronic device illustrating a folded state of the electronic device according to an embodiment of the disclosure. FIG. 2B is a perspective view of an electronic device illustrating an intermediate state of the electronic device according to an embodiment of the disclosure.

Referring to FIGS. 1A to 1C, 2A, and 2B, an electronic device 100 may include first and second housings 110 and 120 (e.g., a foldable housing structure) that are connected so that they can be folded with respect to each other based on a hinge device (e.g., the hinge device 140 of FIG. 1B). In one embodiment, the hinge device (e.g., the hinge device 140 of FIG. 1B) may be disposed in the direction of the X axis or in the direction of the Y axis. In one embodiment, the electronic device 100 may include a first display 130 (e.g., a flexible display, a foldable display, or a main display) disposed in an area (e.g., recess) formed by the first and second housings 110 and 120. In one embodiment, the first housing 110 and the second housing 120 may be disposed on opposite sides centered on the folding axis F and may have a shape that is substantially symmetrical with respect to the folding axis F. In one embodiment, the angle or distance between the first housing 110 and the second housing 120 may vary depending on the state of the electronic device 100. For example, depending on whether the electronic device is in a flat state or an unfolded state, a folded state, or an intermediate state, the first housing 110 and the second housing 120 may have different angles or distances formed from each other.

In one embodiment, the first housing 110 may include a first surface 111 facing the first direction (e.g., the front direction) (z axis direction) and a second surface 112 facing the second direction (i.e., the rear direction) (−z axis direction) opposite the first surface 111 in the unfolded state of the electronic device 100. In one embodiment, the second housing 120, in the unfolded state of electronic device 100, may include a third surface 121 facing the first direction (in the z-axis direction) and a fourth surface 122 facing the second direction (−z axis direction). In one embodiment, in the unfolded state of the electronic device 100, the first surface 111 of the first housing 110 and the third surface 121 of the second housing 120 may face substantially the same first direction (in the direction of the z axis). In one embodiment, in the folded state of the electronic device 100, the first surface 111 of the first housing 110 and the third surface 121 of the second housing 120 may face each other. In one embodiment, in the unfolded state of the electronic device 100, the second surface 112 of the first housing 110 and the fourth surface 122 of the second housing 120 may face substantially the same second direction (−z axis direction).

In one embodiment, in the folded state of the electronic device 100, the second surface 112 of the first housing and the fourth surface 122 of the second housing 120 may face opposite each other. For example, in the folded state of electronic device 100, the second surface 112 may face the first direction (in the z axis), and the fourth surface 122 may face the second direction (−z axis direction). In this case, the first display 130 may not be visible from the outside (in folding mode). In one embodiment, the electronic device 100 may be folded so that the second surface 112 of the first housing 110 and the fourth surface 122 of the second housing 120 face each other. In this case, the first display 130 may be disposed to be viewed from the outside (out-folding).

According to various embodiments, the first housing 110 (e.g., the first housing structure) may include a first lateral member 113 that at least partially forms an exterior of the electronic device 100, and a first rear surface cover 114 (e.g., a first rear cover) that is coupled to the first lateral member 113 and forms at least portion of the second surface 112 of the electronic device 100. In one embodiment, the first lateral member 113 may include the first side surface 113*a*, the second side surface 113*b* extending from one end of the first side surface 113*a*, and the third side surface 113*c* extending from the other end of the first side surface 113*a*. In one embodiment, the first lateral member 113 may be formed into a quadrilateral (e.g., square or rectangular) shape through the first side surface 113*a*, the second side surface 113*b*, and the third side surface 113*c*.

According to various embodiments, the second housing 120 (e.g., the second housing structure) may include a second lateral member 123 that at least partially forms an exterior of the electronic device 100, and a second rear surface cover 124 (e.g., a second rear cover) that is at least partially coupled to the second lateral member 123, and a second lateral member 123 and forms at least portion of the fourth surface 122 of the electronic device 100. In one embodiment, the second lateral member 123 may include the fourth side surface 123*a*, a fifth side surface 123*b* extending from one end of the fourth side surface 123*a*, and the sixth side surface 123*c* extending from the other end of the fourth side surface 123*a*. In one embodiment, the second lateral member 123 may be formed into a quadrilateral shape through the fourth side surface 123*a*, the fifth side surface 123*b*, and the sixth side surface 123*c*.

According to various embodiments, the first and second housings 110, 120 are not limited to the illustrated shape and combination, and may be implemented by a combination and/or a coupling of other shapes or parts. In one embodiment, the first lateral member 113 may be integrally formed with the first rear surface cover 114, and the second lateral member 123 may be integrally formed with the second rear surface cover 124.

According to various embodiments, in the unfolded state of the electronic device 100, the second side surface 113*b* of the first lateral member 113 and the fifth side surface 123*b* of the second lateral member 123 may be connected without a gap. In one embodiment, in the unfolded state of the electronic device 100, the third side surface 113*c* of the first lateral member 113 and the sixth side surface 123*c* of the second lateral member 123 may be connected without a gap. In one embodiment, when electronic device 100 is unfolded, the sum of the lengths of the second side surface 113*b* and the fifth side surface 123*b* may be constituted to be longer than the length of the first side surface 113*a* and/or the fourth side surface 123*a*. In one embodiment, in the unfolded state of electronic device 100, the sum of the lengths of the third side surface 113*c* and the sixth side surface 123*c* may be constituted to be longer than the length of the first side surface 113*a* and/or the fourth side surface 123*a*.

Referring to FIGS. 2A and 2B, the first lateral member 113 and/or the second lateral member 123 may contain more polymers formed from or injected into metal. In one embodiment, the first lateral member 113 and/or the second lateral member 123 may also include at least one conductive portion 116 and/or 126 electrically segmented through at least one segmentation portion 1161, 1162 and/or 1261, 1262 formed by the polymer. In such a case, at least one conductive portion 116 and/or 126 may be used as at least portion of an antenna operating in at least one band (e.g., legacy band) specified by an electrical connection with a radio communication circuit contained in electronic device 100.

According to various embodiments, the first rear surface cover 114 and/or the second rear surface cover 124 may be formed by a combination of at least one or at least two of the coated or colored glass, ceramics, polymers, or metals (e.g., aluminum, stainless steel (STS), or magnesium).

According to various embodiments, the first display 130 may be disposed to extend from the first surface 111 of the first housing 110 across the hinge device (e.g., the hinge device 140 of FIG. 1B) to at least a portion of the third surface 121 of the second housing 120. In one embodiment, the first display 130 may substantially include a first area 130*a* corresponding to the first surface 111, a second area 130*b* corresponding to the second surface 112, and a third area 130*c* (e.g., a flexible area or folding area) connecting the first area 130*a* and the second area 130*b*. In one embodiment, the third area 130*c* may be disposed in a position corresponding to the hinge device (e.g., the hinge device 140 of FIG. 1B) as part of the first area 130*a* and/or the second area 130*b*. In one embodiment, the electronic device 100 may include a hinge housing 141 (e.g., a hinge cover) supporting a hinge device (e.g., the hinge device 140 of FIG. 1B). In one embodiment, the hinge housing 141 may be exposed to the outside when the electronic device 100 is in the folded state, and may be disposed invisibly from the outside by being inserted into the inner space of the first housing 110 and the inner space of the second housing 120 when the electronic device 100 is in the unfolded state.

According to various embodiments, electronic device 100 may include a second display 131 (e.g., a subdisplay) that is disposed separately from the first display 130. In one embodiment, the second display 131 may be disposed on the second surface 112 of the first housing 110 to be at least partially exposed. In one embodiment, when the electronic device 100 is in a folded state, the second display 131 may display at least portion of the state information of the electronic device 100, replacing at least portion of the display function of the first display 130. In one embodiment, the second display 131 may be disposed so that it can be viewed from the outside through at least portion of the area of the first rear surface cover 114. In one embodiment, the second display 131 may be disposed on the fourth surface 122 of the second housing 120. In such a case, the second display 131 may be disposed so that it can be viewed from the outside through at least portion of the area of the second rear surface cover 124.

According to various embodiments, the electronic device 100 may include at least one of an input device 103 (e.g., microphone), a sound output device 101 and 102, a sensor module 104, a camera device 105 and 108, a keystroke device 106 or a connector port 107. In the illustrated embodiment, the input device 103 (e.g., microphone), the sound output device 101 and 102, the sensor module 104, the camera device 105 and 108, the keystroke device 106 or the connector port 107 are illustrated as holes or circular elements formed in the first housing 110 or second housing 120, but this is illustrative for the purpose of explanation and is not limited thereto. According to various embodiments, input device 103 may include at least one microphone 103 disposed in second housing 120. In one embodiment, input device 103 may include a plurality of microphones 103 that are disposed to detect the direction of sound. In one embodiment, a plurality of microphones 103 may be disposed in appropriate locations in the first housing 110 and/or the second housing 120. In one embodiment, sound output devices 101 and 102 may include at least one speaker 101 and 102. In one embodiment, at least one speaker 101 and 102 may include a call receiver 101 disposed in the first housing 110 and a speaker 102 disposed in the second housing 120. In one embodiment, input device 103, sound output device 101 and 102 and connector port 107 are disposed in a space provided in the first housing 110 and/or second housing 120 of the electronic device 100 and may be exposed to the external environment through at least one hole formed in the first housing 110 and/or second housing 120. In one embodiment, at least one connector port 107 may be used to transmit and receive power and/or data with an external electronic device. In one embodiment, at least one connector port (e.g., an earjack hole) may also accommodate a connector (e.g., an earjack) for transmitting and receiving audio signals with an external electronic device. In one embodiment, holes formed in first housings 110 and/or second housings 120 may be used for input devices 103 and sound output devices 101 and 102. In one embodiment, sound output devices 101 and 102 may also include speakers (e.g., piezo speakers) that are not exposed through holes formed in the first housing 110 and/or second housing 120.

According to various embodiments, the sensor module 104 may generate electrical signals or data values corresponding to the internal operating state of electronic device 100 or external environmental conditions. In one embodiment, the sensor module 104 may detect the external environment through the first surface 111 of the first housing 110. In one embodiment, the electronic device 100 may include at least one additional sensor module that is disposed to detect the external environment through the second surface 112 of the first housing 110. In one embodiment, sensor module 104 (e.g., an illuminance sensor) may be disposed under first display 130 to detect the external environment through first display 130. In one embodiment, the sensor module 104 may include at least one of the following gesture sensors, gyro sensors, barometric pressure sensors, magnetic sensors, acceleration sensors, grip sensors, color sensors, infrared (IR) sensors, biometric sensors, temperature sensors, humidity sensors, ambient light sensors, proximity sensors, biometric sensors, ultrasonic sensors, or ambient light sensors 104.

According to various embodiments, camera devices 105 and 108 may include a first camera device 105 (e.g., a front camera device) disposed on the first surface 111 of the first housing 110 and a second camera device 108 disposed on the second surface 112 of the first housing 110. In one embodiment, electronic device 100 may further include flash 109 disposed near second camera device 108. In one embodiment, camera devices 105 and 108 may include at least one lens, an image sensor, and/or an image signal processor. In one embodiment, camera devices 105 and 108 may be disposed so that two or more lenses (e.g., a wide-angle lens, an ultra-wide-angle lens, or a telephoto lens) and two or more image sensors are located on one surface of the electronic device 100 (e.g., the first surface 111, the second surface 112, the third surface 121), or the fourth surface 122). In one embodiment, the camera devices 105 and 108 may include lenses and/or image sensors for time of flight (TOF).

According to various embodiments, the keystroke device 106 (e.g., a key button) may be disposed on the third side surface 113_c_ of the first lateral member 113 of the first housing 110. In one embodiment, the keystroke device 106 may be disposed on at least one side surface of the other side surfaces 113_a_ and 113_b_ and/or side surfaces 123_a_, 123_b_, and 123_c_ of the second housing 120. In one embodiment, the electronic device 100 may not include some or all of the keystroke devices 106 and the non-contained keystroke device 106 may be implemented in another form, such as a soft key, on the first display 130. In one embodiment, the keystroke device 106 may be implemented using a pressure sensor included in first display 130.

According to various embodiments, some of the camera devices 105 and 108 (e.g., the first camera device 105) or sensor module 104 may be disposed to be exposed through the first display 130. In one embodiment, the first camera device 105 or sensor module 104 may be optically exposed to the outside through an opening (e.g., a through hole) formed at least partially on the first display 130 in the inner space of the electronic device 100. In one embodiment, at least portion of the sensor module 104 may be disposed in the inner space of the electronic device 100 so that it is not visually exposed through the first display 130. With reference to FIG. 2B, the electronic device 100 may be operated through a hinge device (e.g., the hinge device 140 of FIG. 1B) to maintain at least one specified folding angle in the intermediate state. In such a case, electronic device 100 may control the first display 130 so that different contents are displayed in the display area corresponding to the first surface 111 and the display area corresponding to the third surface 121. In one embodiment, the electronic device 100 may operate in a substantially unfolded state (e.g., the unfolded state of FIG. 1A) and/or in a substantially folded state (e.g., the folded state of FIG. 2A) with respect to a certain folding angle (e.g., the angle between the first housing 110 and the second housing 120 when the electronic device 100 is in an intermediate state) through a hinge device (e.g., the hinge device 140 of FIG. 1B). In one embodiment, the electronic device 100 may be operated through a hinge device (e.g., the hinge device 140 of FIG. 1B) to transition to an unfolded state (e.g., the unfolded state of FIG. 1A) when pressurized force is provided in the unfolding direction (A direction) at a certain folding angle. In one embodiment, the electronic device 100 may be operated through a hinge device (e.g., the hinge device 140 of FIG. 1B) in an unfolded state at a certain folding angle, to transition to a folded state (e.g., a folding state of FIG. 2A) if pressing force is provided in the direction to be folded (B direction). In one embodiment, the electronic device 100 may be operated through a hinge device (e.g., the hinge device 140 of FIG. 1B) to maintain an unfolded state (not shown) at various folding angles (free-stop function).

Figure 3:
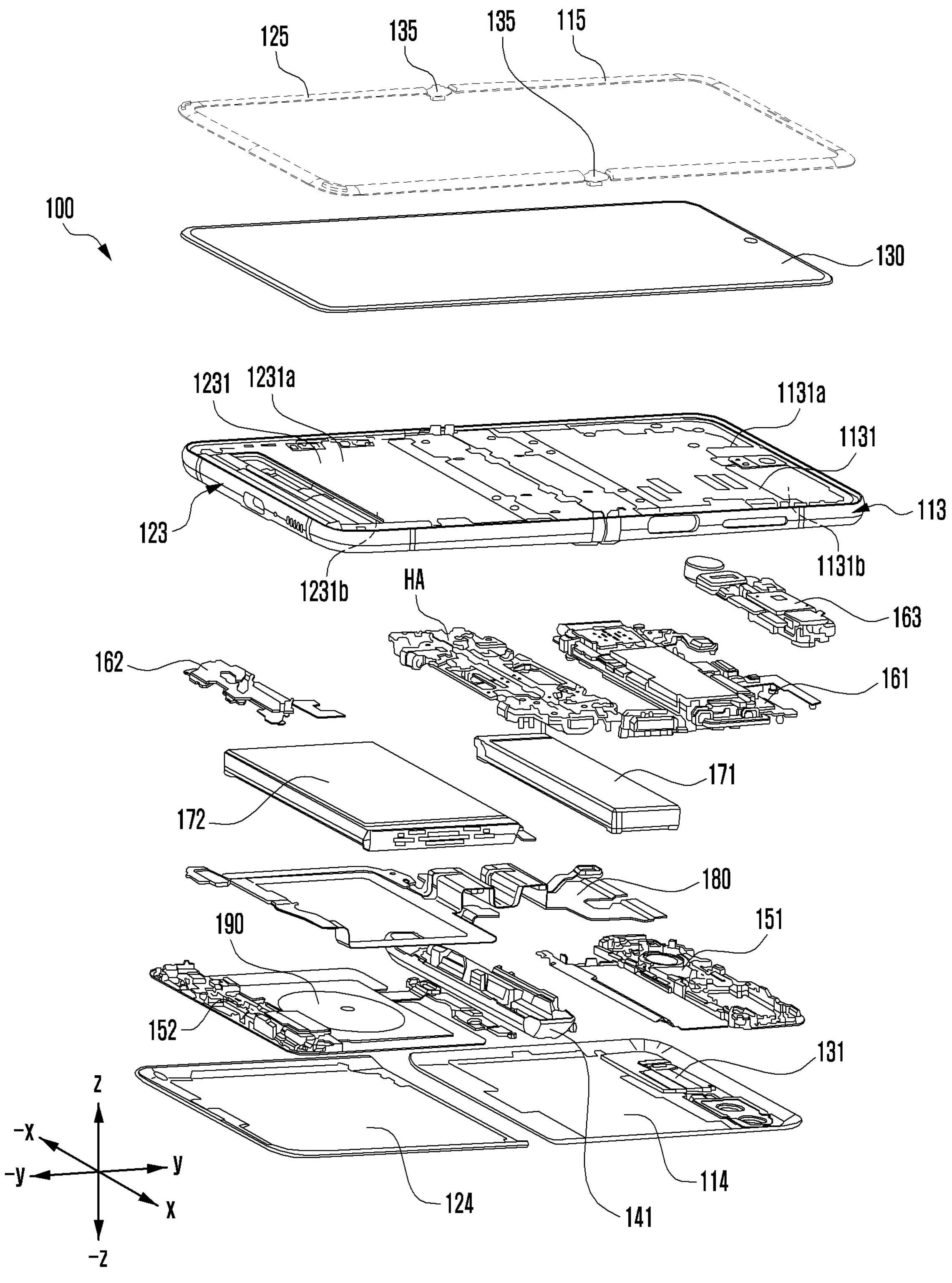
FIG. 3 is an exploded perspective view of an electronic device according to an embodiment of the disclosure.

FIG. 3 is an exploded perspective view of an electronic device according to an embodiment of the disclosure.

Referring to FIG. 3, an electronic device 100 may include a first lateral member 113 (e.g., a first side surface frame), a second lateral member 123 (e.g., a second side surface frame), and a hinge assembly HA (e.g., the hinge assembly HA in FIG. 1B) (e.g., a hinge device, a hinge module, or a hinge structure) configured to connect the first lateral member 113 and the second lateral member 123 so that the first lateral member 113 and the second lateral member 123 are rotatable. In the embodiment, the electronic device 100 may include a first support member 1131 (e.g., a first support plate) at least partially extending from the first lateral member 113, and a second support member 1231 (e.g., a second support plate) at least partially extending from the second lateral member 123. In the embodiment, the first support member 1131 may be integrated with the first lateral member 113 or structurally coupled to the first lateral member 113. In the embodiment, the second support member 1231 may be integrated with the second lateral member 123 or structurally coupled to the second lateral member 123. In the embodiment, a first display 130 may be disposed to be supported by the first support member 1131 and the second support member 1231. In the embodiment, the electronic device 100 may include a first rear surface cover 114 coupled to the first lateral member 113 and configured to provide a first space between the first support member 1131 and the first rear surface cover 114, and a second rear surface cover 124 coupled to the second lateral member 123 and configured to provide a second space between the second support member 1231 and the second rear surface cover 124. In the embodiment, the first lateral member 113 and the first rear surface cover 114 may be integrated. In the embodiment, the second lateral member 123 and the second rear surface cover 124 may be integrated. In the embodiment, a first housing 110 may include the first lateral member 113, the first support member 1131, and the first rear surface cover 114. In the embodiment, a second housing 120 may include the second lateral member 123, the second support member 1231, and the second rear surface cover 124. In the embodiment, the electronic device 100 may include a second display 131 disposed to be visible from the outside through at least a partial area of the first rear surface cover 114.

According to various embodiments, the electronic device 100 may include a first substrate 161 (e.g., a first substrate assembly or a main printed circuit board), a camera assembly 163, a first battery 171, or a first bracket 151 disposed in the first space between the first lateral member 113 and the first rear surface cover 114. In the embodiment, the camera assembly 163 may include a plurality of camera devices (e.g., the camera devices 105 and 108 in FIGS. 1A and 2A) and be electrically connected to the first substrate 161. In the embodiment, the first bracket 151 may provide a support structure for supporting the first substrate 161 and/or the camera assembly 163 and provide improved rigidity. In the embodiment, the electronic device 100 may include a second substrate 162 (e.g., a second substrate assembly or a sub-printed circuit board), an antenna 190 (e.g., a coil member), a second battery 172, or a second bracket 152 disposed in the second space between the second lateral member 123 and the second rear surface cover 124. In the embodiment, the electronic device 100 may include a wiring member 180 (e.g., a flexible substrate (flexible printed circuit board (FPCB)) configured to provide electrical connection and disposed to extend from the first substrate 161 to the plurality of electronic components (e.g., the second substrate 162, the second battery 172, or the antenna 190), which is disposed between the second lateral member 123 and the second rear surface cover 124, while traversing the hinge assembly HA (e.g., the hinge assembly HA in FIG. 5). In the embodiment, the antenna 190 may include a near-field communication (NFC) antenna, a wireless charging antenna, and/or a magnetic secure transmission (MST) antenna.

According to various embodiments, the electronic device 100 may include a first protective cover 115 (e.g., a first protective frame or a first decorative member) coupled along an edge of the first housing 110, and a second protective cover 125 (e.g., a second protective frame or a second decorative member) coupled along an edge of the second housing 120. In the embodiment, the first protective cover 115 and/or the second protective cover 125 may be made of metal or a polymer material. In the embodiment, the first protective cover 115 and/or the second protective cover 125 may be used as decorative members. In this case, the first display 130 may be disposed so that an edge of a first area (e.g., the first area 130*a* in FIG. 1B) is not visible from the outside between the first housing 110 and the first protective cover 115. In the embodiment, the first display 130 may be disposed so that an edge of a second area (e.g., the second area 130*b* in FIG. 1B) is not visible from the outside between the second housing 120 and the second protective cover 125. In any embodiment, the first protective cover 115 and/or the second protective cover 125 may be excluded.

According to various embodiments, the electronic device 100 may also include a protective structure 135 disposed to protect an edge of a third area (e.g., the third area 130*c* in FIG. 1B) of the first display 130. In this case, an edge of the first display 130 may be protected by the protective structure 135 disposed at a position corresponding to a folding area (e.g., the folding area 130*c* in FIG. 1B). In any embodiment, the protective structure 135 may be excluded.

According to various embodiments, the first support member 1131 may include a first support surface 1131*a* directed in a first direction (z-axis direction), and a second support surface 1131*b* directed in a second direction (−z-axis direction) opposite to the first direction. In the embodiment, the second support member 1231 may include a third support surface 1231*a* directed in the first direction (z-axis direction) in the unfolded state of the electronic device 100, and a fourth support surface 1231*b* directed in the second direction (−z-axis direction). In the embodiment, the first display 130 may be disposed to be supported by the first support surface 1131*a* of the first support member 1131 and the third support surface 1231*a* of the second support member 1231.

Figure 4:
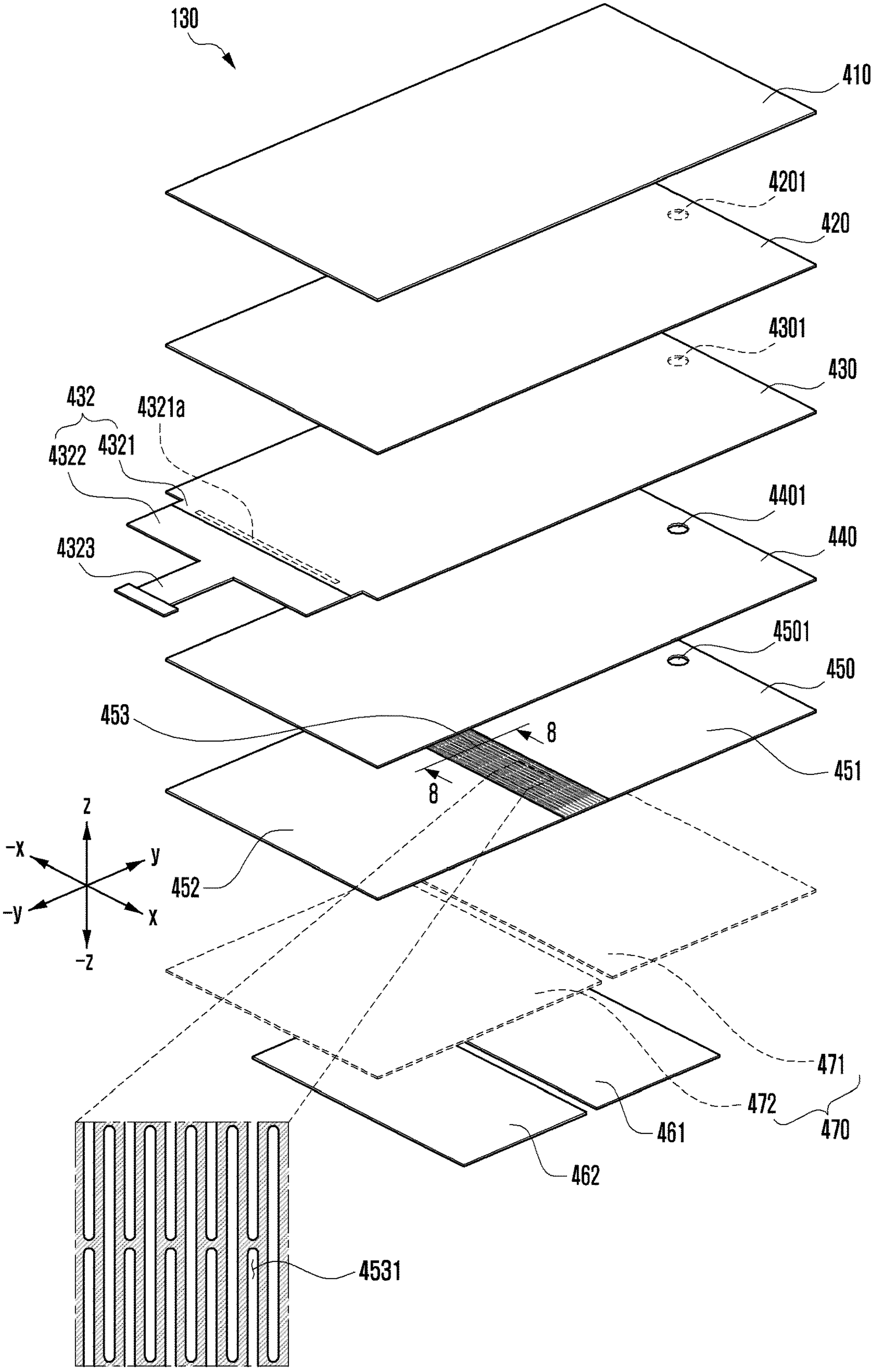
FIG. 4 is an exploded perspective view of a flexible display according to an embodiment of the disclosure.

FIG. 4 is an exploded perspective view of a flexible display according to an embodiment of the disclosure.

FIG. 4 is an exploded perspective view of the first display according to an embodiment of the disclosure. Hereinafter, the first display will be referred to as a ‘flexible display’.

The flexible display (e.g., the first display 130 in FIG. 1A) according to an embodiment of the disclosure may include an unbreakable (UB) type organic light emitting diode (OLED) display (e.g., a curved display). However, the disclosure is not limited thereto. The flexible display 130 may include a flat type display that is an on-cell-touch active matrix organic light-emitting diode (AMOLED) (OCTA) type display.

Referring to FIG. 4, the flexible display 130 (e.g., the first display 130 in FIG. 1A) may include a window layer 410, and a polarizing layer (POL (polarizer)) 420 (e.g., a polarizing film), a display panel 430, a polymer layer 440, a support plate 450, and lower layers sequentially disposed on a rear surface (e.g., the −z-axis direction) of the window layer 410. In the embodiment, the lower layers may be disposed below the support plate 450 and include a first lower layer disposed at a position corresponding to at least a part of the first housing 110, and a second lower layer disposed at a position corresponding to at least a part of a second housing 220. In the embodiment, the first lower layer may include a first reinforcement plate 461 and/or a first digitizer 471 at least partially disposed below the support plate 450. In the embodiment, in case that the first reinforcement plate 461 and the first digitizer 471 are disposed together, the first digitizer 471 may be disposed between the support plate 450 and the first reinforcement plate 461. In the embodiment, the second lower layer may include a second reinforcement plate 462 and/or a second digitizer 472 at least partially disposed below the support plate 450. In the embodiment, in case that the second reinforcement plate 462 and the second digitizer 472 are disposed together, the second digitizer 472 may be disposed between the support plate 450 and the second reinforcement plate 462. In any embodiment, the first digitizer 471 and the second digitizer 472 may be disposed as a single integrated digitizer 470. In this case, an area corresponding to a folding area (e.g., the folding area 130*c* in FIG. 1A) of the flexible display 130 may be configured to be bendable. In any embodiment, the digitizer 470 may be disposed between the polymer layer 440 and the support plate 450. For example, in case that the flexible display 130 is a POL-less display, the polarizing layer may be excluded, and a transparent reinforcement layer (e.g., a buffer layer or a damping layer) may be further disposed at a position of the polarizing layer. In any embodiment, the digitizer 470 may be excluded. In the embodiment, at least one of the polarizing layer 420, the display panel 430, the polymer layer 440, and the support plate 450 may include bored openings 4201, 4301, 4401, and 4501 for at least one optical module (e.g., a camera device or a sensor module) disposed below at least one of the polarizing layer 420, the display panel 430, the polymer layer 440, and the support plate 450 and configured to detect an external environment through the flexible display 130.

According to various embodiments, the window layer 410 may include a glass layer. In the embodiment, the window layer 410 may include ultra-thin glass (UTG) (or foldable thin glass (FTG)). In any embodiment, the window layer 410 may include polymer. In this case, the window layer 410 may include polyethylene terephthalate (PET) or polyimide (PI). In any embodiment, the window layer 410 may be disposed as a plurality of layers including glass layers and polymer. In any embodiment, the flexible display 130 may further include a coating layer formed on the glass layer, which is formed as a part of the window layer 410, or formed on at least a part of an upper surface, a rear surface, or a side surface of polymer (e.g., a protective film layer) disposed on an upper portion of the glass layer. In this case, the coating layer may include a hard coating layer (HC layer), an anti-reflection (AR)/low-reflection (LR) coating layer, a shatter-proof (SP) coating layer, and/or an anti-fingerprint (AF) coating layer. In any embodiment, the coating layer may be formed between the polymer and the glass layer, formed on the side surface of the polymer, or formed on at least one of the rear surface and the side surface of the glass layer.

According to various embodiments, the window layer 410, the polarizing layer 420, the display panel 430, the polymer layer 440, and the support plate 450 may be disposed to traverse at least a part of the first surface (e.g., the first surface 211 in FIG. 1A) of the first housing (e.g., the first housing 110 in FIG. 1A) and at least a part of the third surface (e.g., the third surface 221 in FIG. 1A) of the second housing (e.g., the second housing 220 in FIG. 1A). In the embodiment, the reinforcement plates 461 and 462 may be used as the ground for providing rigidity for the flexible display 130 and preventing or reducing an erroneous operation of the flexible display 130. In the embodiment, the reinforcement plates 461 and 462 may be made of a metallic material. In the embodiment, the reinforcement plates 461 and 462 may be made of SUS or Al. In the embodiment, at least one of the first reinforcement plate 461 and the second reinforcement plate 462 may be made of a material, such as a copper alloy, excellent in thermal conductivity in order to improve heat dissipation performance. In the embodiment, the window layer 410, the polarizing layer 420, the display panel 430, the polymer layer 440, the support plate 450, and the reinforcement plates 461 and 462 may be attached to one another by means of adhesive agents (or bonding agents). For example, the adhesive agent may include at least one of an optical clear adhesive (OCA), a pressure sensitive adhesive (PSA), a thermally reactive bonding agent, a general bonding agent, and a double-sided tape.

According to various embodiments, the display panel 430 may include a plurality of pixels and a wiring structure (e.g., an electrode pattern). In the embodiment, the polarizing layer 420 may selectively transmit light that is generated from a light source of the display panel 430 and vibrates in a predetermined direction. In the embodiment, the display panel 430 and the polarizing layer 420 may be integrated. In the embodiment, the flexible display 130 may also include a touch panel (not illustrated).

According to various embodiments, the polymer layer 440 may be disposed below the display panel 430 to provide a dark background for ensuring the visibility of the display panel 430, and the polymer layer 440 may be made of a buffer material for ensuring a buffer operation. In any embodiment, in order to ensure the waterproofness of the flexible display 130, the polymer layer 440 may be removed or disposed below the support plate 450. In any embodiment, the polymer layer 440 may be excluded in case that the support plate 450 is made of an opaque material.

According to various embodiments, the support plate 450 may provide bending properties to the flexible display 130. For example, the support plate 450 may be made of a nonmetallic thin-plate-shapes material, such as fiber reinforced plastic (FRP) (e.g., carbon fiber reinforced plastic (CFRP) or glass fiber reinforced plastic (GFRP)) having rigid properties for supporting the display panel 430. In the embodiment, the support plate 450 may include a first planar portion 451 corresponding to the first housing (e.g., the first housing 110 in FIG. 1A), a second planar portion 452 corresponding to the second housing (e.g., the second housing 220 in FIG. 1A), and a flexible portion 453 (flexible portion or bending portion) configured to connect the first planar portion 451 and the second planar portion 452. In the embodiment, the flexible portion 453 may be formed to have a pattern 4531 for improving the flexibility. In the embodiment, the pattern 4531 may include a plurality of openings formed at designated intervals and formed through the support plate 450 from an upper surface to a rear surface of the support plate 450. In the embodiment, the bending properties of the flexible portion 453 may be determined based on at least one of sizes, shapes, and arrangement densities of at least some of the plurality of openings of the pattern 4531. In any embodiment, the pattern 4531 may include at least one recess formed to have a designated depth from the upper surface and/or the rear surface of the support plate 450. In any embodiment, the support plate 450 may be made of a metallic material, such as steel use stainless (SUS) (e.g., stainless steel (STS)), Cu, Al, or metal CLAD (e.g., a stack member in which SUS and Al are alternately disposed). In this case, the plurality of openings may be formed in an overall area of the support plate 450 so that a detection operation of the digitizer 470 disposed below the support plate 450 is induced. In the embodiment, the support plate 450 may assist in reinforcing the rigidity of the electronic device (e.g., the electronic device 100 in FIG. 1A), block surrounding noise, and disperse heat discharged from peripheral heat-radiating components.

According to various embodiments, the flexible display 130 may include at least one functional member (not illustrated) disposed between the polymer layer 440 and the support plate 450 or disposed below the support plate 450. In the embodiment, the functional members may include a graphite sheet (e.g., a heat dissipation member 445 in FIG. 10G) for heat dissipation, a force touch FPCB, a fingerprint sensor FPCB, a communication antenna radiator, or a conductive/non-conductive tape. In the embodiment, in case that the functional member cannot be bent, the functional members may be independently disposed on the first housing (e.g., the first housing 110 in FIG. 1A) and the second housing (e.g., the second housing 120 in FIG. 1A). In the embodiment, in case that the functional member may be bent, the functional member may be disposed from the first housing (e.g., the first housing 110 in FIG. 1A) to at least a part of the second housing (e.g., the second housing 120 in FIG. 1A) through the hinge assembly (e.g., the hinge assembly HA in FIG. 3).

According to various embodiments, the flexible display 130 may include a bending portion 432 disposed to be folded from the display panel 430 to at least a partial area of the rear surface (e.g., the −z-axis direction) of the flexible display 130. In the embodiment, the bending portion 432 may include an extension portion 4321 extending from the display panel 430 and including a control circuit 4321*a*, and a flexible substrate 4322 (e.g., a flexible printed circuit board (FPCB)) electrically connected to the extension portion 4321 and including a plurality of electric elements. In the embodiment, the control circuit 4321*a* may include a display driver IC (DDIC) or a touch display driver IC (TDDIC) disposed on the extension portion 4321 having the electrical wiring structure. In the embodiment, the bending portion 432 may include a chip-on-panel or chip-on-plastic (COP) structure in which the control circuit 4321*a* is disposed directly on the extension portion 4321. In any embodiment, the bending portion 432 may include a chip-on-film (COF) structure in which the control circuit 4321*a* is disposed on a separate connection film (not illustrated) configured to connect the extension portion 4321 and the flexible substrate 4322. In the embodiment, the flexible display 130 may include a plurality of electric elements (not illustrated) disposed on the flexible substrate 4322. In the embodiment, the flexible display 130 may include a connector portion 4323 extending from the flexible substrate 4322 and electrically connected to a substrate (e.g., a main printed circuit board) disposed in the internal space of the electronic device 100. In the embodiment, the plurality of electric elements may include at least one of a touch IC, display flash memory, an electro static discharge (ESD) prevention diode, a pressure sensor, or a fingerprint sensor.

According to various embodiments, the first reinforcement plate 461 may be sized to overlap a part of the flexible portion 453 of the support plate 450 and at least a part of the first planar portion 451 when the flexible display 130 is viewed from above. In the embodiment, the second reinforcement plate 462 may be sized to overlap a part of the flexible portion 453 of the support plate 450 and at least a part of the second planar portion 452 when the flexible display 130 is viewed from above.

According to an embodiment of the disclosure, the first reinforcement plate 461 and the second reinforcement plate 462 may be disposed to be foldable together with the flexible portion 453 by means of at least a part of the hinge assembly HA when the electronic device (e.g., the electronic device 100 in FIG. 1A) is in the folded state. The foldable structures of the reinforcement plates 461 and 462 may assist in efficiently disposing the peripheral structures.

Figure 5:
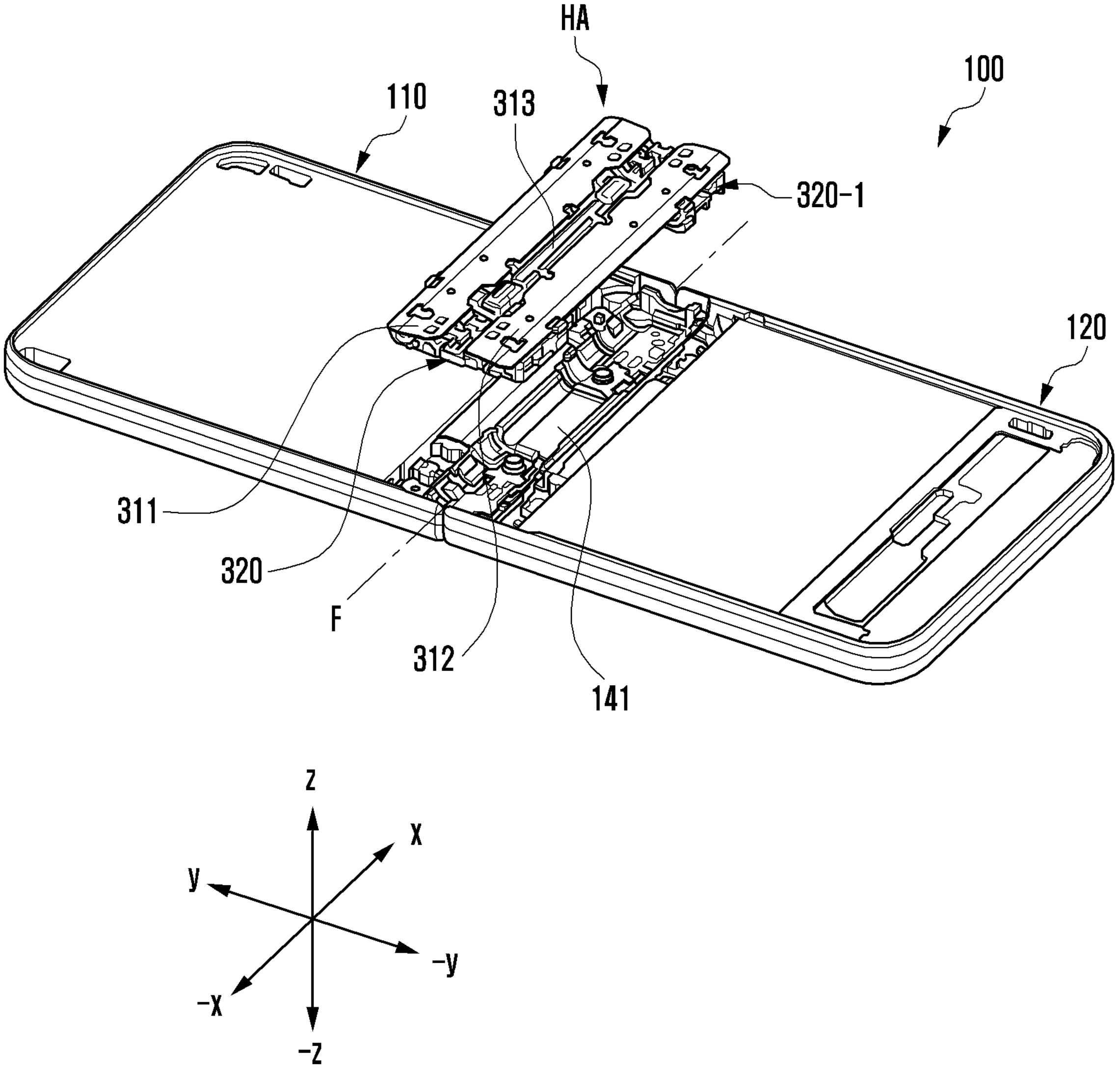
FIG. 5 is a configuration view of an electronic device including a hinge assembly according to an embodiment of the disclosure.

FIG. 5 is a configuration view of an electronic device including a hinge assembly according to an embodiment of the disclosure.

Referring to FIG. 5, the electronic device 100 may include the first housing 110 (e.g., the first housing structure), the second housing 120 (e.g., the second housing structure) rotatably connected to the first housing 110 by means of at least one of hinge devices 320 and 320-1, a first hinge plate 311 (e.g., a first plate, a first support plate, or a first wing plate) disposed to be supported by at least one of the hinge devices 320 and 320-1, a second hinge plate 312 (e.g., a second plate, a second support plate, or a second wing plate) disposed to be supported by at least one of the hinge devices 320 and 320-1, a center plate 313 (e.g., a third plate, a center bar, or an auxiliary plate) disposed between the first hinge plate 311 and the second hinge plate 312, and a flexible display (e.g., the first display 130 in FIG. 1A) disposed to be supported by the first housing 110, the second housing 120, the first hinge plate 311, the second hinge plate 312, and the center plate 313. In the embodiment, at least one of the hinge devices 320 and 320-1, the pair of hinge plates 311 and 312, and the center plate 313 may be assembled as the hinge assembly HA. In any embodiment, the pair of hinge plates 311 and 312 and the center plate 313 may be configured as separate constituent elements and assembled to at least one of the hinge devices 320 and 320-1.

According to various embodiments, in the unfolded state of the electronic device 100, the first hinge plate 311 may define substantially the same plane as the first housing 110, and the second hinge plate 312 may define substantially the same plane as the second housing 120. In the embodiment, in the unfolded state of the electronic device 100, the center plate 313 may move to a first position to define the same plane as the pair of hinge plates 311 and 312 by means of a cooperative structure with at least one of the hinge devices 320 and 320-1. In the embodiment, in the folded state of the electronic device 100, the center plate 313 may move to a second position lower than the first position by means of the cooperative structure with at least one of the hinge devices 320 and 320-1. For example, the second position may be a position relatively closer to a hinge housing 141 (e.g., a hinge cover) than the first position to the hinge housing 141.

In various embodiments, at least one of the hinge devices 320 and 320-1 may include a first hinge device 320 and a second hinge device 320-1 respectively disposed on the hinge plates 311 and 312 and two opposite ends of the center plate 313 in the +x-axis direction. In any embodiment, at least one of the hinge devices 320 and 320-1 may be provided as two hinge devices, as illustrated in the drawings. Alternatively, a single hinge device may be disposed, or three or more hinge devices may be disposed to be spaced apart from one another. In the embodiment, the first housing 110 and the second housing 120 may be connected to be rotatable relative to each other by means of at least one of the hinge devices 320 and 320-1. For example, the first housing 110 and the second housing 120 may be connected to be rotatable relative to each other by means of some constituent elements of at least one of the hinge devices 320 and 320-1. In the embodiment, at least one of the hinge devices 320 and 320-1 may be at least partially fixed to the hinge housing 141. In the embodiment, the first hinge plate 311 and the second hinge plate 312 may be fixed to at least one of the hinge devices 320 and 320-1 by fastening members, such as screws. In the embodiment, the center plate 313 may be coupled to at least one of the hinge devices 320 and 320-1 and configured to reciprocate in the direction (e.g., the z-axis direction) perpendicular to the folding axis F.

In the following description of the drawings, the first hinge device 320 will be described as at least one of the hinge devices 320 and 320-1 (e.g., the hinge module or the hinge structure), but the second hinge device 320-1 may also have substantially the same configuration. In addition, it may be understood by those skilled in the art that a 'center' of the center plate is a term that does not mean a center of the electronic device 100 but means a plate disposed between the first hinge plate 311 and the second hinge plate 312.

Figure 6A:
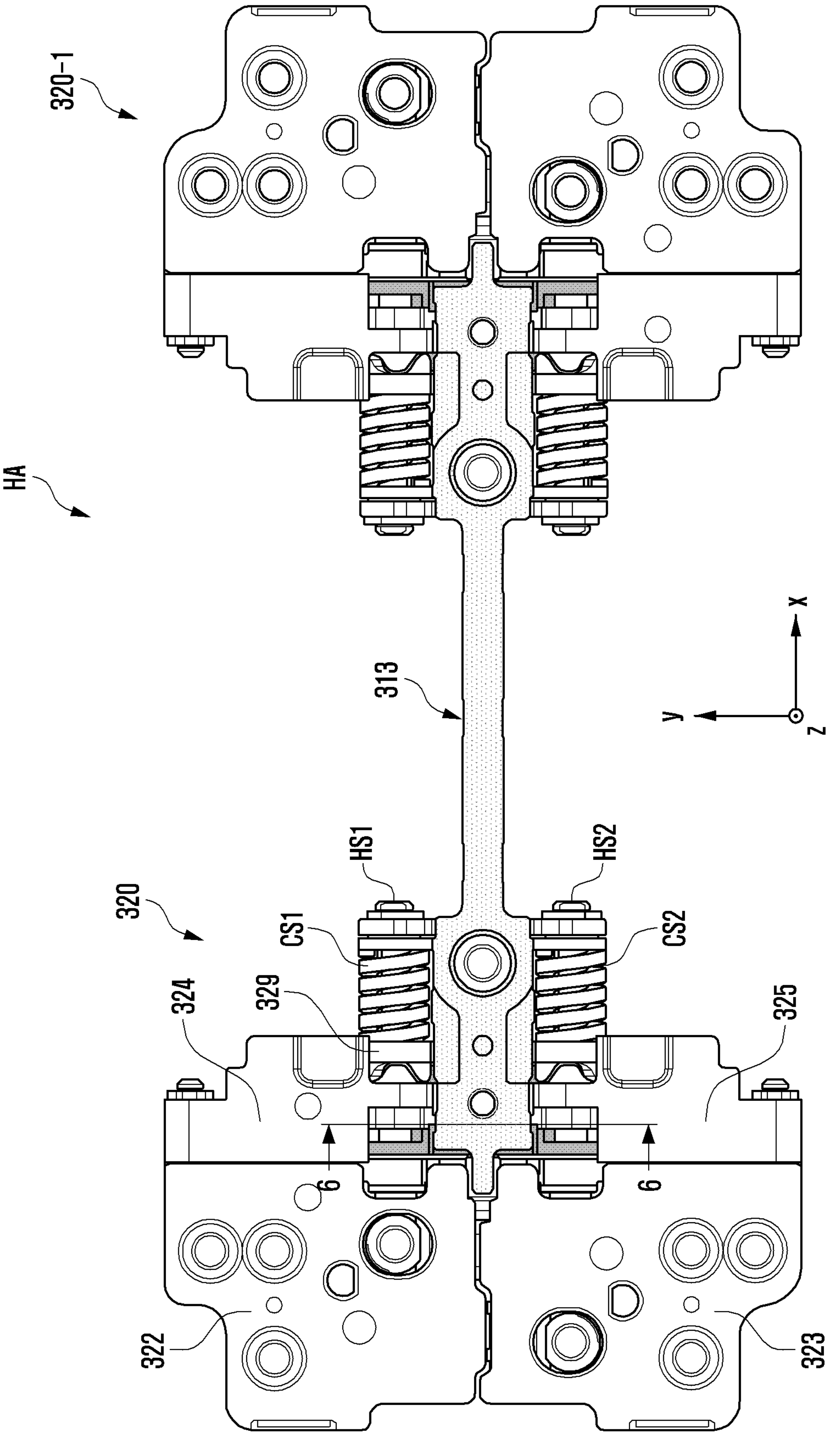
FIG. 6A is a configuration view illustrating a front surface of a hinge assembly according to an embodiment of the disclosure.
Figure 6B:
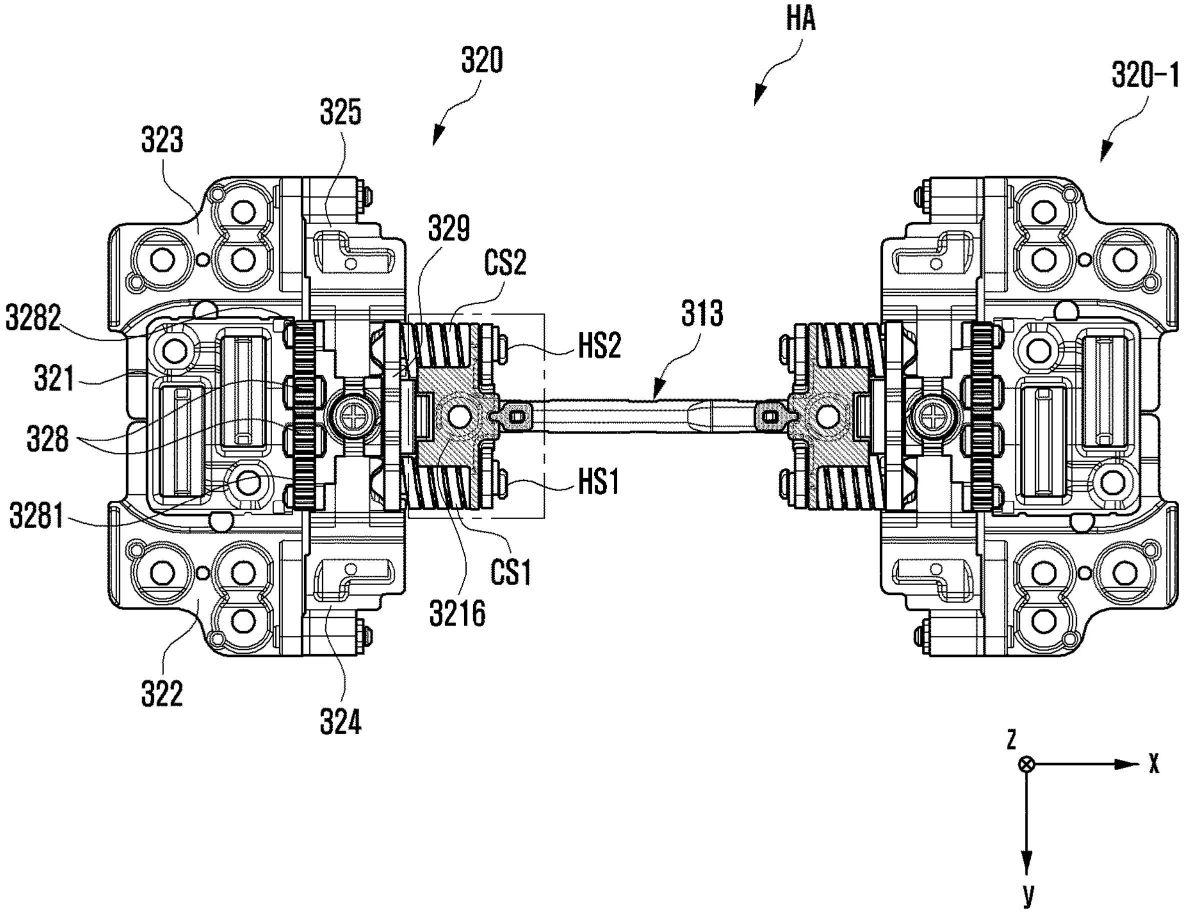
FIG. 6B is a configuration view illustrating a rear surface of a hinge assembly according to an embodiment of the disclosure.

FIG. 6A is a configuration view illustrating a front surface of a hinge assembly according to an embodiment of the disclosure. FIG. 6B is a configuration view illustrating a rear surface of a hinge assembly according to an embodiment of the disclosure.

Referring to FIGS. 6A and 6B, the hinge assembly HA may include the first hinge device 320, the second hinge device 320-1 disposed to be spaced apart from the first hinge device 320, and the center plate 313 disposed between the first hinge device 320 and the second hinge device 320-1 and disposed to be movable in the perpendicular direction (e.g., the +z-axis direction) by the operations of folding and unfolding the first housing (e.g., the first housing 110 in FIG. 5) and the second housing (e.g., the second housing 120 in FIG. 5). In the embodiment, the center plate 313 may move to define substantially the same plane as the first hinge plate (e.g., the first hinge plate 311 in FIG. 5) and the second hinge plate (e.g., the second hinge plate 312 in FIG. 5) in the unfolded state of the electronic device (e.g., the electronic device 100 in FIG. 5).

In the following description of the drawings, the structure in which the center plate 313 is coupled to the first hinge device 320 will be illustrated and disclosed. However, the coupling structure between the center plate 313 and the second hinge device 320-1 may also have substantially the same configuration.

According to various embodiments, the hinge device 320 may include a support body 321 (e.g., a rotator bracket or a bracket) fixed to the hinge housing (e.g., the hinge housing 141 in FIG. 5) by means of fastening members, such as screws, a first shaft HS1 rotatably disposed on the support body 321, and a second shaft HS2 provided at a position spaced apart from the first shaft HS1 and rotatably disposed on the support body 321. In the embodiment, the hinge device 320 may include a first rotator 322 rotatably coupled to the support body 321, and a second rotator 323 rotatably coupled to the support body 321. In the embodiment, the hinge device 320 may include a first hinge arm 324 disposed to rotate together with the first shaft HS1, and a second hinge arm 325 disposed to rotate together with the second shaft HS2. In the embodiment, the hinge device 320 may include a cam structure 329 disposed to be movable in an axial direction (e.g., the +x-axis direction) so that the first shaft HS1 and the second shaft HS2 penetrate the cam structure 329. In the embodiment, the cam structure 329 may be cam-coupled to cam structures provided on the first and second hinge arms 324 and 325. In the embodiment, the hinge device 320 may include first and second elastic members CS1 and CS2 disposed to press the cam structure 329 in the direction (e.g., the −x-axis direction) of the first and second hinge arms 324 and 325 based on a shaft support body 3216 disposed to be penetrated by the first and second shafts HS1 and HS2. In the embodiment, the hinge device 320 may include a first gear 3281 disposed to rotate together with the first shaft HS1, a second gear 3282 disposed to rotate together with the second shaft HS2, and idle gears 328 gear-coupled to the first gear 3281 and the second gear 3282.

Figure 6C:
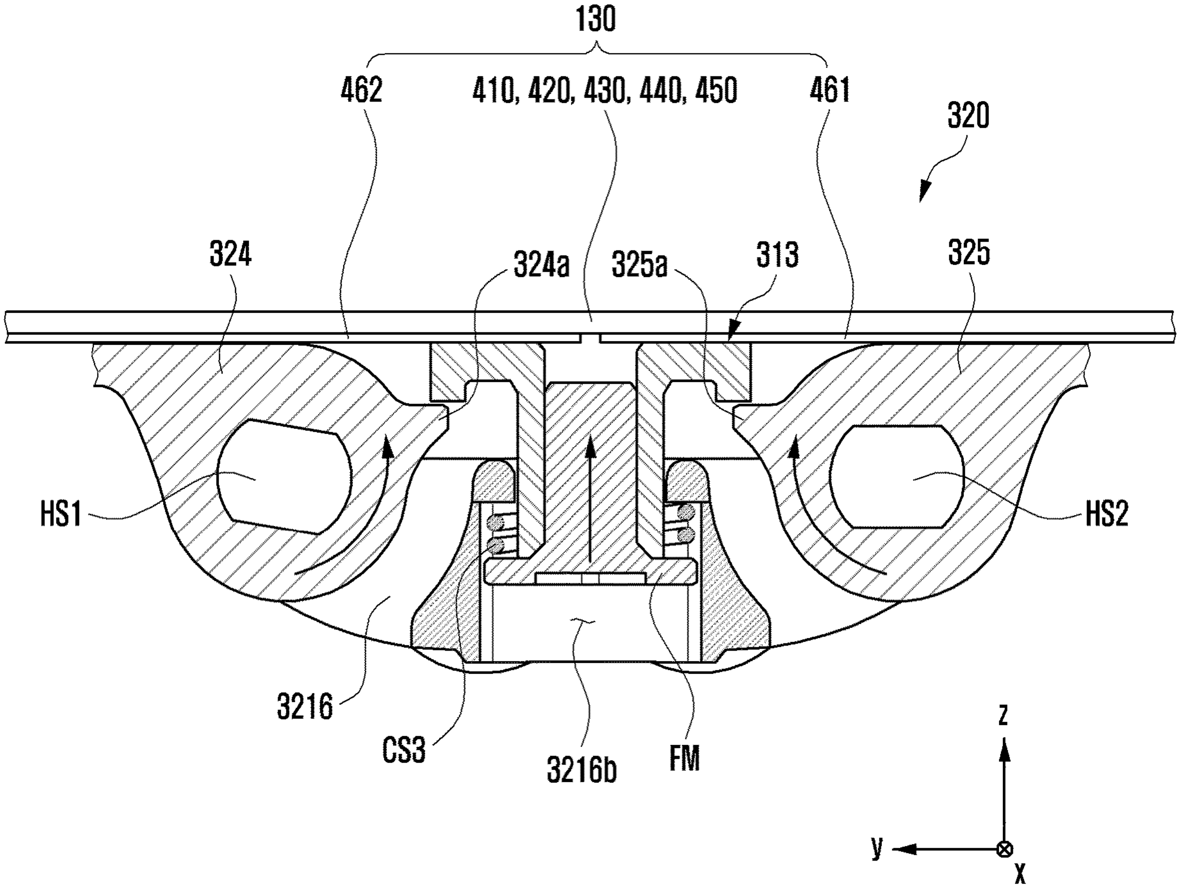
FIGS. 6C and 6D are partially cross-sectional views of a hinge device in a folded and unfolded states of an electronic device taken along line 6-6 in FIG. 6A according to various embodiments of the disclosure.
Figure 6D:
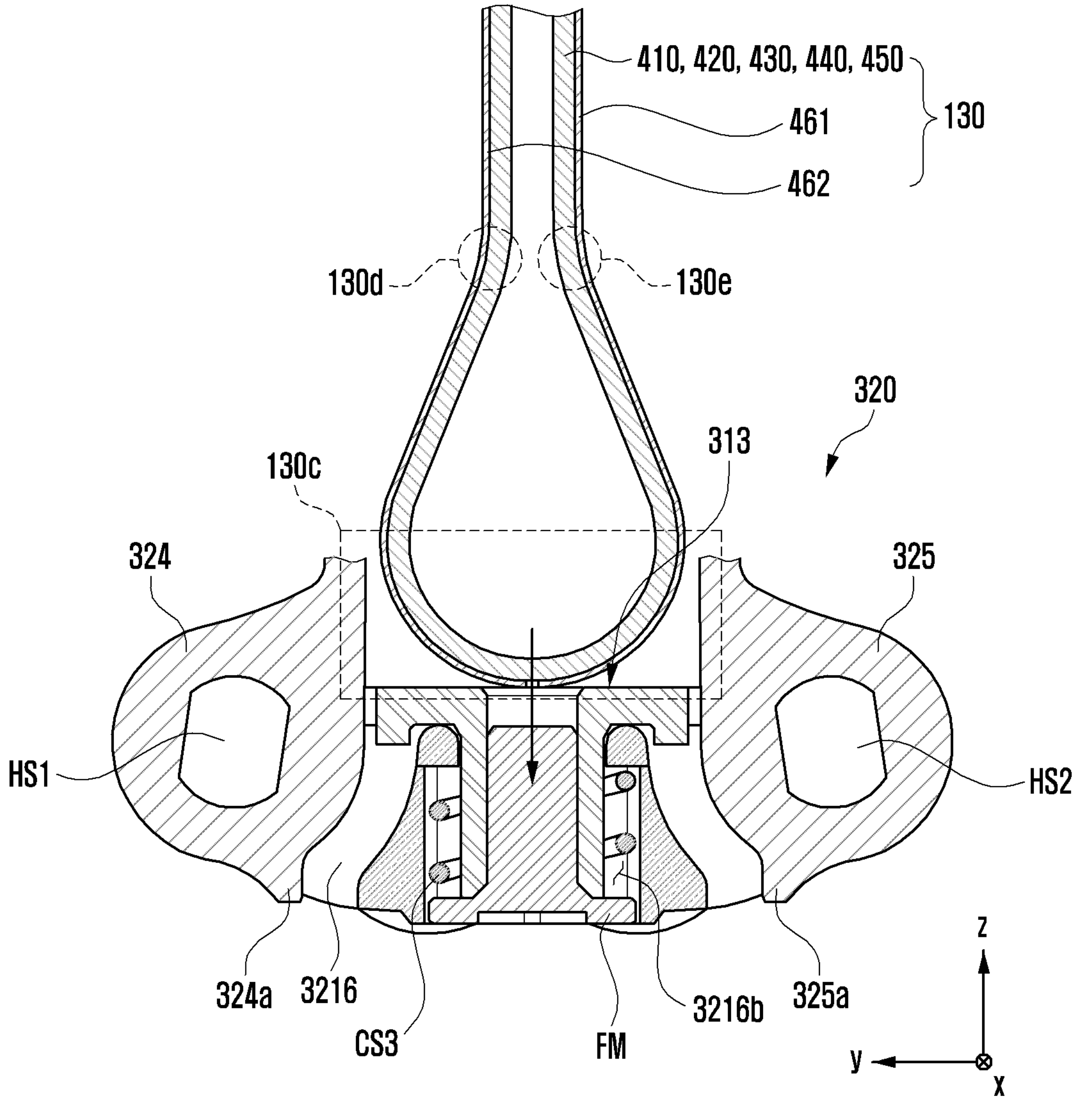

FIGS. 6C and 6D are partially cross-sectional views of a hinge device in a folded and unfolded states of an electronic device taken along line 6-6 in FIG. 6A according to various embodiments of the disclosure.

Referring to FIGS. 6C and 6D, for convenience of description, the first hinge plate (e.g., the first hinge plate 311 in FIG. 5) and the second hinge plate (e.g., the second hinge plate 312 in FIG. 5), which are respectively disposed at left and right sides of the center plate 313 to support the flexible display 130, are excluded.

As illustrated in FIGS. 6C and 6D, the flexible display 130 may include a first bending area 130*d* (e.g., a first reverse bending section) formed in a boundary area between the first hinge plate (e.g., the first hinge plate 311 in FIG. 5) and the first housing (e.g., the first housing 110 in FIG. 5), and a second bending area 130*e* (e.g., a second reverse bending section) formed in a boundary area between the second hinge plate (e.g., the second hinge plate 312 in FIG. 5) and the second housing (e.g., the second housing 120 in FIG. 5). For example, the first and second bending areas 130*d* and 130*e* may include reverse bending sections curved at a curvature greater than a curvature of the folding area 130*c* and bent in a direction opposite to the bending direction of the folding area 130*c* in the folded state of the electronic device (e.g., the electronic device 100 in FIG. 5).

According to various embodiments, at least a part of the center plate 313 may penetrate a through-hole 3216*b*, which is formed in the shaft support body 3216, and be disposed to be movable in the perpendicular direction (e.g., the +z-axis direction). In the embodiment, the hinge device 320 may include a fastening member FM accommodated through the through-hole 3216*b*, and an elastic member CS3 disposed between the fastening member FM and the center plate 313. In the embodiment, the center plate 313 may be installed to be supported by the shaft support body 3216 and always pressed by the elastic member CS3 in the downward direction (e.g., the −z-axis direction). Therefore, in the folded state of the electronic device 100, the center plate 313 may be kept in a state of being lowered in the downward direction (e.g., the −z-axis direction) by a pressing force of the elastic member CS3. In the embodiment, in case that the electronic device 100 changes from the folded state to the unfolded state, the center plate 313 may be raised in the upward direction (e.g., the z-axis direction) by moving a part of the center plate 313 upward by means of a first support protrusion 324*a*, which is formed on the first hinge arm 324, and a second support protrusion 325*a* formed on the second hinge arm 325. For example, at least a part of the first reinforcement plate 461 and/or at least a part of the second reinforcement plate 462 may be supported by at least a part of the center plate 313 that is raised in case that the electronic device 100 changes from the folded state to the unfolded state.

According to various embodiments, the center plate 313 may be disposed below the flexible display 130 to support at least a part of the folding area 130*c* (e.g., the third area 130*c* in FIG. 1B) while the state changes from the unfolded state to the folded state. In the embodiment, the flexible display may include the window layer 410 and the polarizing layer 420, the display panel 430, the polymer layer 440, and the support plate 450 sequentially disposed below the window layer 410. In the embodiment, the flexible display 130 may include the first reinforcement plate 461 disposed below the support plate 450 and disposed at the position corresponding to the first housing (e.g., the first housing 110 in FIG. 5). In the embodiment, the flexible display 130 may include the second reinforcement plate 462 disposed below the support plate 450, disposed at the position corresponding to the second housing 120, and disposed to be spaced apart from the first reinforcement plate 461. In the embodiment, at least a part of the first reinforcement plate 461 and at least a part of the second reinforcement plate 462 may be disposed to be supported by the center plate 313. In any embodiment, the center plate 313 may be excluded, and the first reinforcement plate 461 and the second reinforcement plate 462 may be disposed to be bendably supported by some constituent elements (e.g., the hinge arms 324 and 324, the rotators 322 and 323, or the hinge plates 311 and 312) of the hinge device 320.

Figure 6E:
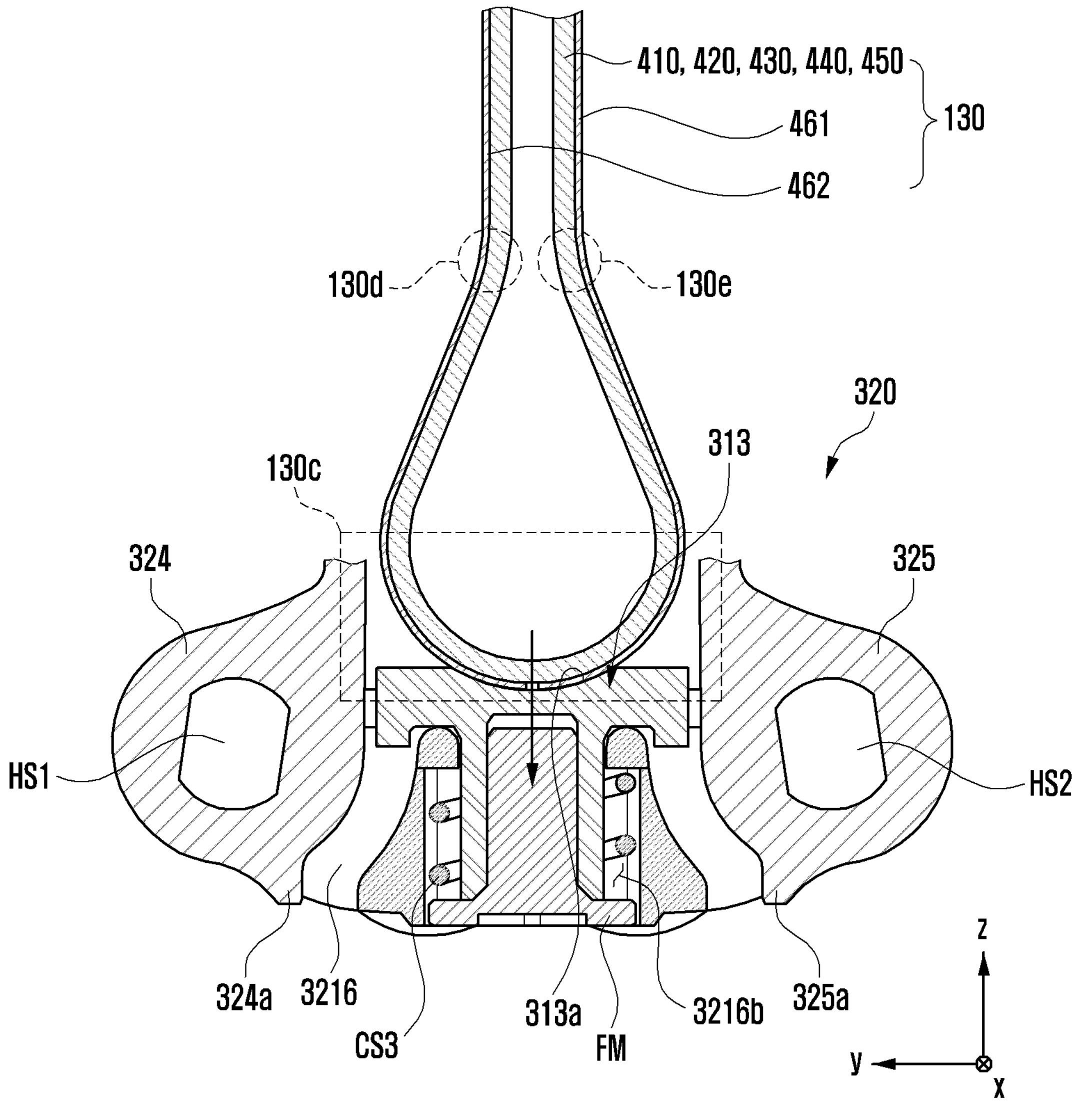
FIG. 6E is a partially cross-sectional view of a hinge device in a folded state according to an embodiment of the disclosure.

FIG. 6E is a partially cross-sectional view of a hinge device in a folded state according to an embodiment of the disclosure.

Referring to FIG. 6E, an upper surface of the center plate 313 may include a recess 313*a* having a curved shape recessed inward to allow the reinforcement plates 461 and 462 to be smoothly bent.

According to an embodiment of the disclosure, the first reinforcement plate 461 and the second reinforcement plate 462 may be configured to be bent together in the folded state by means of at least a part of the hinge device 320, such that the rotation trajectories of the reinforcement plates 461 and 462 made by the folding and unfolding operations may be reduced. The reduced rotation trajectories may assist in improving the efficiency in disposing the peripheral structure (e.g., the hinge device 320). In addition, the first reinforcement plate 461 and/or the second reinforcement plate 462 according to an embodiment of the disclosure is freely formed with a curvature in the corresponding areas, which may improve the surface quality and durability of the flexible display 130 without interference with the hinge device.

Figure 7A:
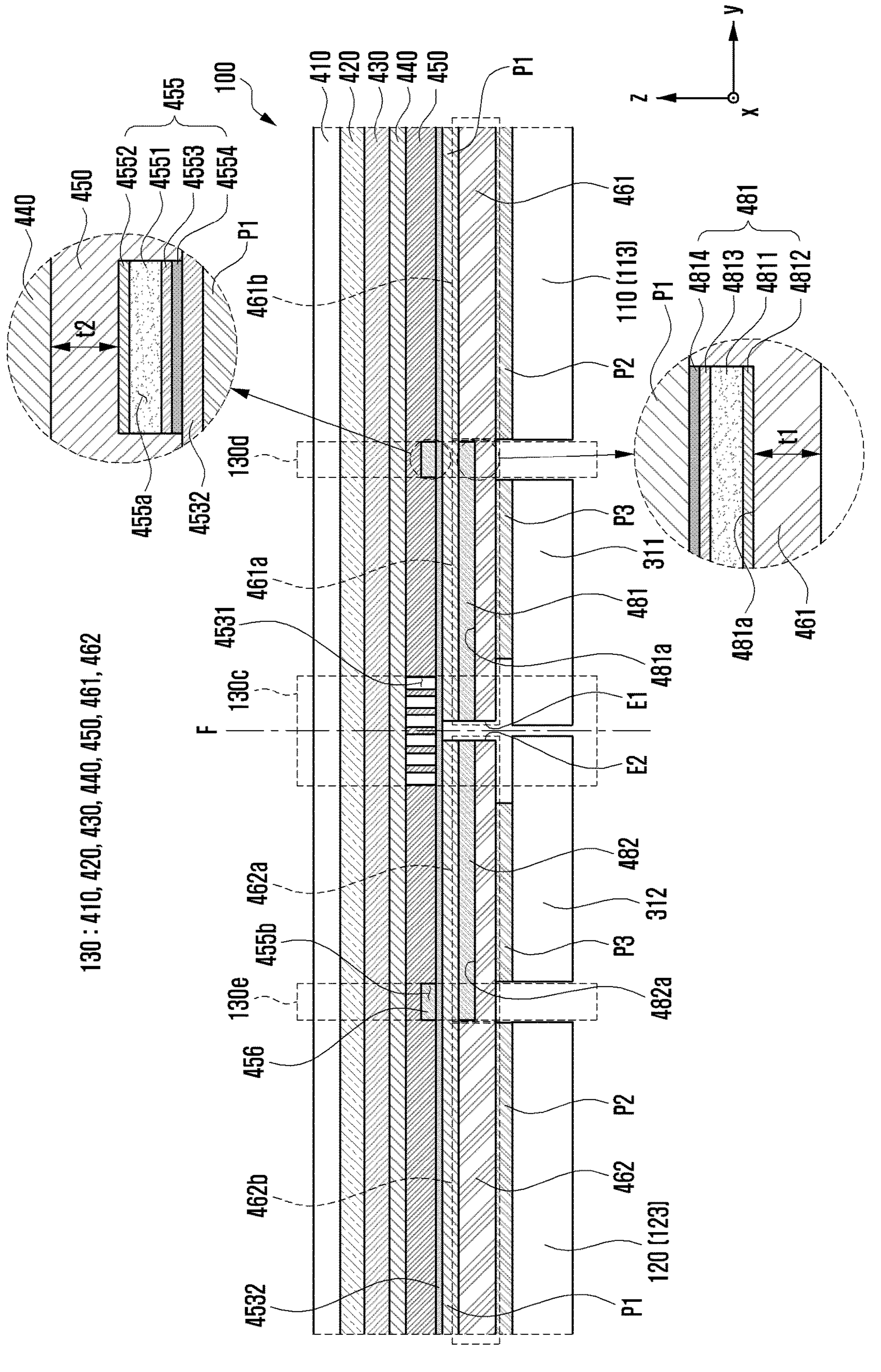
FIG. 7A is a partially cross-sectional view of an electronic device taken along line 7-7 in FIG. 1A according to an embodiment of the disclosure.
Figure 7B:
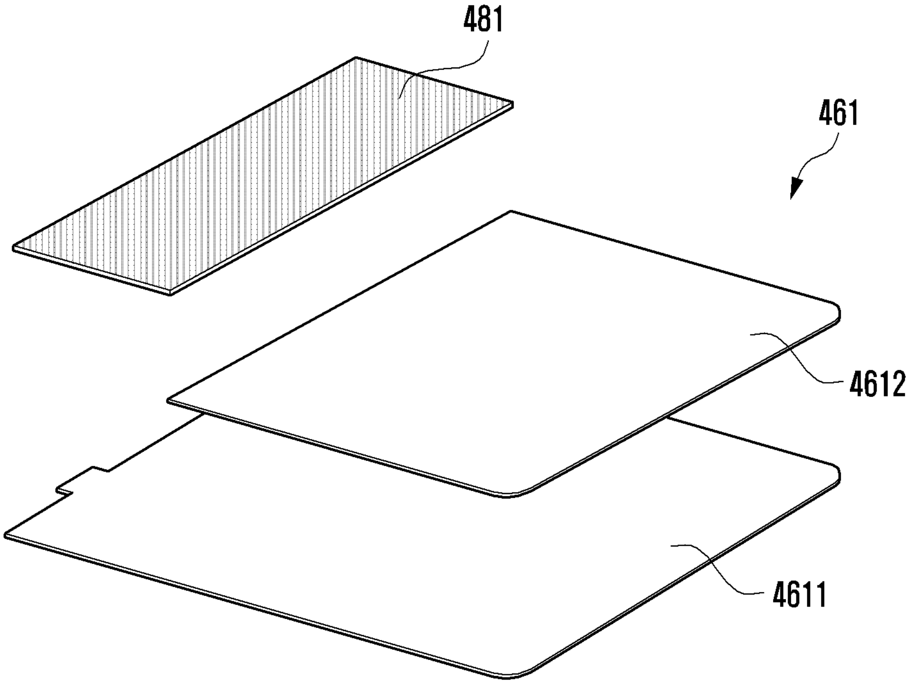
FIG. 7B is an exploded perspective view of a first reinforcement plate according to an embodiment of the disclosure.
Figure 7C:
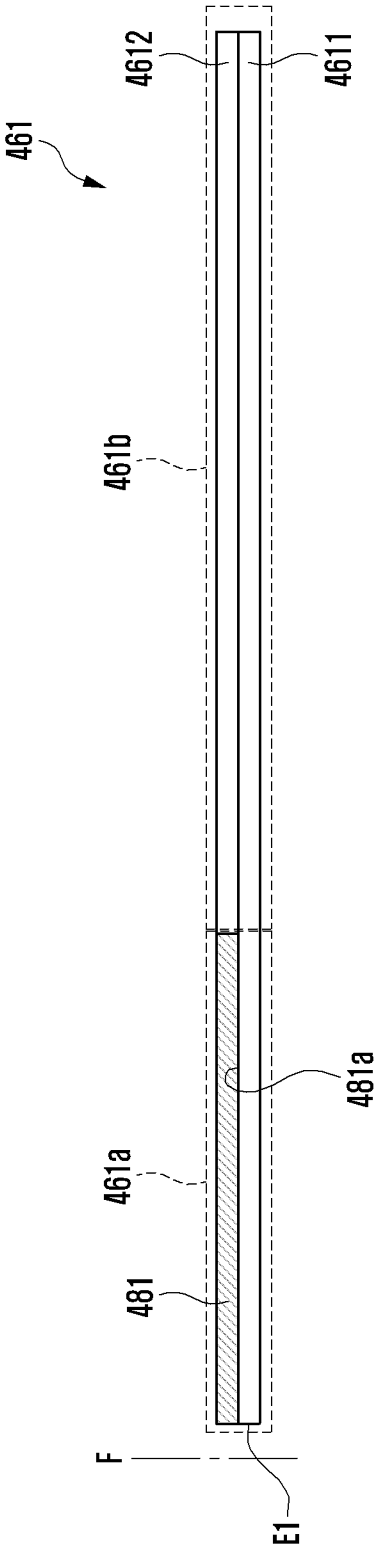
FIG. 7C is a side view illustrating a state in which a first reinforcement plate according to an embodiment of the disclosure.
Figure 7D:
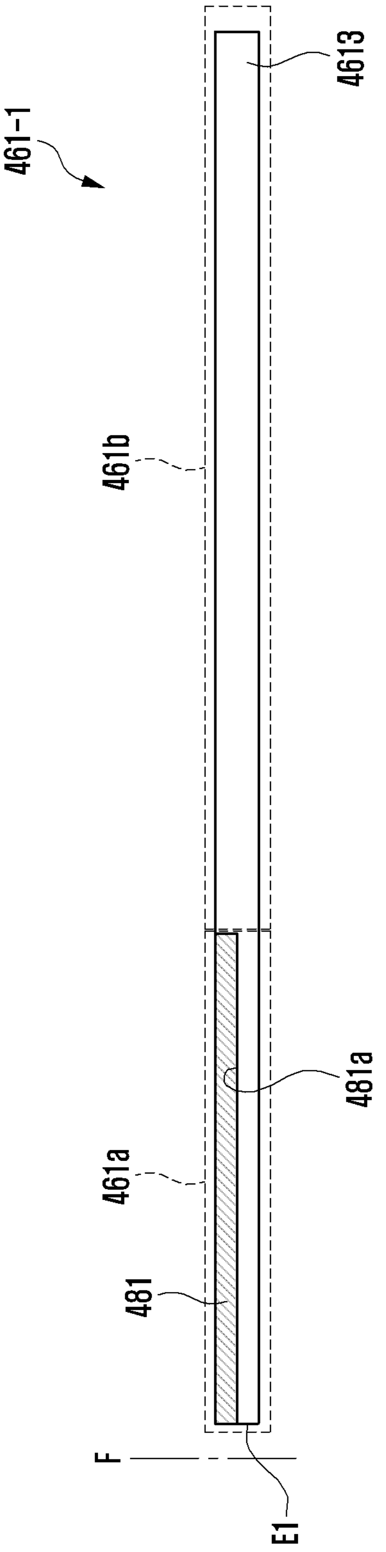
FIGS. 7D and 7E are side views of a first reinforcement plate according to various embodiments of the disclosure.
Figure 7E:
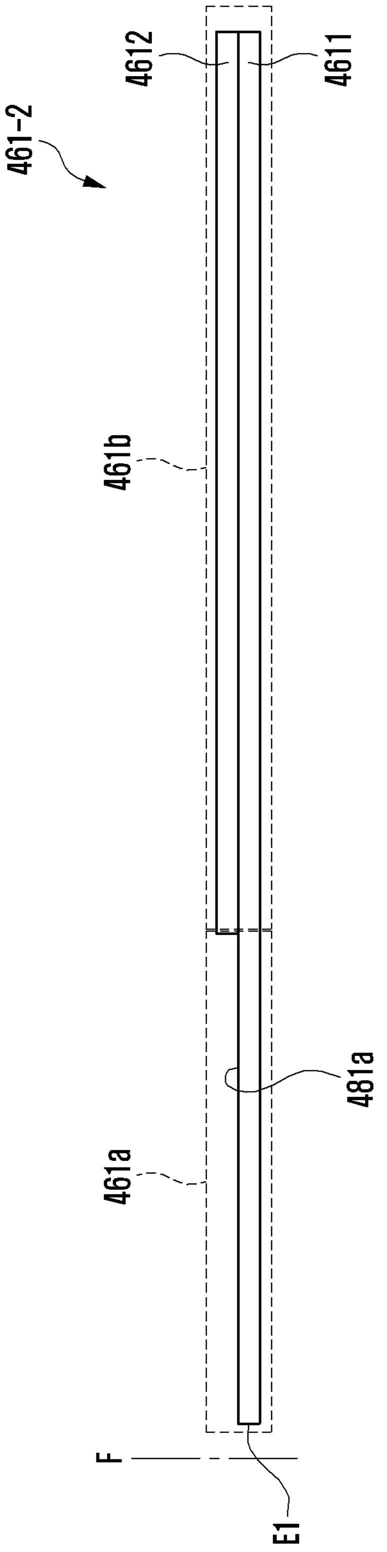

FIG. 7A is a partially cross-sectional view of an electronic device taken along line 7-7 in FIG. 1A according to an embodiment of the disclosure. FIG. 7B is an exploded perspective view of a first reinforcement plate according to an embodiment of the disclosure. FIG. 7C is a side view illustrating a state in which a first reinforcement plate according to an embodiment of the disclosure is coupled. FIGS. 7D and 7E are side views of a first reinforcement plate according to various embodiments of the disclosure.

Referring to FIGS. 7A, 7B, 7C, and 7D, the electronic device 100 may include the first housing 110 including the first lateral member 113, the second housing 120 including the second lateral member 123, and the flexible display 130 disposed to be supported by the first housing 110 and the second housing 120. In the embodiment, the flexible display 130 may be disposed to be supported by the first support member (e.g., the first support member 1131 in FIG. 3), which extends from the first lateral member 113 that defines a part of the side surface of the electronic device 100, and the second support member (e.g., the second support member 1231 in FIG. 3) that extends from the second lateral member 123 that defines a part of the side surface of the electronic device 100. In the embodiment, the electronic device 100 may include the first hinge plate 311 (e.g., the first wing plate) disposed in an internal space of the first housing 110, and the second hinge plate 312 (second wing plate) disposed in an internal space of the second housing 120. The center plate (e.g., the center plate 313 in FIG. 5) may not be illustrated based on the structure of the cross-section of the electronic device 100. In the embodiment, in case that the electronic device 100 is in the folded state, the first hinge plate 311 and the second hinge plate 312 may be disposed to support a part of the rear surface of the flexible display 130 so that the folding area 130*c* of the flexible display 130 has a standardized bending shape (e.g., a water droplet shape). In the embodiment, in the unfolded state of the electronic device 100, the first housing 110, the first hinge plate 311, the second housing 120, and the second hinge plate 312 may define substantially the same plane to support the flexible display 130.

According to various embodiments, the flexible display 130 may include the window layer 410 and the polarizing layer 420, the display panel 430, the polymer layer 440, and the support plate 450 sequentially disposed below the window layer 410. In the embodiment, the support plate 450 may include the first pattern 4531 including at least one opening formed at a designated interval in the folding area 130*c* to provide the flexibility to the flexible display 130. In any embodiment, the first pattern 4531 may include at least one recess formed to be lower than an outer surface thereof. In any embodiment, the first pattern 4531 may be configured in a shape in which at least one opening and at least one recess are interchangeably disposed. In the embodiment, the flexible display 130 may include a blocking member 4532 disposed below the support plate 450, disposed in an area at least corresponding to the folding area 130*c*, and disposed to block a plurality of openings of the first pattern 4531. In the embodiment, the blocking member 4532 may include thermoplastic polyurethane (TPU) attached to the support plate 450.

According to various embodiments, the flexible display 130 may include the first bending area 130*d* (e.g., the first reverse bending section) formed in the boundary area between the first hinge plate 311 and the first housing 110 in the area corresponding to the first housing 110, and the second bending area 130*e* (e.g., the second reverse bending section) formed in the boundary area between the second hinge plate 312 and the second housing 120. For example, the first bending area 130*d* may be defined by the first hinge plate (e.g., the first hinge plate 311 in FIG. 5) that supports the rear surface of the flexible display 130 while rotating by a designated angle relative to the first housing 110 to maintain the standardized bending shape of the folding area 130*c* when the electronic device 100 is in the folded state. In the embodiment, the second bending area 130*e* may be defined by the second hinge plate (e.g., the second hinge plate 312 in FIG. 5) that supports the rear surface of the flexible display 130 while rotating by a designated angle relative to the second housing 120 to maintain the standardized bending shape of the folding area 130*c* when the electronic device 100 is in the folded state. For example, the first bending area 130*d* and the second bending area 130*e* may be reverse bending areas bent in a direction opposite to the folding area 130*c*. For example, the first and second bending areas 130*d* and 130*e* may include reverse bending sections curved at a curvature greater than the curvature of the folding area 130*c* and bent in the direction opposite to the bending direction of the folding area in the folded state of the electronic device 100. In the embodiment, the electronic device 100 may include the first reinforcement plate 461 disposed below the support plate 450 and disposed to correspond to at least a part of the first hinge plate 311 and at least a part of the first housing 110, and the second reinforcement plate 462 disposed to correspond to at least a part of the second hinge plate 312 and at least a part of the second housing 120. In the embodiment, the first and second reinforcement plates 461 and 462 may be some constituent elements of the flexible display 130.

According to various embodiments, at least a part of the first reinforcement plate 461 and at least a part of the second reinforcement plate 462 may be attached to the rear surface of the support plate 450 by means of a bonding member P1. In the embodiment, the first reinforcement plate 461 may be attached to at least a part of the first housing 110 and/or at least a part of the first hinge plate 311 by means of bonding members P2 and P3. In the embodiment, the second reinforcement plate 462 may be attached to at least a part of the second housing 120 and/or at least a part of the second hinge plate 312 by means of the bonding members P2 and P3. In this case, the bonding members P2 and P3 may not be applied to sections corresponding to the folding area 130*c*, the first bending area 130*d*, and the second bending area 130*e*. In any embodiment, at least one of the bonding members P1, P2, and P3 may be used as a level difference compensation member to compensate for a level difference between the layers.

According to various embodiments, the first reinforcement plate 461 may include a first part 461*a* having a first thickness and disposed from a first edge E1, which is close to the folding axis F, to a position corresponding to the first bending area 130*d*, a second part 461*b* extending from the first part 461*a* and having a second thickness greater than the first thickness, and a first buffer member 481 (e.g., a buffer member, a filling member, a bonding member, or a level difference compensation member) disposed between the first part 461*a* and the support plate 450. In any embodiment, the first part 461*a* may extend to the first bending area 130*d* or beyond the first bending area 130*d* from at least a part of the folding area 130*c* even though the first part 461*a* is not disposed from the first edge E1. In the embodiment, the first part 461*a* may be disposed at a position that at least overlaps the folding area 130*c* and the first bending area 130*d* when the flexible display 130 is viewed from above. In the embodiment, the first part 461*a* may include a first stepped portion 481*a* formed to be lower than the second part 461*b*. In the embodiment, the first buffer member 481 may be disposed by being attached to the first stepped portion 481*a*. In the embodiment, a thickness made by summing up the first thickness of the first part 461*a* and the thickness of the first buffer member 481 may be substantially equal to a second thickness of the second part 461*b*. Therefore, the first part 461*a* and the second part 461*b* of the first reinforcement plate 461 may be formed to have flat surfaces to support the support plate 450 by the first buffer member 481. In the embodiment, the buffer member may include a double-sided tape having flexibility or a bonding agent (e.g., an adhesive agent).

According to various embodiments, as illustrated in FIGS. 7B and 7C, the first reinforcement plate 461 may include a first plate 4611 extending from the first part 461*a* to the second part 461*b*, and a second plate 4612 stacked on the second part 461*b*. In the embodiment, the first plate 4611 and the second plate 4612 may be attached to each other by at least one of the processes including welding, fusing, bonding, and taping. The attachment structure between the two plates 4611 and 4612 may be advantageous in manufacturing the single first reinforcement plate 461 by using a metallic material of a thin plate and forming the first and second parts 461*a* and 461*b* having different thicknesses.

In any embodiment, as illustrated in FIG. 7D, a first reinforcement plate 461-1 may include the first part 461*a* formed to be lower than the peripheral portion by performing etching or mechanical processing on one plate 4613, such as a metal plate and/or a polymer plate.

In any embodiment, as illustrated in FIG. 7E, a first reinforcement plate 461-2 may include only the first part 461*a* formed to be lower than the peripheral portion (e.g., the second part 461*b*) in a state in which the first buffer member (e.g., the first buffer member 481 in FIG. 7C) is excluded.

According to various embodiments, the first reinforcement plate 461 disposed below the support plate 450 may be required to have a sufficient thickness to provide rigidity for supporting the flexible display 130. The sufficient thickness degrades bending properties of the folding area 130*c* and the first bending area 130*d* and forms marks, such as creases, which may degrade the surface quality of the flexible display 130. In case that the first reinforcement plate 461 has a sufficient thickness to satisfy the above-mentioned condition, the first reinforcement plate 461 may be configured not to be bent together with the support plate 450 in the folding area 130*c* and the first bending area 130*d*. Because the rotation trajectory of the first reinforcement plate 461 made by the operations of folding and unfolding the electronic device 100 needs to be considered, this structure may degrade the efficiency in disposing and designing the peripheral structure and hinder the slimming of the electronic device 100.

According to an embodiment of the disclosure, the first part 461*a* of the first reinforcement plate 461, which corresponds to the folding area 130*c* and the first bending area 130*d* may have a thickness t1 to improve the flexibility and have a structure for reinforcing the rigidity, and the remaining second part 461*b* (a part that is not involved in folding or bending) may have a sufficient thickness to reinforce the rigidity. For example, the first reinforcement plate 461 may have the first part 461*a* positioned from the folding area 130*c* to the first bending area 130*d*, and the first part 461*a* may have a thickness that allows the first part 461*a* to be bent. For example, the thickness t1 of the first part 461*a* may be set to about 100 μm or less. For example, the thickness of the second part 461*b* may be set to about 50 μm or more to improve the surface quality and durability of the part of the flexible display 130 that is not bent. In the embodiment, the first buffer member 481, which is disposed on the first part 461*a* to compensate for a thickness difference between the first part 461*a* and the second part 461*b* of the first reinforcement plate 461, may provide sufficient flexibility for the flexible display 130 in the folding area 130*c* and the first bending area 130*d* and include a material that may assist in improving the durability (e.g., impact resistance) of the flexible display 130.

According to various embodiments, the first buffer member 481 may include a first layer 4811, a second layer 4812 disposed between the first layer 4811 and the first part 461*a*, and a third layer 4813 disposed between the first layer 4811 and the support plate 450. In the embodiment, the first buffer member 481 may be formed as a tape-type buffer member and disposed by being attached to the first part 461*a*. In the embodiment, the first layer 4811 may include a non-Newtonian material. For example, the non-Newtonian material may include a viscoelastic material having a high viscosity with respect to external resistance (impact) in a high-rate area and having a low viscosity in a low-rate area, such as the folding operation. For example, the non-Newtonian material may have a high modulus of 1 GPa or more in the high-rate area (e.g., 1E+05 rad/s) and have a low modulus of 1 GPa or less in the low-rate area (e.g., 1E-05 rad/s). In the embodiment, the non-Newtonian material may include elastic polymer, such as elastomer polyurethane (EPU). In the embodiment, the second layer 4812 may include a bonding layer. In the embodiment, the bonding layer may include at least one of an optical clear adhesive (OCA), a pressure sensitive adhesive (PSA), a thermally reactive bonding agent, a general bonding agent, and a double-sided tape. In the embodiment, the third layer 4813 may include a protective layer. In the embodiment, the third layer 4813 may include a polyethylene terephthalate (PET) layer as a protective layer for protecting the second layer 4812. In the embodiment, the third layer 4813 may be disposed by being brought into contact with the support plate 450 instead of being attached to the support plate 450, thereby coping with a slip between the first buffer member 481 and the support plate 450 caused by the operation of folding and unfolding the electronic device 100. Therefore, the first buffer member 481 may include a coating layer 4814 disposed between the protective layer (e.g., the third layer 4813) and the support plate 450 and configured to assist in reducing a frictional force with the support plate 450. In the embodiment, the coating layer 4814 may include a hard coating layer or a Teflon coating layer. In any embodiment, the protective layer or the coating layer 4814 may be excluded.

In case that the first reinforcement plate 461 according to an embodiment of the disclosure is disposed below the support plate 450 to support the flexible display 130, the first reinforcement plate 461 may be bent together with the support plate 450 in the folded state by the first part 461*a* having a relatively small thickness. In the embodiment, in the unfolded state, the first reinforcement plate 461 may provide improved durability (e.g., impact resistance) by a high resistive force of the first buffer member 481 including the non-Newtonian material against an external impact generated from an outer surface of the flexible display 130.

According to various embodiments, the second reinforcement plate 462 may include a third part 462*a* having a third thickness and disposed from a second edge E2, which is close to the folding axis F, to a position corresponding to the second bending area 130*e*, a fourth part 462*b* extending from the third part 462*a* having a fourth thickness greater than the third thickness, and a second buffer member 482 disposed between the third part 462*a* and the support plate 450. In any embodiment, the third part 462*a* may extend to the second bending area 130*e* or beyond the second bending area 130*e* from at least a part of the folding area 130*c* even though the third part 462*a* is not disposed from the second edge E2. In the embodiment, the third part 462*a* may be disposed at a position that at least overlaps the folding area 130*c* and the second bending area 130*e* when the flexible display 130 is viewed from above. In the embodiment, the third part 462*a* may include a second stepped portion 482*a* formed to be lower than the fourth part 462*b*. In the embodiment, the second buffer member 482 may be disposed by being attached to the second stepped portion 482*a*. In the embodiment, the third thickness may be substantially equal to the first thickness. In the embodiment, the fourth thickness may be substantially equal to the second thickness. In the embodiment, the stacked structure and arrangement structure of the second buffer member 482 may be substantially identical to those of the first buffer member 481.

According to various embodiments, the support plate 450 may include a first recess 455*a* that is a pattern at least corresponding to the first bending area 130*d* and formed at a position on a surface directed toward the first reinforcement plate 461. In the embodiment, the support plate 450 may be formed to have a thickness t2 relatively less than a thickness of the peripheral portion by means of the first recess 455*a* formed at the position corresponding to the first bending area 130*d*, which may assist in improving the flexibility of the first bending area 130*d*. In the embodiment, in case that the support plate 450 is made of a metallic material, the first recess 455*a* may be formed by wet etching. In the embodiment, in case that the support plate 450 is made of an FRP material, the first recess 455*a* may be formed by laser etching. In the embodiment, in case that the support plate 450 is made of a polymer material, the first recess 455*a* may be formed by an injection molding process or a computerized numerical control (CNC) process. In the embodiment, the thickness t2 of the support plate 450 corresponding to the first recess 455*a* may be determined within a range of 0%<t2≤60% with respect to a thickness of a peripheral support plate. In the embodiment, the thickness of the peripheral support plate may be about 120 μm or more. In the embodiment, the thickness 12 of the support plate 450, which corresponds to the first recess 455*a*, may be about 10 μm or more. In the embodiment, the support plate 450 may include a first elastic member 455 accommodated in the first recess 455*a*. In the embodiment, the first elastic member 455 may have substantially the same stacked structure as the first buffer member 481 and/or the second buffer member 482. For example, the first elastic member 455 may include a first layer 4551 including a non-Newtonian material, a second layer 4552 disposed between the first layer 4551 and the support plate 450 and including a bonding layer, and a third layer 4553 including a protective layer disposed between the first layer 4551 and the blocking member 4532. In the embodiment, the third layer 4553 may be disposed by being brought into contact with the blocking member 4532 instead of being attached to the blocking member 4532. In the embodiment, the support plate 450 may further include a coating layer 4554 disposed between the protective layer (e.g., the third layer 4553) and the blocking member 4532. In any embodiment, the support plate 450 may include a tape member (e.g., a Poron tape) or bonding member having elasticity and accommodated in the first recess 455*a*, instead of the first elastic member 455. In any embodiment, the first recess 455*a* and the first elastic member 455 may be excluded. In any embodiment, the first elastic member 455 may be excluded. In the embodiment, the thickness 12 of the support plate 450 corresponding to the first recess 455*a* may be greater than the thickness t1 of the first reinforcement plate 461 corresponding to the first part 461*a*. In the embodiment, at least a part of an inner edge of the first recess 455*a*, to which the first elastic member 455 is applied, may be formed in a curved shape having a designated curvature. In the embodiment, at least a part of an inner edge of the first stepped portion 481*a*, to which the first buffer member 481 is applied, may also be formed in a curved shape having a designated curvature.

According to various embodiments, the support plate 450 may include a second recess 455*b* that is a pattern at least corresponding to the second bending area 130*e* and formed at a position on a surface directed toward the second reinforcement plate 462. In the embodiment, the support plate 450 may be formed to have a thickness relatively less than a thickness of the peripheral portion by means of the second recess 455*b* formed at the position corresponding to the second bending area 130*e*, which may assist in improving the flexibility of the second bending area 130*e*. In the embodiment, the support plate 450 may include a second elastic member 456 accommodated in the second recess 455*b*. In the embodiment, the second elastic member 456 may have substantially the same stacked structure and arrangement structure as the first elastic member 455. In any embodiment, the first recess 455*a* and the second recess 455*b* may be formed in a surface of the support plate 450 directed toward the polymer layer 440 in the first bending area 130*d* and the second bending area 130*e* of the flexible display 130. In any embodiment, the first recess 455*a* and/or the second recess 455*b* formed in the support plate 450 may be excluded. In any embodiment, the blocking member 4532 and/or the bonding layer PI may be excluded from the first bending area 130*d* and/or the second bending area 130*e*.

Figure 8A:
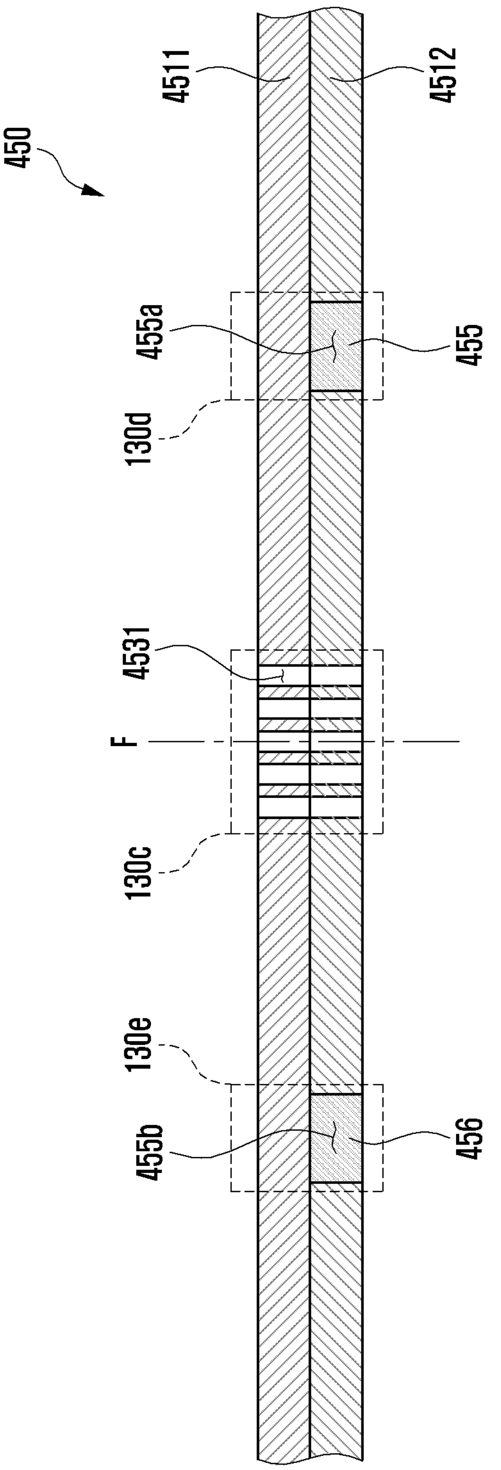
FIGS. 8A and 8B are partially cross-sectional views of a support plate according to various embodiments of the disclosure.
Figure 8B:
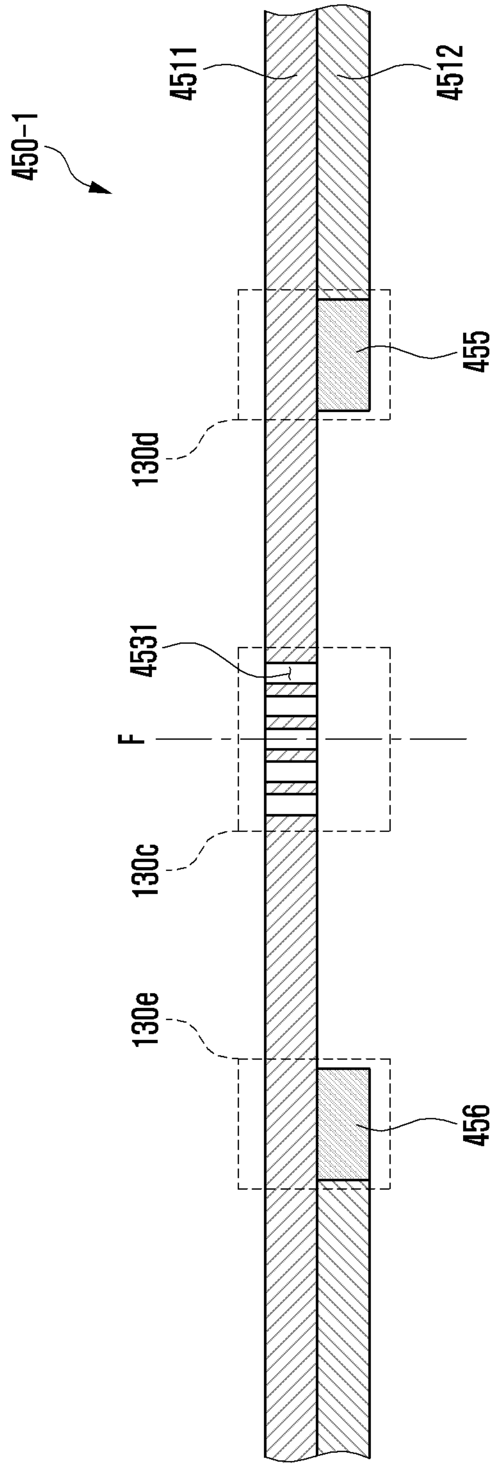

FIGS. 8A and 8B are partially cross-sectional views of a support plate according to various embodiments of the disclosure.

Referring to FIG. 8A, the support plate 450 may be formed by stacking first and second plates 4511 and 4512 made of a metallic (e.g., stainless steel) or nonmetallic (FRP) thin plate material. In the embodiment, the first plate 4511 and the second plate 4512 may be formed by at least one of the processes including welding, fusing, bonding, and taping. In this case, the first plate 4511 and the second plate 4512 may include first patterns 4531 positioned at a position corresponding to the folding area 130*c* of the flexible display (e.g., the flexible display 130 in FIG. 7A). In the embodiment, the second plate 4512 may include the first recess 455*a* and the second recess 455*b* formed by excluding the positions corresponding to the first bending area 130*d* and the second bending area 130*e* of the flexible display. In the embodiment, the support plate 450 may include the first elastic member 455 and the second elastic member 456 respectively accommodated in the first recess 455*a* and the second recess 455*b*.

Referring to FIG. 8B, a support plate 450-1 may be formed so that a corresponding section of the second plate 4512 from the first bending area 130*d* to the second bending area 130*e* of the flexible display (e.g., the flexible display 130 in FIG. 7A) is excluded from the configuration of the support plate 450 in FIG. 8A. In this case, the support plate 450-1 may include the first elastic member 455 and the second elastic member 456 disposed in the first plate in a section corresponding to the first bending area 130*d* and a section corresponding to the second bending area 130*e*. In any embodiment, the support plates 450 and 450-1 may be formed as a single plate having a designated thickness.

Figure 9:
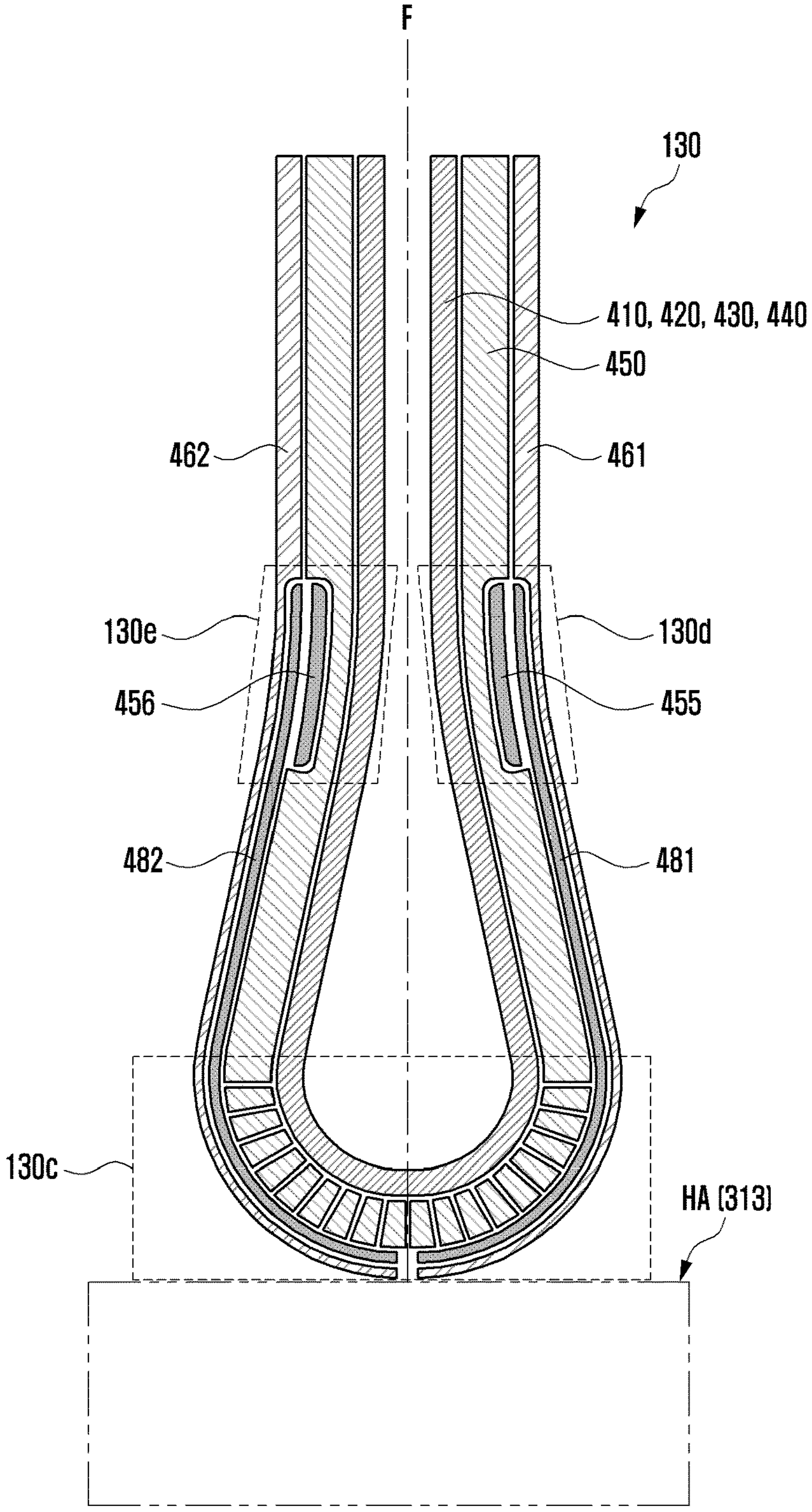
FIG. 9 is a partially cross-sectional view of a flexible display in a folded state according to an embodiment of the disclosure.

FIG. 9 is a partially cross-sectional view of a flexible display in a folded state according to an embodiment of the disclosure.

Referring to FIG. 9, the flexible display 130 may include the folding area 130*c* corresponding to the hinge assembly HA, the first bending area 130*d* disposed at one side of the folding area 130*c* based on the folding axis F, and the second bending area 130*e* disposed at the other side of the folding area 130*c* based on the folding axis F. In the embodiment, the flexible display 130 may include the window layer 410 and the polarizing layer 420, the display panel 430, the polymer layer 440, and the support plate 450 sequentially disposed below the window layer 410. In the embodiment, the flexible display 130 may include the first reinforcement plate 461 disposed below the support plate 450 and disposed at the position corresponding to at least a part of the first housing (e.g., the first housing 110 in FIG. 7A). In the embodiment, the flexible display 130 may include the second reinforcement plate 462 disposed below the support plate 450, disposed at the position corresponding to at least a part of the second housing (e.g., the second housing 120 in FIG. 7A), and disposed to be spaced apart from the first reinforcement plate 461. In the embodiment, at least a part of the first reinforcement plate 461 and at least a part of the second reinforcement plate 462 may be disposed to be supported by at least a part (e.g., the center plate 313) of the hinge assembly HA. Therefore, the first reinforcement plate 461 and the second reinforcement plate 462 are bent together with the support plate 450 in the folding area 130*c* by the operations of folding and unfolding the flexible display 130, which may assist in improving the efficiency in disposing the peripheral structure.

According to various embodiments, the flexible display 130 may include the first buffer member 481 disposed on a part (e.g., the first part 461*a* in FIG. 7A) of the first reinforcement plate 461 from the folding area 130*c* to the first bending area 130*d*, and the second buffer member 482 disposed on a part (e.g., the third part 462*a* in FIG. 7A) of the second reinforcement plate 462 from the folding area 130*c* to the second bending area 130*e*. In the embodiment, the flexible display 130 may include the first elastic member 455 disposed in the first recess (e.g., the first recess 455*a* in FIG. 7A) formed in the support plate 450 in the first bending area 130*d*, and the second elastic member 456 disposed in the second recess (e.g., the second recess 455*b* in FIG. 7A) formed in the support plate 450 in the second bending area 130*e*. In the embodiment, the first elastic member 455 is disposed to overlap a part of the first buffer member 481, and the second elastic member 456 is disposed to overlap a part of the second buffer member 482, which may assist in improving the flexibility in the first and second bending areas 130*d* and 130*e*.

In case that the first reinforcement plate 461 and the second reinforcement plate 462 according to an embodiment of the disclosure are disposed below the support plate 450 to support the flexible display 130, the first reinforcement plate 461 and the second reinforcement plate 462 may be bent together with the support plate 450 in the folded state by the arrangement area (e.g., the first part 461*a* in FIG. 7A) of the first buffer member 481 having a relatively small thickness and the arrangement area (e.g., the third part 462*a* in FIG. 7A) of the second buffer member 482. In the embodiment, in the unfolded state, the first reinforcement plate 461 and the second reinforcement plate 462 may provide improved durability (e.g., impact resistance), which is capable of reducing damage to the flexible display 130, by high resistive forces of the first buffer member 481, the second buffer member 482, the first elastic member 455, and the second elastic member 456 including non-Newtonian materials against an external impact generated from the outer surface of the flexible display 130.

FIGS. 10A, 10B, 10C, 10D, 10E, 10F, 10G, and 10H are partially cross-sectional views of an electronic device according to various embodiments of the disclosure.

To describe the electronic device 100 in FIGS. 10A to 10H, the constituent elements, which are substantially the same as the constituent elements of the electronic device 100 in FIG. 7A, will be designated by the same reference numerals, and a detailed description thereof will be omitted.

Figure 10A:
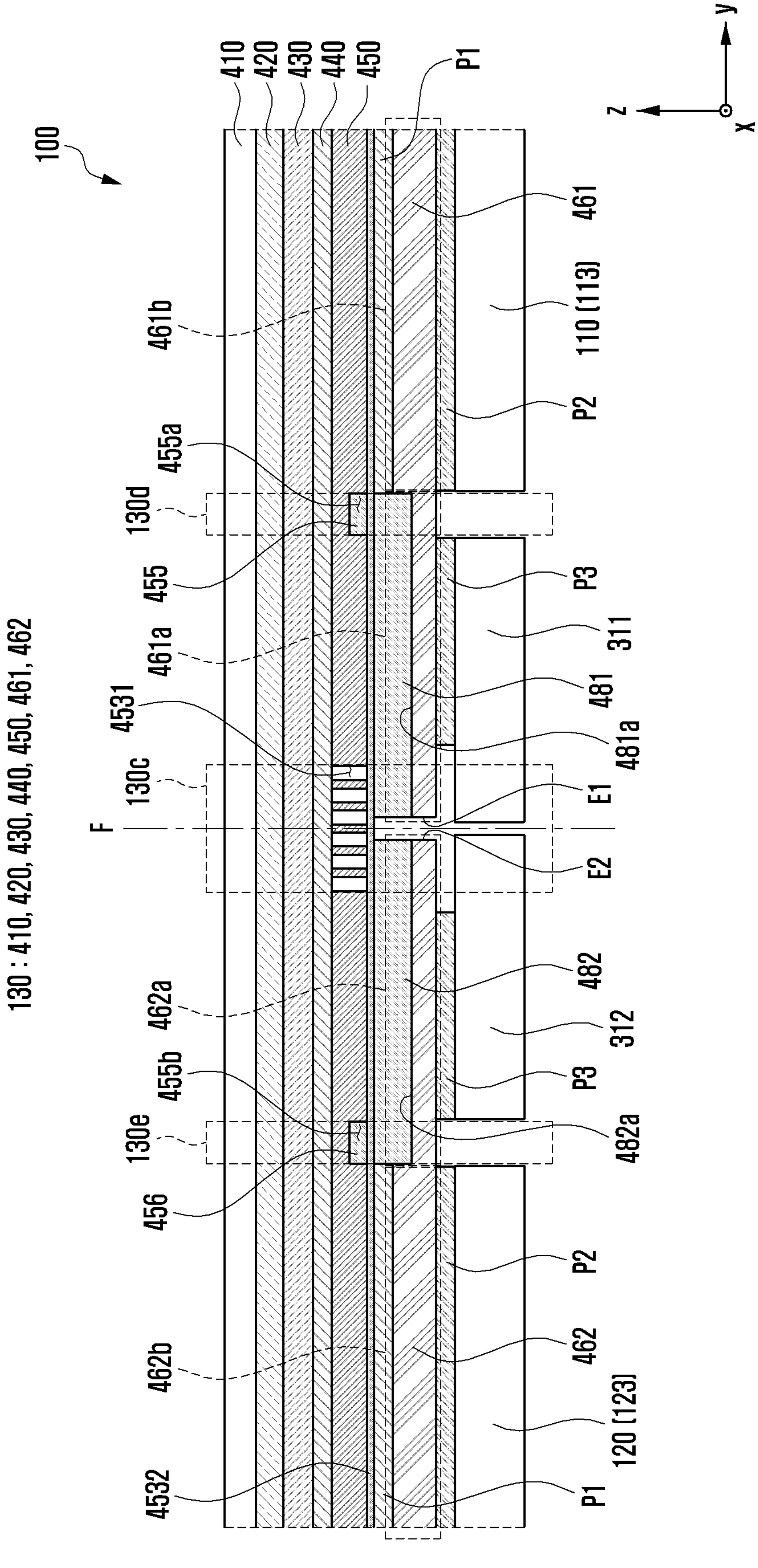
FIGS. 10A, 10B, 10C, 10D, 10E, 10F, 10G, and 10H are partially cross-sectional views of an electronic device according to various embodiments of the disclosure.

Referring to FIG. 10A, the electronic device 100 may include the first reinforcement plate 461 disposed between the support plate 450 and the first housing 110, and the second reinforcement plate 462 disposed between the support plate 450 and the second housing 120. In the embodiment, the first buffer member 481, which is disposed on the first part 461*a* of the first reinforcement plate 461, and the second buffer member 482, which is disposed on the third part 462*a* of the second reinforcement plate 462, may be disposed by being brought into direct contact with the blocking member 4532. In the embodiment, the first buffer member 481 may be disposed to be higher than the second part 461*b* of the first reinforcement plate 461, and the second buffer member 482 may be disposed to be higher than the fourth part 462*b* of the second reinforcement plate 462. In this case, the bonding layer PI may be excluded from the areas corresponding to the first buffer member 481 and the second buffer member 482. In any embodiment, the first recess 455*a* and/or the second recess 455*b* formed in the support plate 450 may be excluded.

Figure 10B:
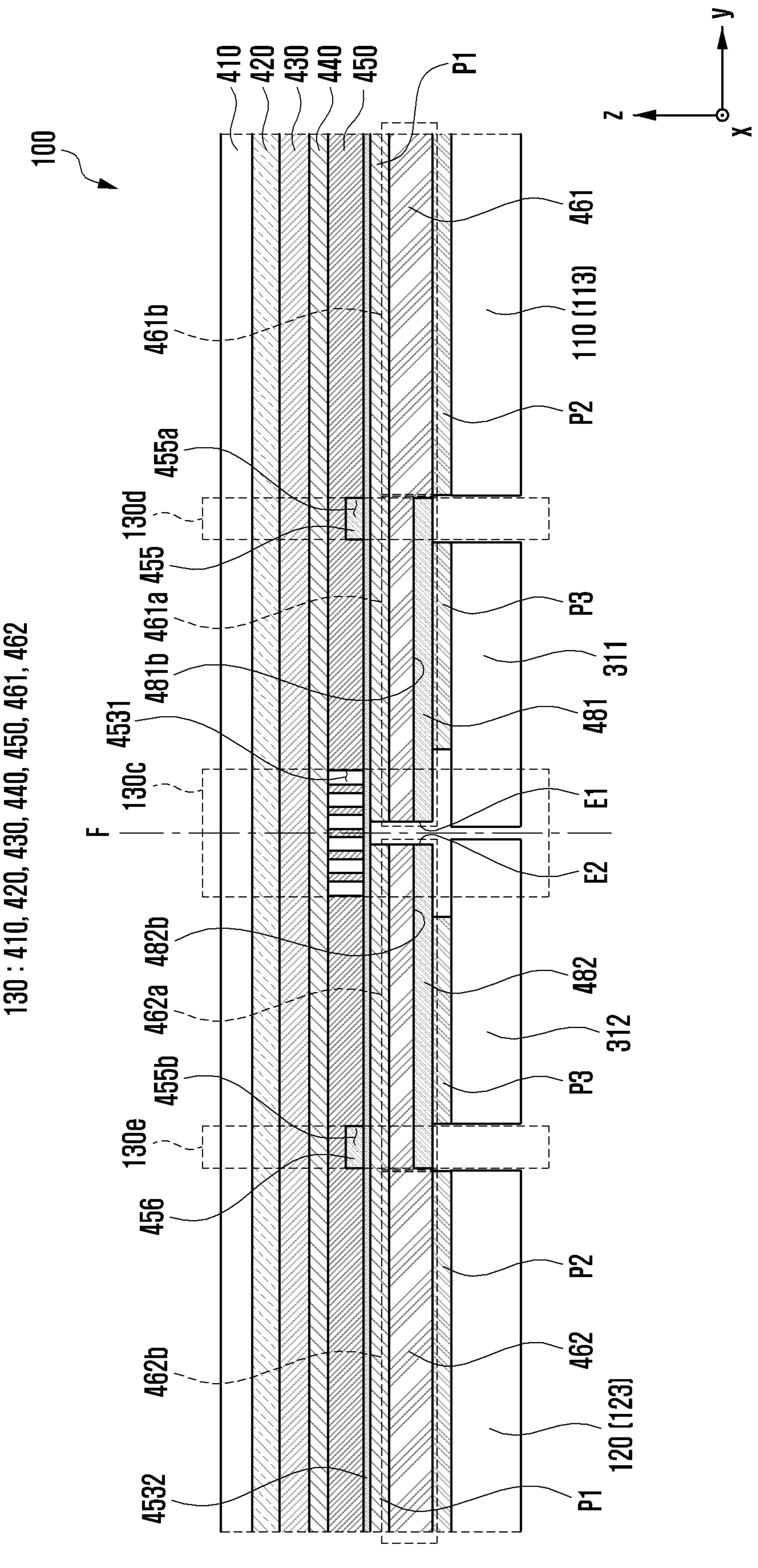

Referring to FIG. 10B, the electronic device 100 may include the first reinforcement plate 461 disposed between the support plate 450 and the first housing 110, and the second reinforcement plate 462 disposed between the support plate 450 and the second housing 120. In the embodiment, the first buffer member 481 may be disposed on a first stepped portion 481*b* formed on the first part 461*a* on a surface (e.g., a lower surface) of the first reinforcement plate 461 corresponding to the first hinge plate 311. In the embodiment, the second buffer member 482 may be disposed on a second stepped portion 482*b* formed on the third part 462*a* on a surface (e.g., a lower surface) of the second reinforcement plate 462 corresponding to the second hinge plate 312. In any embodiment, the first buffer member 481 and/or the second buffer member 482 may be excluded. In any embodiment, the first recess 455*a* and/or the second recess 455*b* formed in the support plate 450 may be excluded. In any embodiment, the blocking member 4532 and/or the bonding layer PI may be excluded from the first bending area 130*d* and/or the second bending area 130*e*.

Figure 10C:
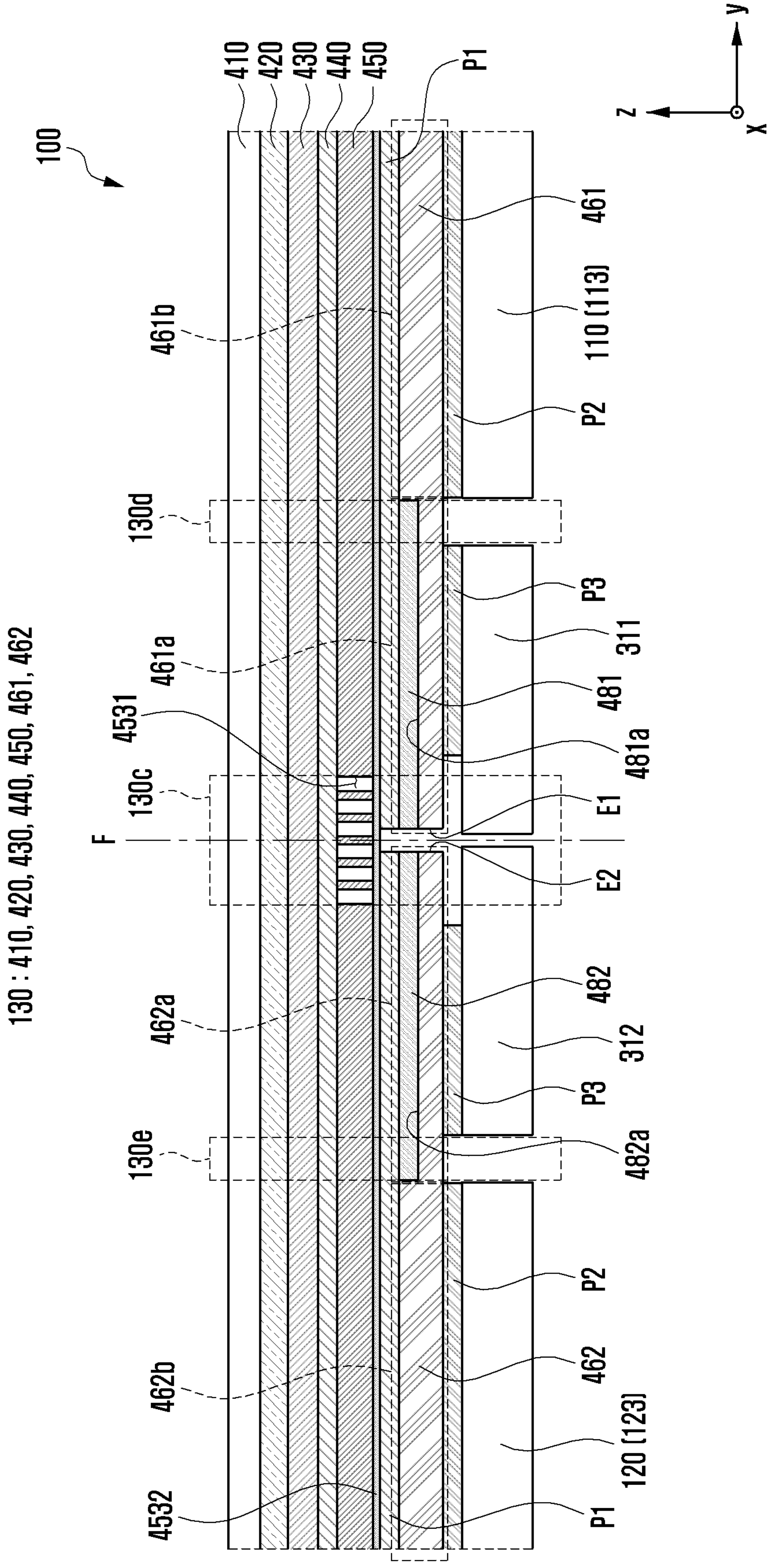

Referring to FIG. 10C, the electronic device 100 may include the first reinforcement plate 461 disposed between the support plate 450 and the first housing 110, and the second reinforcement plate 462 disposed between the support plate 450 and the second housing 120. In the embodiment, the flexible display 130 may include the support plate 450 from which the first recess 455*a*, the first elastic member 455 accommodated in the first recess 455*a*, the second recess 455*b*, and the second elastic member 456 accommodated in the second recess 455*b* are excluded. In any embodiment, the first buffer member 481 and/or the second buffer member 482 may be excluded. In any embodiment, the blocking member 4532 and/or the bonding layer P1 may be excluded from the first bending area 130*d* and/or the second bending area 130*e*.

Figure 10D:
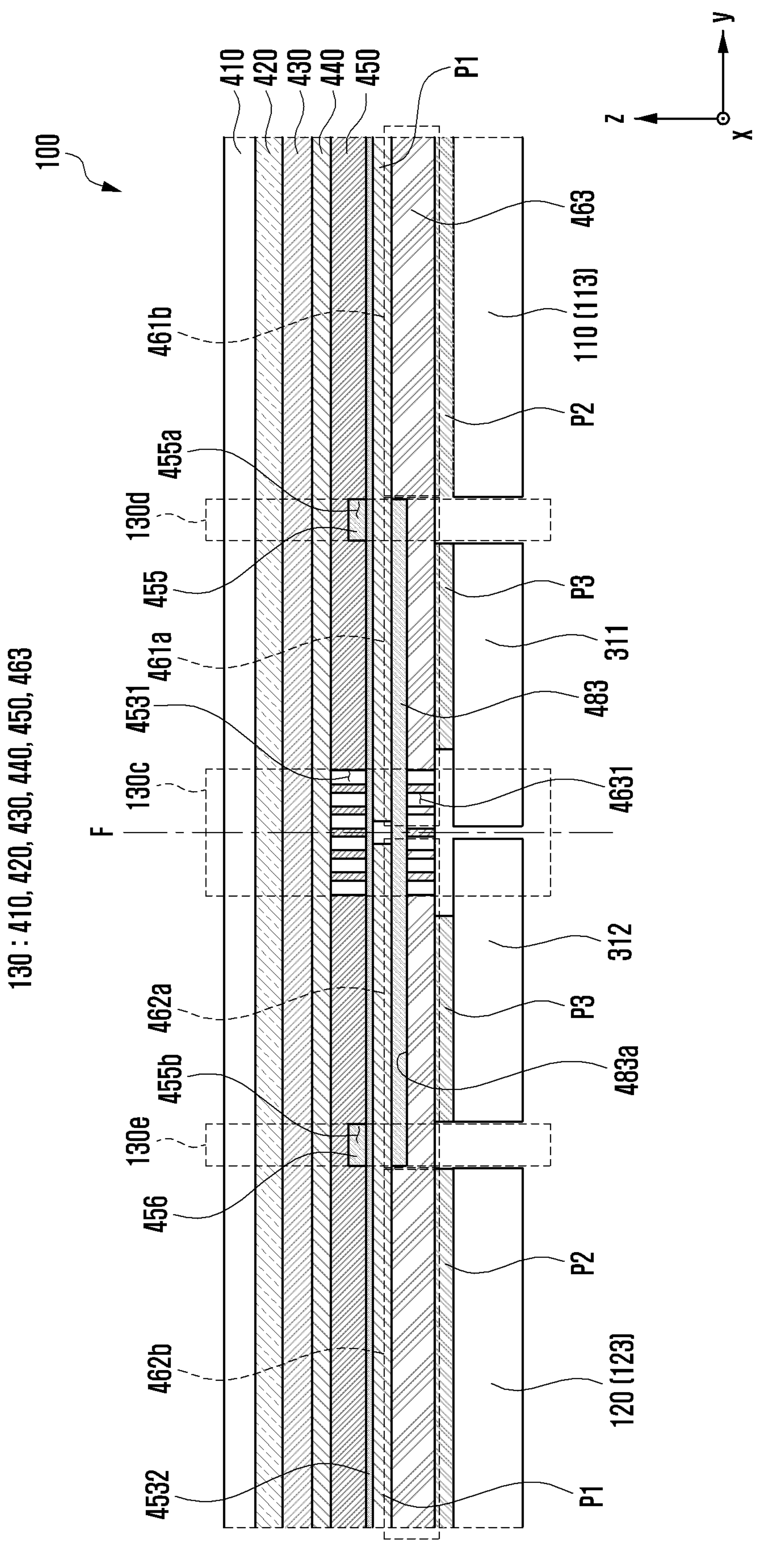

Referring to FIG. 10D, the electronic device 100 may also include the support plate 450, and a single reinforcement plate 463 disposed between the first housing 110 and the second housing 120. In this case, the single reinforcement plate 463 may include a stepped portion 483*a* extending seamlessly from the first bending area 130*d* to the second bending area 130*e* through the folding area 130*c* and formed to be lower than the peripheral portion. In the embodiment, the single reinforcement plate 463 may include a second pattern 4631 formed in an area corresponding to the folding area 130*c*. In the embodiment, the second pattern 4631 may include a plurality of openings formed through the single reinforcement plate 463 in the perpendicular direction (e.g., the z-axis direction), and/or a plurality of recesses formed at a designated depth from an outer surface (e.g., an upper surface and/or a rear surface) of the single reinforcement plate 463. In the embodiment, the single reinforcement plate 463 may include a single buffer member 483 disposed on the stepped portion 483*a*. In this case, the blocking member 4532 may be excluded. In any embodiment, the single buffer member 483 may be excluded. In any embodiment, the first recess 455*a* and/or the second recess 455*b* formed in the support plate 450 may be excluded. In any embodiment, the blocking member 4532 and/or the bonding layer PI may be excluded from the first bending area 130*d* and/or the second bending area 130*e*.

Figure 10E:
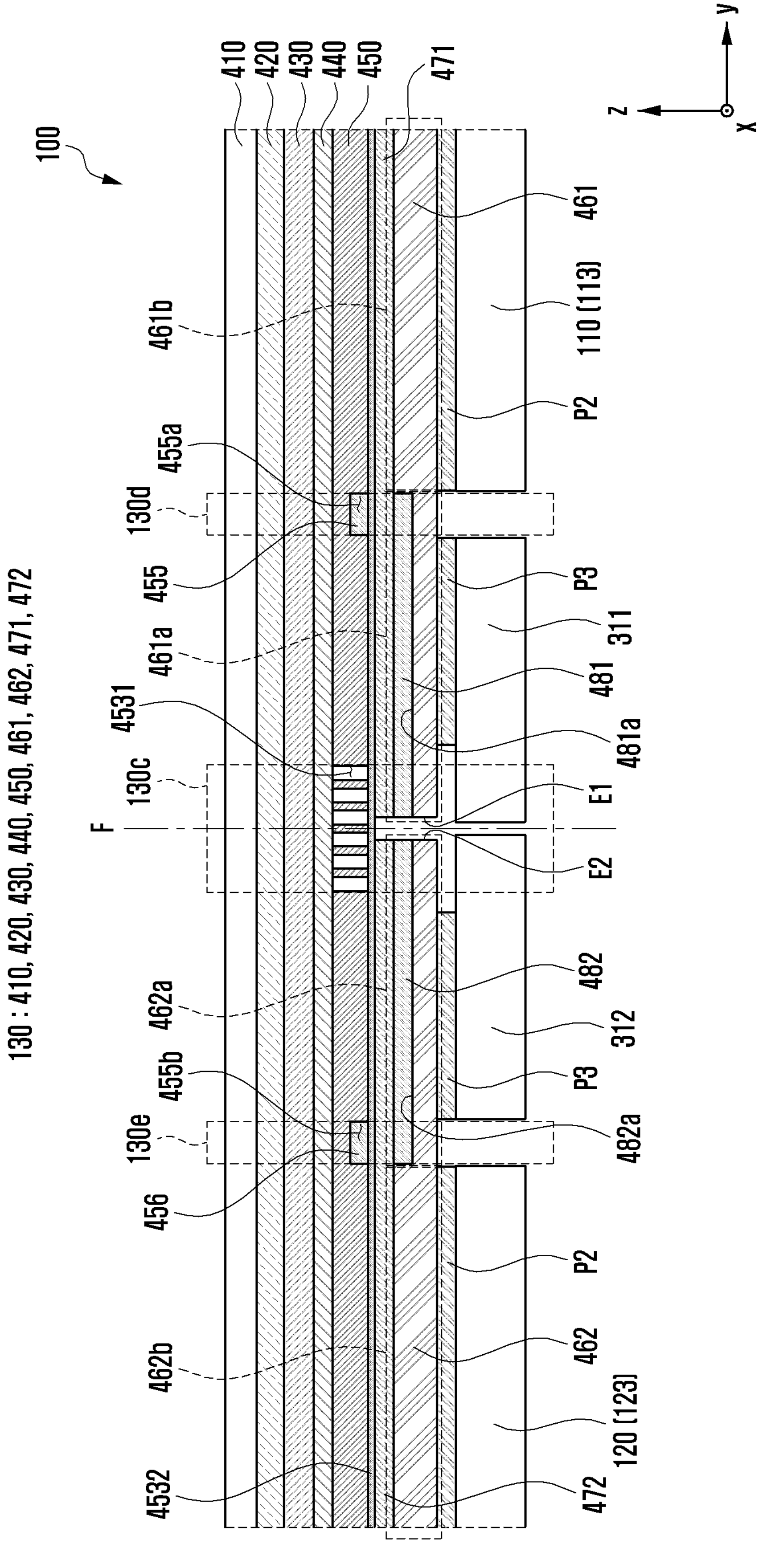

Referring to FIG. 10E, the electronic device 100 may include the first digitizer 471 disposed between the first reinforcement plate 461 and the support plate 450, and the second digitizer 472 disposed between the second reinforcement plate 462 and the support plate 450. In the embodiment, the first buffer member 481 may be disposed by being brought into contact with the first digitizer 471 instead of being attached to the first digitizer 471. In the embodiment, the second buffer member 482 may be disposed by being brought into contact with the second digitizer 472 instead of being attached to the second digitizer 472. In the embodiment, the first digitizer 471 may be electrically connected to the first substrate (e.g., the first substrate 161 in FIG. 3) disposed in the first housing 110. In the embodiment, the second digitizer 472 may be electrically connected to the second substrate (e.g., the second substrate 162 in FIG. 3) disposed in the second housing 120 and electrically connected to the first substrate (e.g., the first substrate 161 in FIG. 3). In any embodiment, the first digitizer 471 and the second digitizer 472 may be integrated. In any embodiment, the first buffer member 481 and/or the second buffer member 482 may be excluded. In any embodiment, the first recess 455*a* and/or the second recess 455*b* formed in the support plate 450 may be excluded. In any embodiment, the blocking member 4532 may be excluded from the first bending area 130*d* and/or the second bending area 130*e*.

Figure 10F:
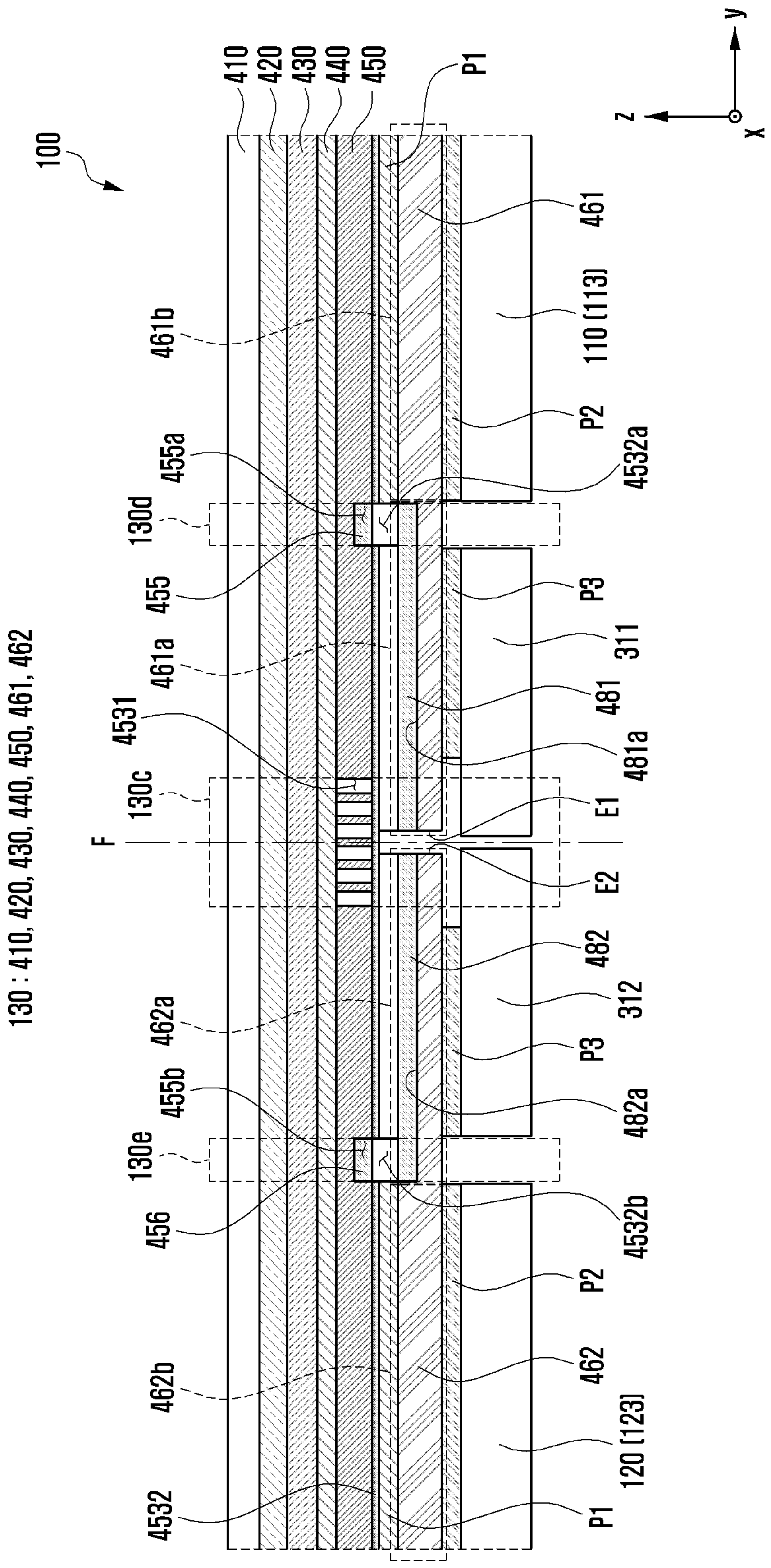

Referring to FIG. 10F, the electronic device 100 may include the first reinforcement plate 461 disposed between the support plate 450 and the first housing 110, and the second reinforcement plate 462 disposed between the support plate 450 and the second housing 120. In the embodiment, the first buffer member 481, which is disposed on the first part 461*a* of the first reinforcement plate 461, and the second buffer member 482, which is disposed on the third part 462*a* of the second reinforcement plate 462, may be disposed so as not to be in contact with any layer at upper portions thereof. In this case, the upper portion of the first buffer member 481 includes a first cavity 4532*a* at a position corresponding to the first bending area 130*d*, and the upper portion of the second buffer member 482 corresponding to the second bending area 130*e* includes a second cavity 4532*b*, which may assist in improving the flexibility of the first and second bending areas 130*d* and 130*e*. In any embodiment, the first buffer member 481 and/or the second buffer member 482 may be excluded. In any embodiment, the first recess 455*a* and/or the second recess 455*b* formed in the support plate 450 may be excluded.

Figure 10G:
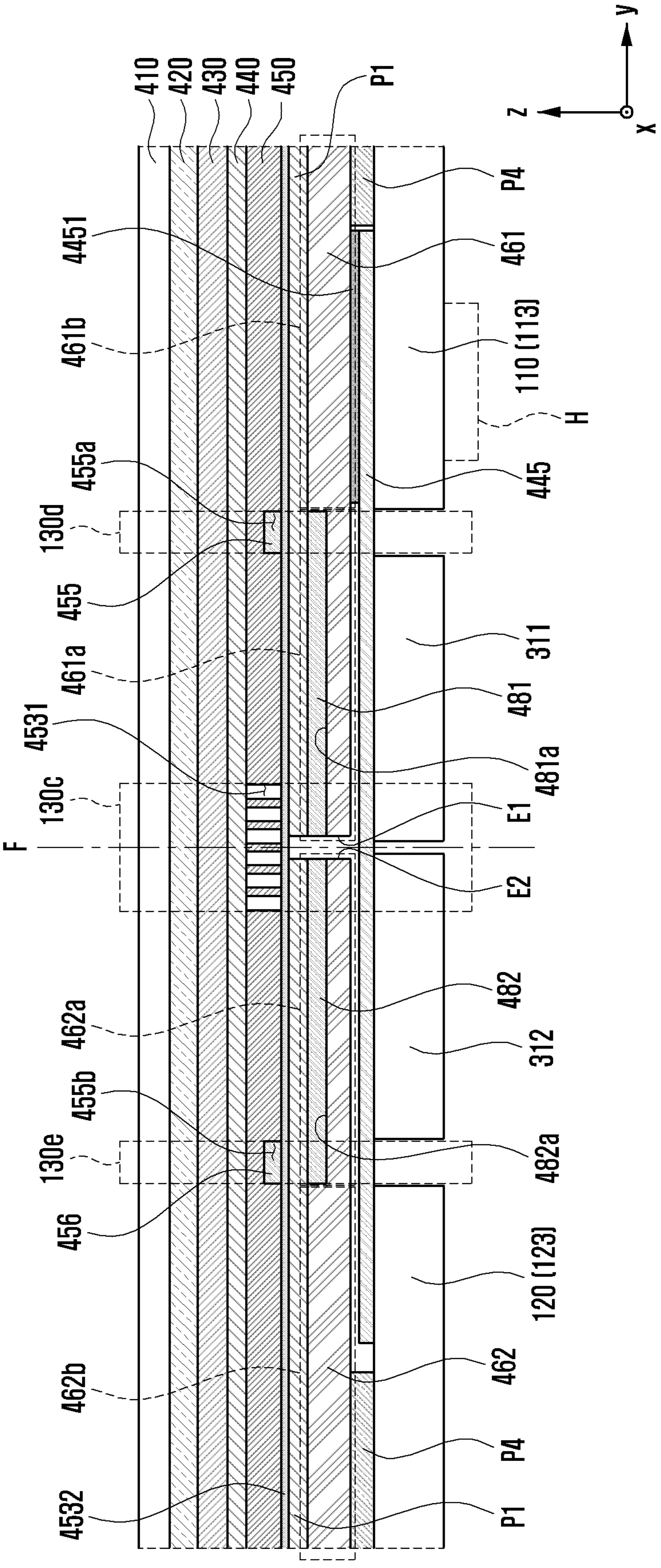

Referring to FIG. 10G, the electronic device 100 may include the first reinforcement plate 461 disposed between the support plate 450 and the first housing 110, and the second reinforcement plate 462 disposed between the support plate 450 and the second housing 120. In the embodiment, the electronic device 100 may include the heat dissipation member 445 (e.g., the graphite sheet) disposed between at least a part of each of the first and second reinforcement plates 461 and 462 and at least a part of each of the first and second housings 110 and 120. In the embodiment, the heat dissipation member 445 may be attached to the first reinforcement plate 461 by means of a bonding member 4451 (e.g., a double-sided tape) at a position corresponding to at least a part of the first housing 110. This may assist in quickly recovering heat generated from a heat generation component H (e.g., a processor)

disposed in the first housing. In the embodiment, the heat dissipation member 445 may be disposed so as not to be attached to at least a part of the second housing 120, the second hinge plate 312, and/or the first hinge plate 311. This non-attached structure may slide (slip) a part of the heat dissipation member 445 during the operation of folding the electronic device 100, thereby assisting in inducing a smooth operation of the electronic device 100. According to the embodiment, the electronic device 100 may include a bonding member P4 disposed in an area between the first housing 110 and the first reinforcement plate 461 in which the heat dissipation member 445 is not attached, and/or an area between the second housing 120 and the second reinforcement plate 462 in which the heat dissipation member 445 is not disposed. The bonding member P4 may assist in compensating for the thickness of the heat dissipation member 445 and reinforcing attachment forces between the first and second housings 110 and 120 and the first and second reinforcement plates 461 and 462.

Figure 10H:
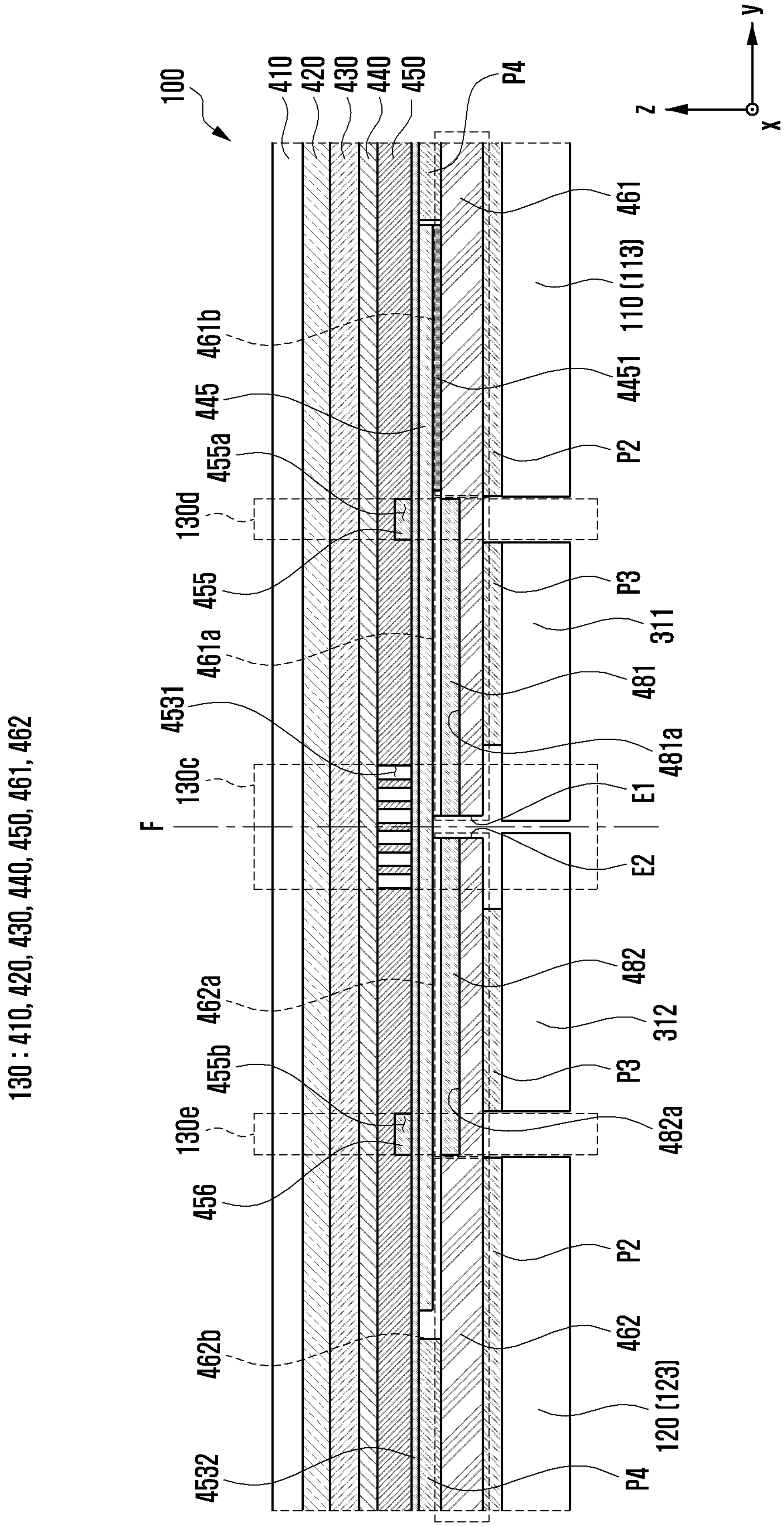

Referring to FIG. 10H, the heat dissipation member 445 may also be disposed between at least a part of each of the first and second reinforcement plates 461 and 462 and the support plate 450. In this case, the heat dissipation member 445 may be disposed by being attached to at least a part of the first reinforcement plate 461 by means of the bonding member 4451 without being attached to the second reinforcement plate 462. According to the embodiment, the electronic device 100 may include the bonding member P4 disposed in an area between the first reinforcement plate 461 and the support plate 450 in which the heat dissipation member 445 is not attached, and/or an area between the second reinforcement plate 462 and the support plate 450 in which the heat dissipation member 445 is not disposed. The bonding member P4 may assist in compensating for the thickness of the heat dissipation member 445 and reinforcing attachment forces between the support plate 450 and the first and second reinforcement plates 461 and 462.

FIGS. 11A, 11B, 11C, 11D, 11E, 11F, 11G, 11H, and 11I are partially cross-sectional views of an electronic device according to various embodiments of the disclosure.

To describe the electronic device 100 in FIGS. 11A to 11I, the constituent elements, which are substantially the same as the constituent elements of the electronic device 100 in FIG. 7A, will be designated by the same reference numerals, and a detailed description thereof will be omitted.

Figure 11A:
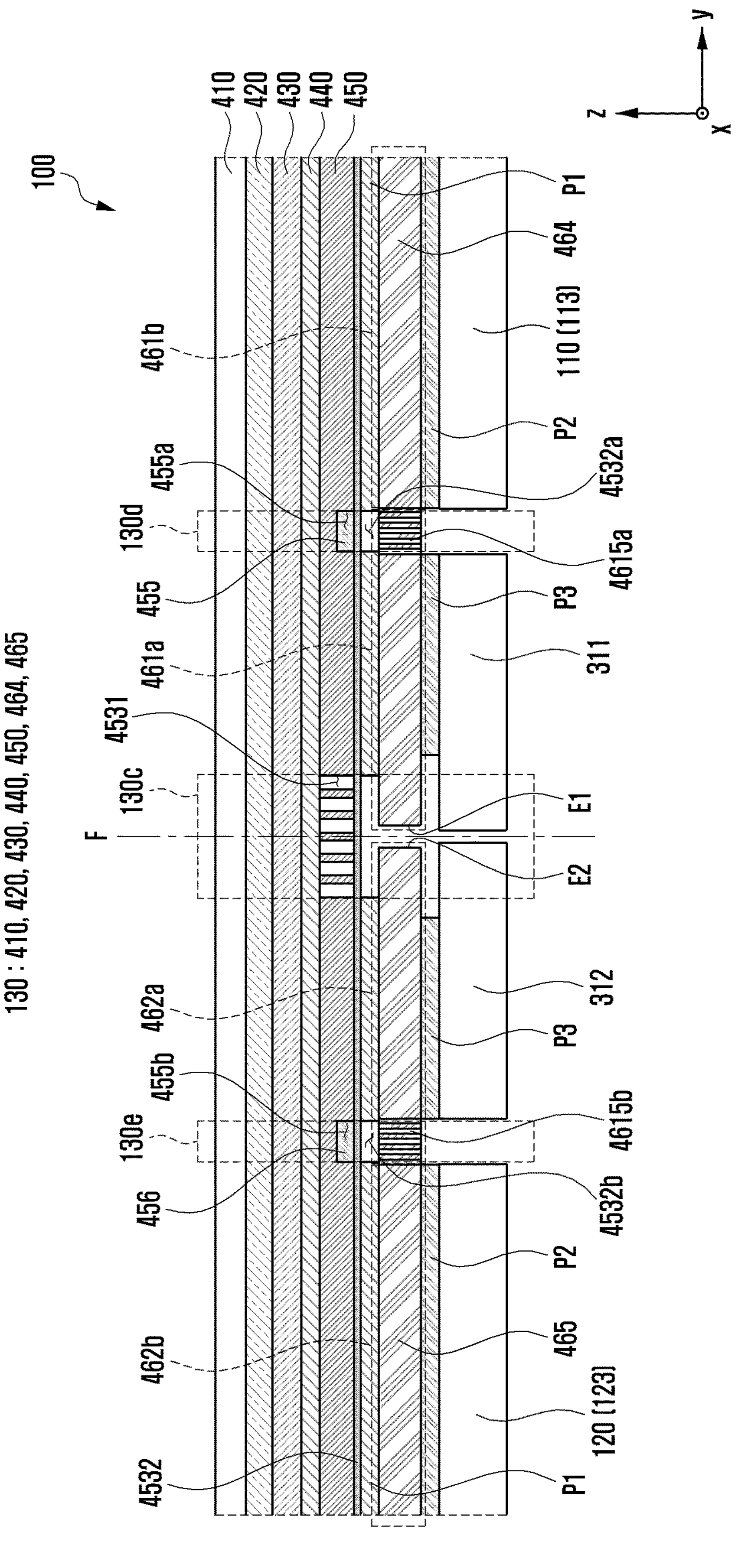
FIGS. 11A, 11B, 11C, 11D, 11E, 11F, 11G, 11H, and 11I are partially cross-sectional views of an electronic device according to various embodiments of the disclosure.

Referring to FIG. 11A, the electronic device 100 may include a first reinforcement plate 464 at least partially disposed between the support plate 450 and the first housing 110, and a second reinforcement plate 465 at least partially disposed between the support plate 450 and the second housing 120. In the embodiment, the first reinforcement plate 464 may include a second pattern 4615*a* positioned at a position corresponding to the first bending area 130*d*. In the embodiment, the second reinforcement plate 465 may include a third pattern 4615*b* positioned at a position corresponding to the second bending area 130*e*. In the embodiment, the second pattern 4615*a* may include a plurality of openings formed through the first reinforcement plate 464 from an upper surface to a rear surface of the first reinforcement plate 464, and/or a plurality of recesses formed at a designated depth from the upper surface or the rear surface. In the embodiment, the third pattern 4615*b* may include a plurality of openings formed through the second reinforcement plate 465 from an upper surface to a rear surface of the second reinforcement plate 465, and/or a plurality of recesses formed at a designated depth from the upper surface or the rear surface. In the embodiment, the first cavity 4532*a*, from which the bonding layer PI is excluded, may be included between the second pattern 4615*a* of the first reinforcement plate 464 and the first recess 455*a* of the support plate 450. In the embodiment, the second cavity 4532*b*, from which the bonding layer PI is excluded, may be included between the third pattern 4615*b* of the second reinforcement plate 465 and the second recess 455*b* of the support plate 450. In the embodiment, the first cavity 4532*a*, the second cavity 4532*b*, the second pattern 4615*a*, and the third pattern 4615*b* may assist in improving the flexibility in the first bending area 130*d* and the second bending area 130*e* of the flexible display 130. In any embodiment, the first recess 455*a* and/or the second recess 455*b* formed in the support plate 450 may be excluded. In any embodiment, the blocking member 4532 may be excluded from the first bending area 130*d* and/or the second bending area 130*e*.

Figure 11B:
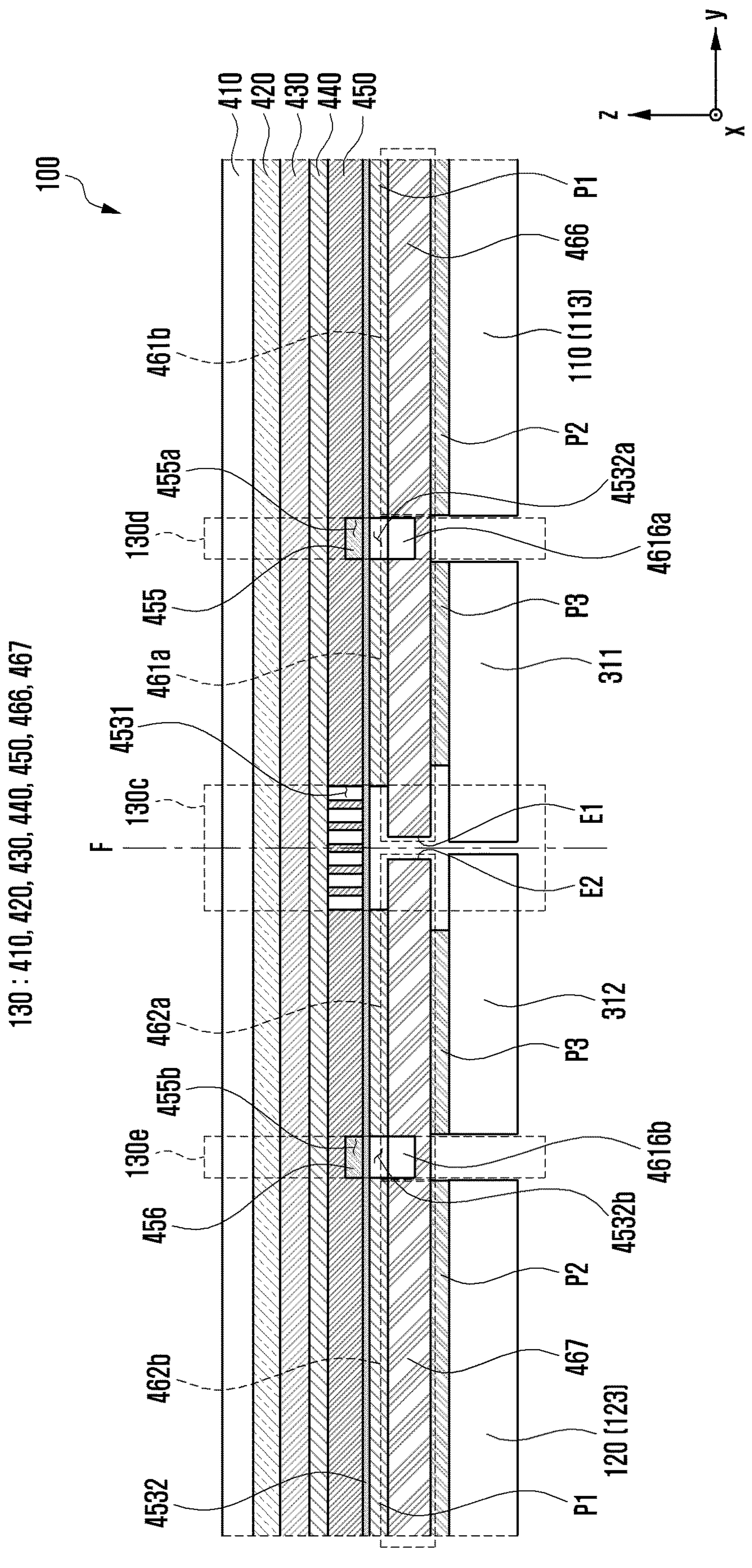

Referring to FIG. 11B, the electronic device 100 may include a first reinforcement plate 466 at least partially disposed between the support plate 450 and the first housing 110, and a second reinforcement plate 467 at least partially disposed between the support plate 450 and the second housing 120. In the embodiment, the first reinforcement plate 466 may include a third recess 4616*a* formed at a designated depth from an upper surface of the first reinforcement plate 466 at a position corresponding to the first bending area 130*d*. In the embodiment, the second reinforcement plate 467 may include a fourth recess 4616*b* formed at a designated depth from an upper surface of the second reinforcement plate 467 at a position corresponding to the second bending area 130*e*. In any embodiment, the third recess 4616*a* may be formed at a designated depth from a rear surface of the first reinforcement plate 466, and the fourth recess 4616*b* may be formed at a designated depth from a rear surface of the second reinforcement plate 467. In the embodiment, the first cavity 4532*a*, from which the bonding layer PI is excluded, may be included between the third recess 4616*a* of the first reinforcement plate 464 and the first recess 455*a* of the support plate 450. In the embodiment, the second cavity 4532*b*, from which the bonding layer PI is excluded, may be included between the fourth recess 4616*b* of the second reinforcement plate 465 and the second recess 455*b* of the support plate 450. In the embodiment, the first cavity 4532*a*, the second cavity 4532*b*, the third recess 4616*a*, and the fourth recess 4616*b* may assist in improving the flexibility in the first bending area 130*d* and the second bending area 130*e* of the flexible display 130. In any embodiment, the first recess 455*a* and/or the second recess 455*b* formed in the support plate 450 may be excluded. In any embodiment, the blocking member 4532 may be excluded from the first bending area 130*d* and/or the second bending area 130*e*.

Figure 11C:
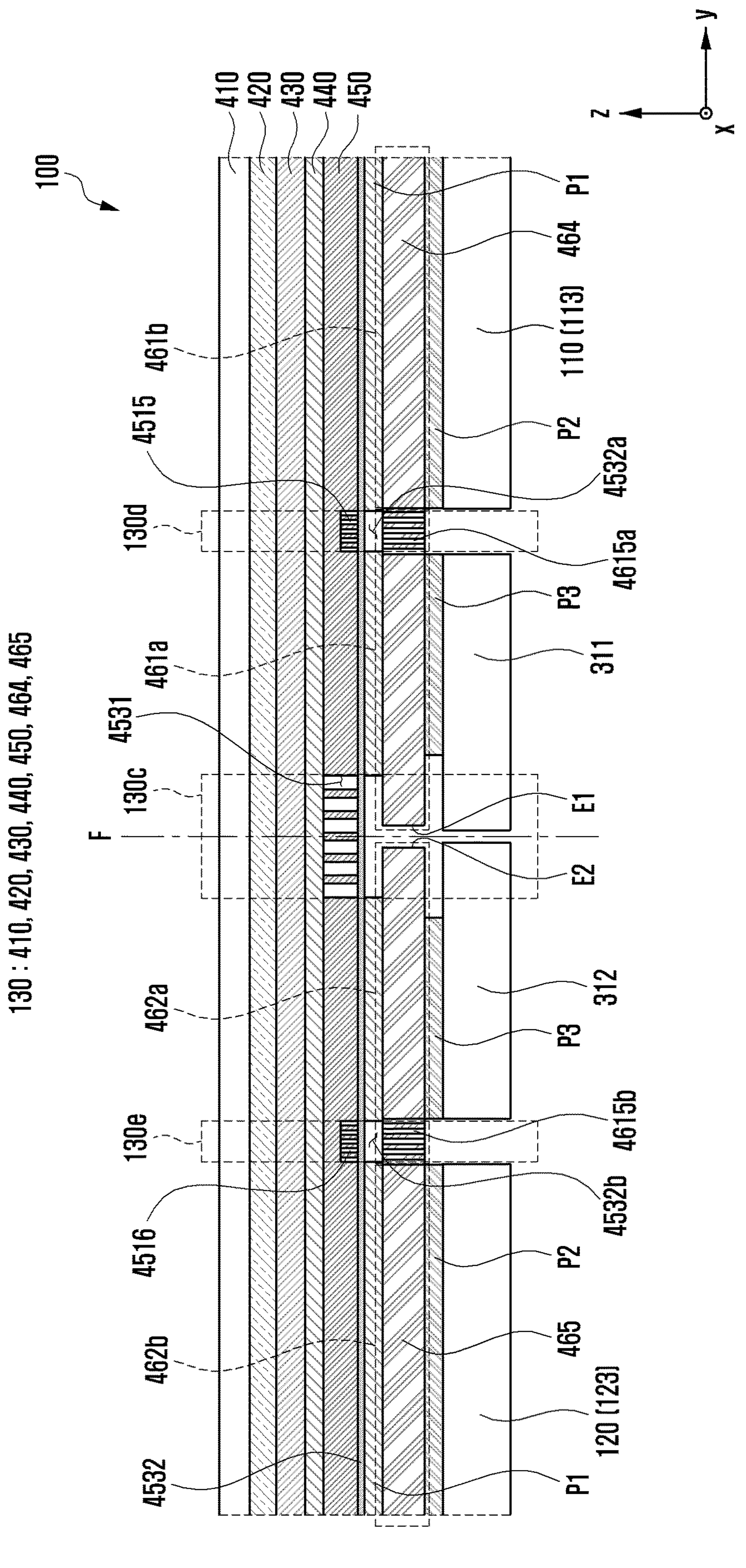

Referring to FIG. 11C, the electronic device 100 may include the first reinforcement plate 464 at least partially disposed between the support plate 450 and the first housing 110, and the second reinforcement plate 465 at least partially disposed between the support plate 450 and the second housing 120. In the embodiment, the first reinforcement plate 464 may include the second pattern 4615*a* positioned at the position corresponding to the first bending area 130*d*. In the embodiment, the second reinforcement plate 465 may include the third pattern 4615*b* positioned at the position corresponding to the second bending area 130*e*. In the embodiment, the support plate 450 may include a fourth pattern 4515 formed at a position corresponding to the first bending area 130*d*, and a fifth pattern 4516 formed at a position corresponding to the second bending area 130*e*. According to the embodiment, the fourth pattern 4515 and the fifth pattern 4516 may include a plurality of recesses formed at a designated depth from the rear surface of the support plate 450, and/or a plurality of openings formed through the support plate 450 from the upper surface to the rear surface of the support plate 450. In the embodiment, the first cavity 4532*a*, from which the bonding layer PI is excluded, may be included between the second pattern 4615*a* of the first reinforcement plate 464 and the fourth pattern 4515 of the support plate 450. In the embodiment, the second cavity 4532*b*, from which the bonding layer PI is excluded, may be included between the third pattern 4615*b* of the second reinforcement plate 465 and the fifth pattern 4516 of the support plate 450. In the embodiment, the first cavity 4532*a*, the second cavity 4532*b*, the second pattern 4615*a*, the third pattern 4615*b*, the fourth pattern 4515, and the fifth pattern 4516 may assist in improving the flexibility in the first bending area 130*d* and the second bending area 130*e* of the flexible display 130. In any embodiment, the fourth pattern 4515 and/or the fifth pattern 4516 formed on the support plate 450 may be excluded. In any embodiment, the blocking member 4532 may be excluded from the first bending area 130*d* and/or the second bending area 130*e*.

Figure 11D:
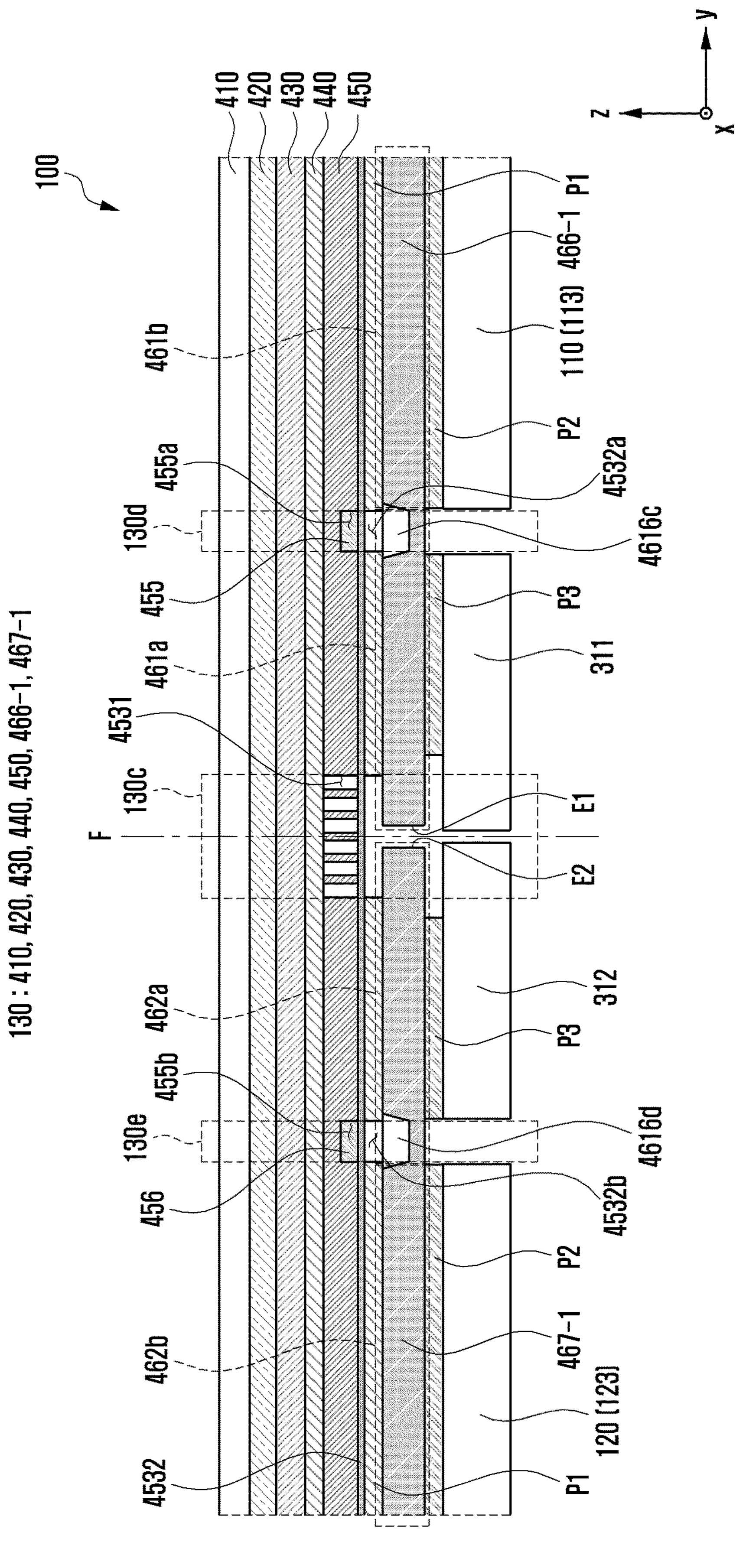

Referring to FIG. 11D, the electronic device 100 may include a first reinforcement plate 466-1 at least partially disposed between the support plate 450 and the first housing 110, and a second reinforcement plate 467-1 at least partially disposed between the support plate 450 and the second housing 120. In the embodiment, the first reinforcement plate 466-1 may include a fifth recess 4616*c* formed at a designated depth from an upper surface of the first reinforcement plate 466-1 at the position corresponding to the first bending area 130*d*. In the embodiment, the second reinforcement plate 467-1 may include a sixth recess 4616*d* formed at a designated depth from an upper surface of the second reinforcement plate 467-1 at the position corresponding to the second bending area 130*e*. In the embodiment, the fifth recess 4616*c* and the sixth recess 4616*d* may each have a trapezoidal cross-section having a width that decreases as the distance from the upper surfaces of the reinforcement plates 466-1 and 467-1 increases. In any embodiment, the first recess 455*a* and/or the second recess 455*b* formed in the support plate 450 may be excluded. In any embodiment, the blocking member 4532 may be excluded from the first bending area 130*d* and/or the second bending area 130*e*.

Figure 11E:
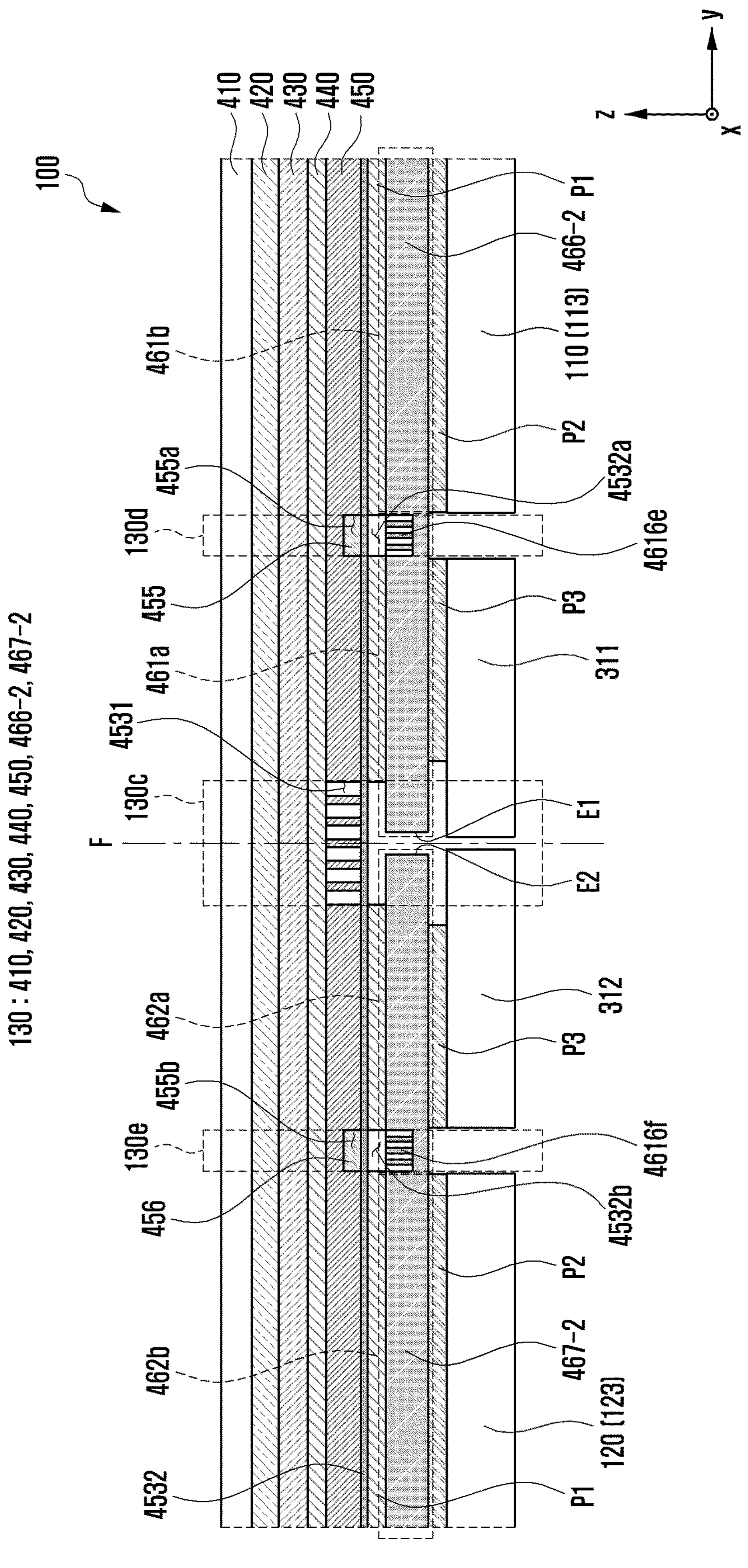

Referring to FIG. 11E, the electronic device 100 may include a first reinforcement plate 466-2 at least partially disposed between the support plate 450 and the first housing 110, and a second reinforcement plate 467-2 at least partially disposed between the support plate 450 and the second housing 120. In the embodiment, the first reinforcement plate 466-2 may include sixth patterns 4616*e* formed at a designated depth from an upper surface of the first reinforcement plate 466-2 at the position corresponding to the first bending area 130*d*. In the embodiment, the second reinforcement plate 467-2 may include seventh patterns 4616*f* formed at a designated depth from an upper surface of the second reinforcement plate 467-2 at the position corresponding to the second bending area 130*e*. In any embodiment, the first recess 455*a* and/or the second recess 455*b* formed in the support plate 450 may be excluded. In any embodiment, the blocking member 4532 may be excluded from the first bending area 130*d* and/or the second bending area 130*e*.

Figure 11F:
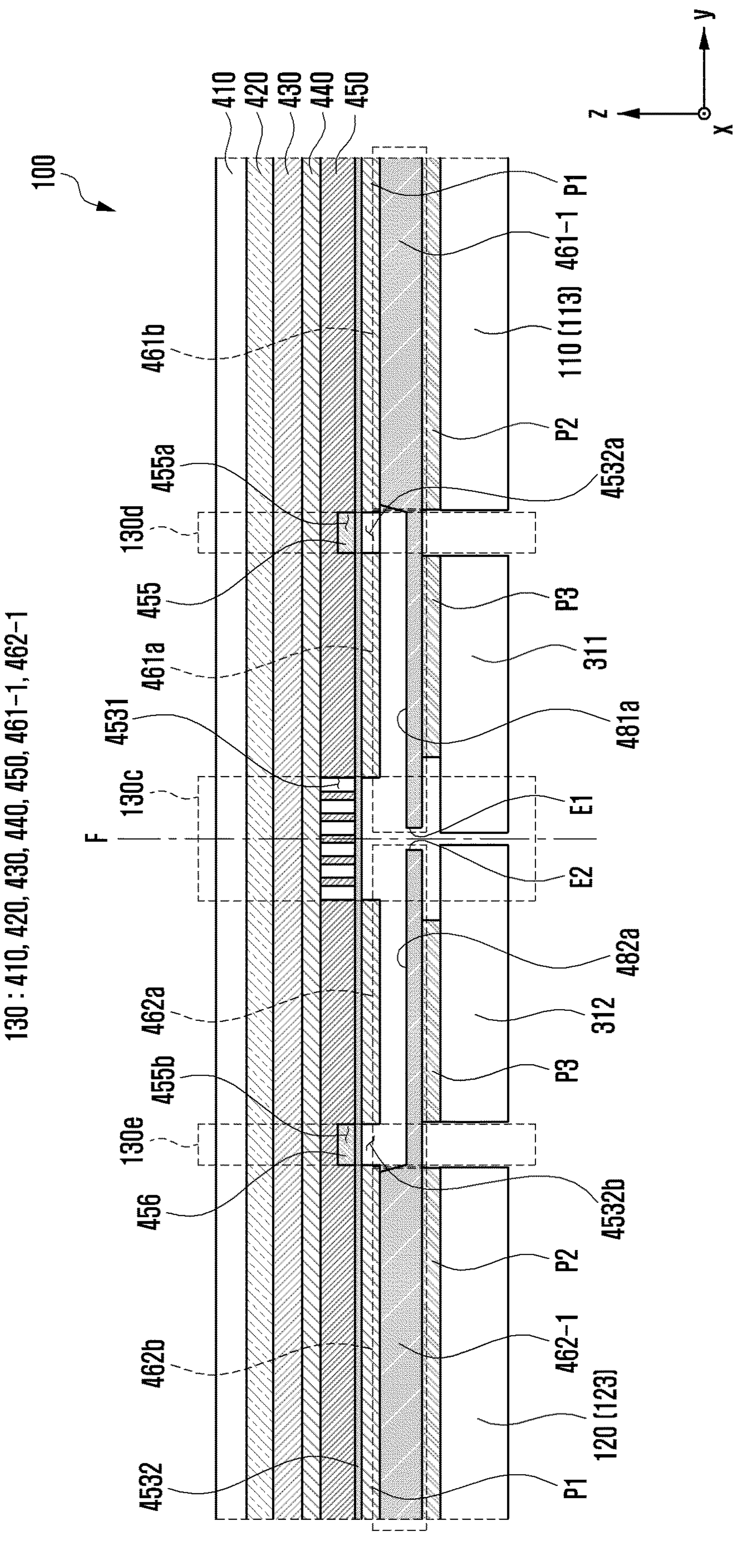

Referring to FIG. 11F, the electronic device 100 may include the first reinforcement plate 461-1 at least partially disposed between the support plate 450 and the first housing 110, and the second reinforcement plate 462-1 at least partially disposed between the support plate 450 and the second housing 120. In the embodiment, the first reinforcement plate 461-1 may include the second part 461*b* formed to be higher than the first part 461*a* by means of the first part 461*a* and stepped portion 481*a*. In the embodiment, the first part 461*a* may be formed to extend from the first edge E1 of the first reinforcement plate 461-1 to the first bending area 130*d*. In the embodiment, a boundary area between the first part 461*a* and the second part 461*b* may have an inclined (sloped or tapered) shape so as to be gradually raised toward the second part 461*b*. Even in the second reinforcement plate 462-1, a boundary area between the third part 462*a* and the fourth part 462*b* may have an inclined shape, in substantially the same way, so as to be gradually raised toward the fourth part 462*b*. In any embodiment, the first recess 455*a* and/or the second recess 455*b* formed in the support plate 450 may be excluded. In any embodiment, the blocking member 4532 may be excluded from the first bending area 130*d* and/or the second bending area 130*e*.

Figure 11G:
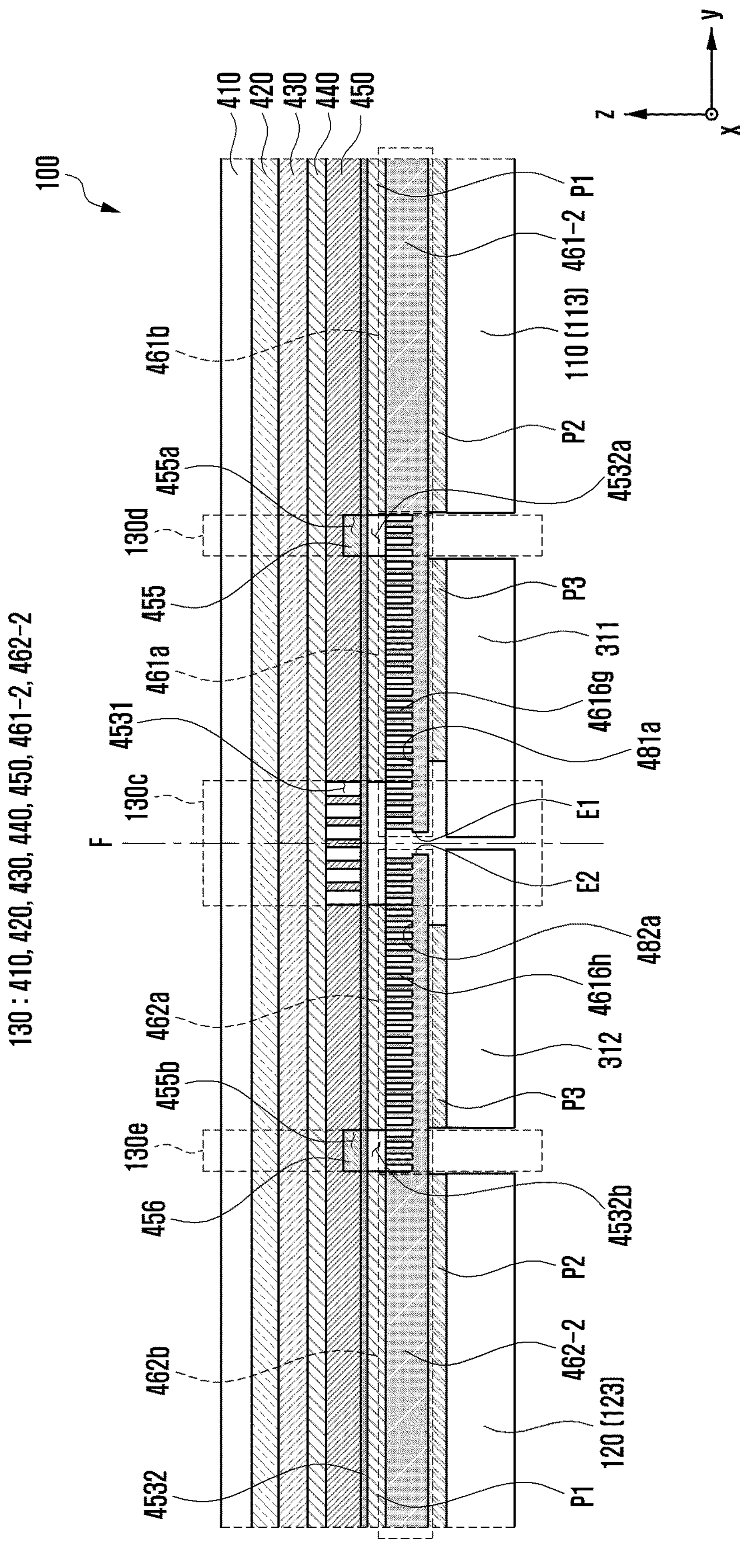

Referring to FIG. 11G, the electronic device 100 may include the first reinforcement plate 461-2 at least partially disposed between the support plate 450 and the first housing 110, and the second reinforcement plate 462-2 at least partially disposed between the support plate 450 and the second housing 120. In the embodiment, the first reinforcement plate 461-2 may include the second part 461*b* formed to be higher than the first part 461*a* by means of the first part 461*a* and stepped portion 481*a*. In the embodiment, the first part 461*a* may be formed to extend from the first edge E1 of the first reinforcement plate 461-2 to the first bending area 130*d*. In the embodiment, the first reinforcement plate 461-2 may include eighth patterns 4616*g* disposed at designated intervals in a direction of the support plate 450 on the first part 461*a*. The second reinforcement plate 462-2 may also include ninth patterns 4616*h* disposed to be stretched in a direction of the support plate 450 on the third part 462*a* in substantially the same way. In any embodiment, the first recess 455*a* and/or the second recess 455*b* formed in the support plate 450 may be excluded. In any embodiment, the blocking member 4532 may be excluded from the first bending area 130*d* and/or the second bending area 130*e*.

Figure 11H:
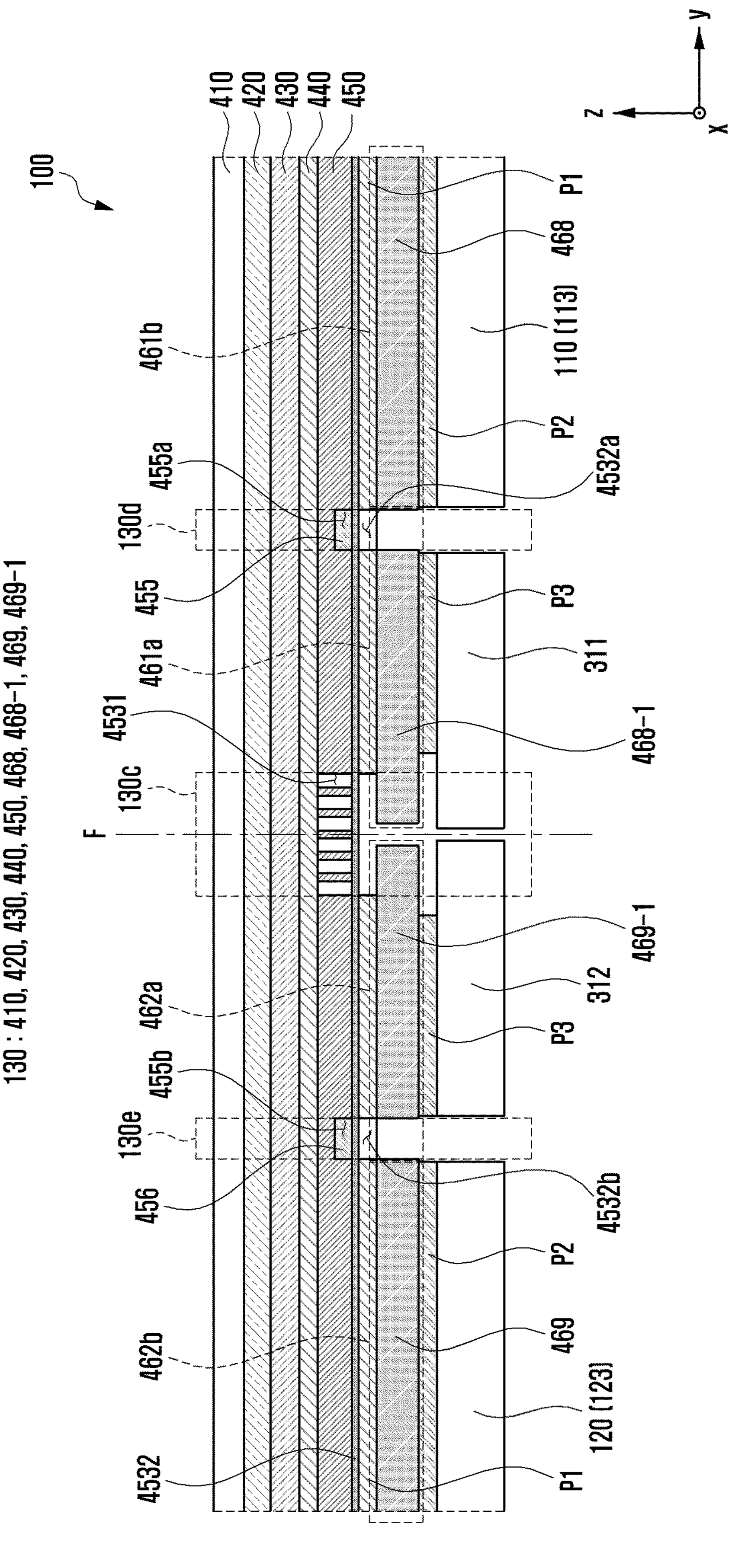

Referring to FIG. 11H, the electronic device 100 may include a first reinforcement plate 468 disposed between the support plate 450 and the first housing 110 and disposed outside the first bending area 130*d*, and a second reinforcement plate 469 disposed between the support plate 450 and the second housing 120 and disposed outside the second bending area 130*e*. In the embodiment, the electronic device 100 may include a third reinforcement plate 468-1 disposed between the support plate 450 and the first hinge plate 311 and disposed from at least a part of the folding area 130*c* to the first bending area 130*d*, and a fourth reinforcement plate 469-1 disposed between the support plate 450 and the second hinge plate 312 and disposed from at least a part of the folding area 130*c* to the second bending area 130*e*. In the embodiment, the first reinforcement plate 468 and the third reinforcement plate 468-1 may be disposed with the first bending area 130*d* interposed therebetween (e.g., without the first bending area 130*d*). In the embodiment, the second reinforcement plate 469 and the fourth reinforcement plate 469-1 may be disposed with the second bending area 130*e* interposed therebetween (e.g., without the second bending area 130*e*). In the embodiment, the structures of the bending areas 130*d* and 130*e*, to which no reinforcement plate is not applied, may assist in improving the flexibility of the flexible display 130. In the embodiment, the first reinforcement plate 468 may be attached to the support plate 450 or attached to both the support plate 450 and the first housing 110. In the embodiment, the second reinforcement plate 469 may be attached to the support plate 450 or attached to both the support plate 450 and the second housing 120. In the embodiment, the third reinforcement plate 468-1 may be attached to at least a part of the support plate 450 (e.g., an area excluding an area corresponding to the third area 130*c*) or attached to both the support plate 450 and the first housing 110. In the embodiment, the fourth reinforcement plate 469-1 may be attached to at least a part of the support plate 450 (e.g., an area excluding an area corresponding to the third area 130*c*) or attached to both the support plate 450 and the second housing 120. In any embodiment, the first recess 455*a* and/or the second recess 455*b* formed in the support plate 450 may be excluded. In any embodiment, the blocking member 4532 may be excluded from the first bending area 130*d* and/or the second bending area 130*e*.

Figure 11I:
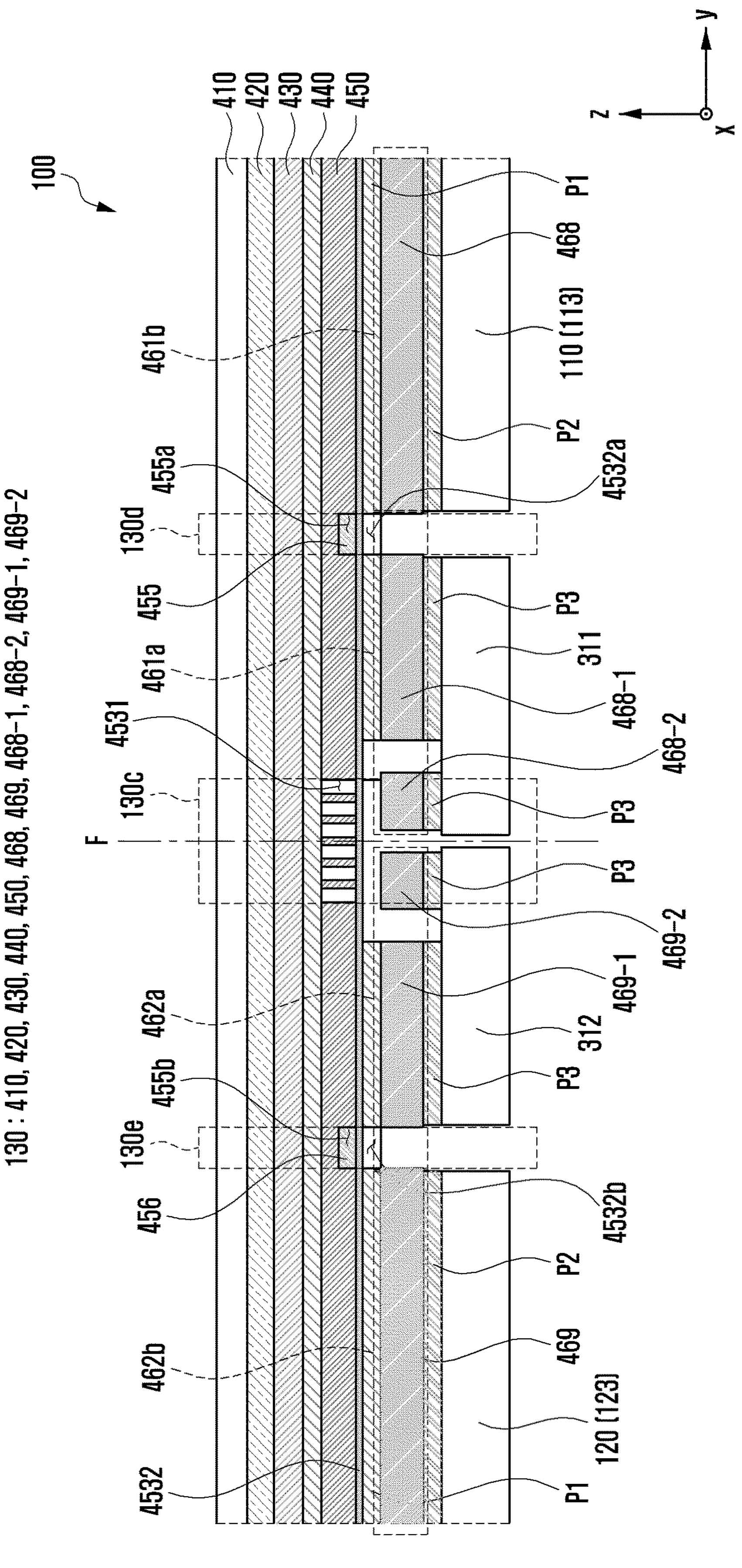

Referring to FIG. 11I, the electronic device 100 may include the first reinforcement plate 468 disposed between the support plate 450 and the first housing 110 and disposed outside the first bending area 130*d*, and the second reinforcement plate 469 disposed between the support plate 450 and the second housing 120 and disposed outside the second bending area 130*e*. In the embodiment, the electronic device 100 may include the third reinforcement plate 468-1 disposed between the support plate 450 and the first hinge plate 311 and disposed between at least a part of the folding area 130*c* and the first bending area 130*d*, and the fourth reinforcement plate 469-1 disposed between the support plate 450 and the second hinge plate 312 and disposed between at least a part of the folding area 130*c* and the second bending area 130*e*. In the embodiment, the electronic device 100 may also include a fifth reinforcement plate 468-2 disposed between the support plate 450 and the first hinge plate 311, disposed between at least a part of the folding area 130*c* and the first bending area 130*d*, and disposed to be spaced apart from the third reinforcement plate 468-1, and a sixth reinforcement plate 469-2 disposed between the support plate 450 and the second hinge plate 312, disposed between at least a part of the folding area 130*c* and the second bending area 130*e*, and disposed to be spaced apart from the fourth reinforcement plate 469-1. In the embodiment, the first reinforcement plate 468 may be attached to the support plate 450 or attached to both the support plate 450 and the first housing 110. In the embodiment, the second reinforcement plate 469 may be attached to the support plate 450 or attached to both the support plate 450 and the second housing 120. In the embodiment, the third reinforcement plate 468-1 may be attached to at least a part of the support plate 450 or attached to both the support plate 450 and the first housing 110. In the embodiment, the fourth reinforcement plate 469-1 may be attached to at least a part of the support plate 450 or attached to both the support plate 450 and the second housing 120. In the embodiment, the fifth reinforcement plate 468-2 may be attached to the first hinge plate 311. In the embodiment, the sixth reinforcement plate 469-2 may be attached to the second hinge plate 312. In any embodiment, the first recess 455*a* and/or the second recess 455*b* formed in the support plate 450 may be excluded. In any embodiment, the blocking member 4532 may be excluded from the first bending area 130*d* and/or the second bending area 130*e*.

FIGS. 12A, 12B, 12C, and 12D are views illustrating various shapes of patterns of a support plate in FIG. 11C according to various embodiments of the disclosure.

Figure 12A:
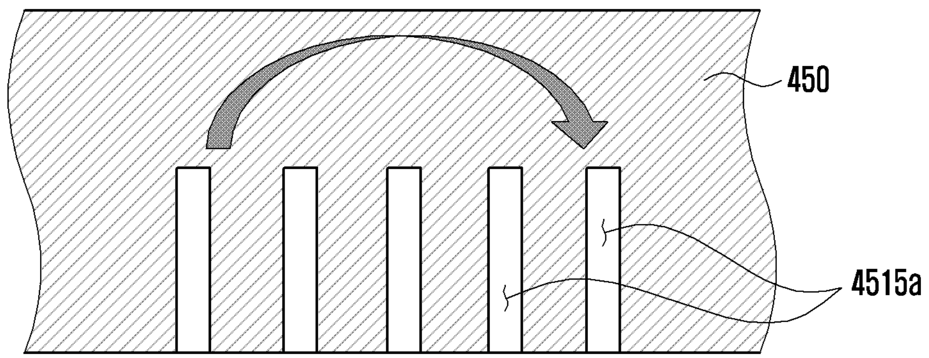
FIGS. 12A, 12B, 12C, and 12D are views illustrating various shapes of patterns of a support plate in FIG. 11C according to various embodiments of the disclosure.

Referring to FIG. 12A, the fourth pattern 4515 and/or the fifth pattern 4516 formed in the support plate 450 may include concave patterns 4515*a* disposed at designated intervals and formed at a designated depth. In this case, the first concave patterns 4515*a* may be disposed to have the same shape, the same depth, and the same interval.

Figure 12B:
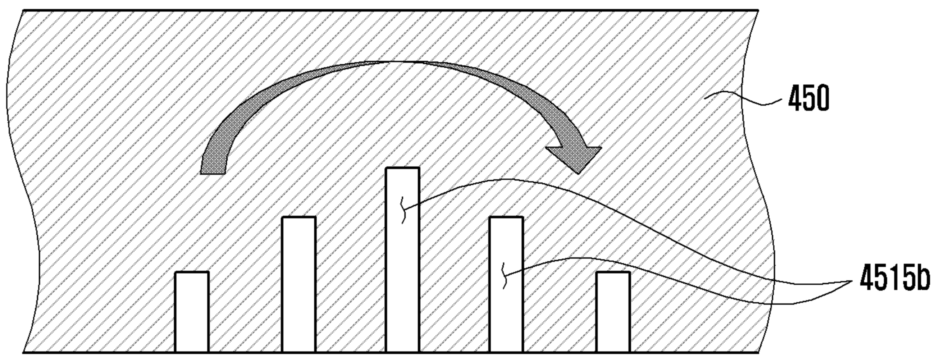

Referring to FIG. 12B, the fourth pattern 4515 and/or the fifth pattern 4516 formed in the support plate 450 may include concave patterns 4515*b* disposed at designated intervals and formed at a designated depth. In this case, the second concave patterns 4515*b* may be formed so that depths thereof gradually decrease toward the left and right sides based on the center thereof. In any embodiment, the second concave patterns 4515*b* may be formed so that depths thereof gradually increase toward the left and right sides based on the center thereof.

Figure 12C:
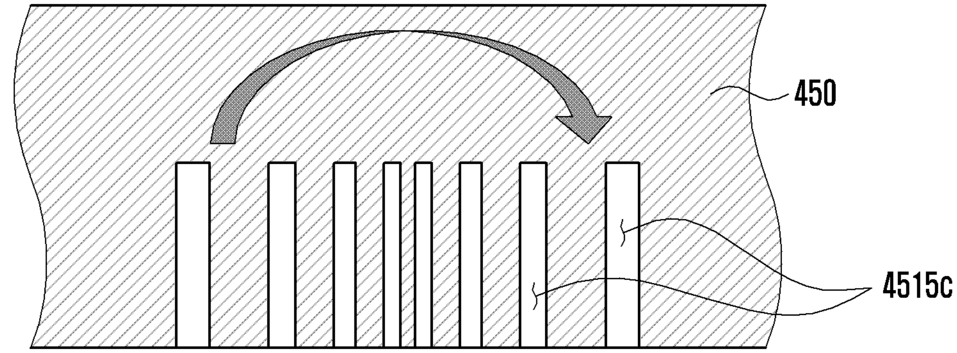

Referring to FIG. 12C, the fourth pattern 4515 and/or the fifth pattern 4516 formed in the support plate 450 may include concave patterns 4515*c* disposed at designated intervals and formed at a designated depth. In this case, the concave patterns 4515*c* may be formed to have the same depth, different widths, and/or different intervals. In any embodiment, the concave patterns 4515*c* may be formed to have different depths, different widths, and/or different intervals.

Figure 12D:
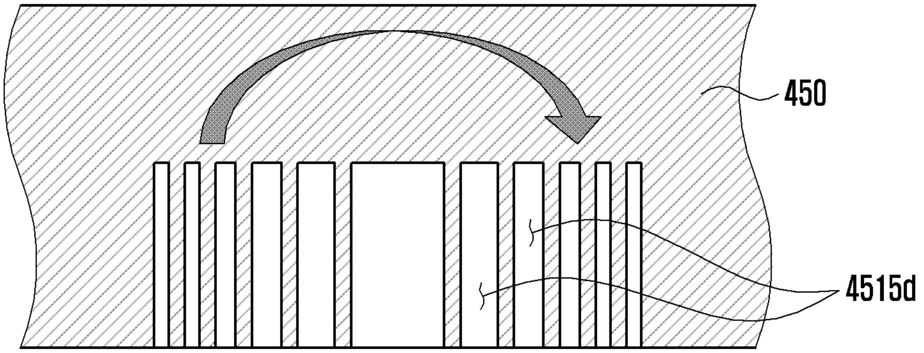

Referring to FIG. 12D, the fourth pattern 4515 and/or the fifth pattern 4516 formed in the support plate 450 may include concave patterns 4515*d* disposed at designated intervals and formed at a designated depth. In this case, the concave patterns 4515*d* may be formed so that widths thereof gradually decrease toward the left and right sides based on the center thereof. In any embodiment, the fourth concave patterns 4515*d* may be formed so that widths thereof gradually increase toward the left and right sides based on the center thereof.

According to various embodiments of the disclosure, at least one of the shapes of the concave patterns 4515*a*, 4515*b*, 4515*c*, and 4515*d* illustrated in FIGS. 12A to 12D may be applied to the portions of the first reinforcement plate 461 and/or the second reinforcement plate 462 corresponding to the folding area 130*c*, the first bending area 130*d*, and/or the second bending area 130*e* of the flexible display 130.

Figure 13A:
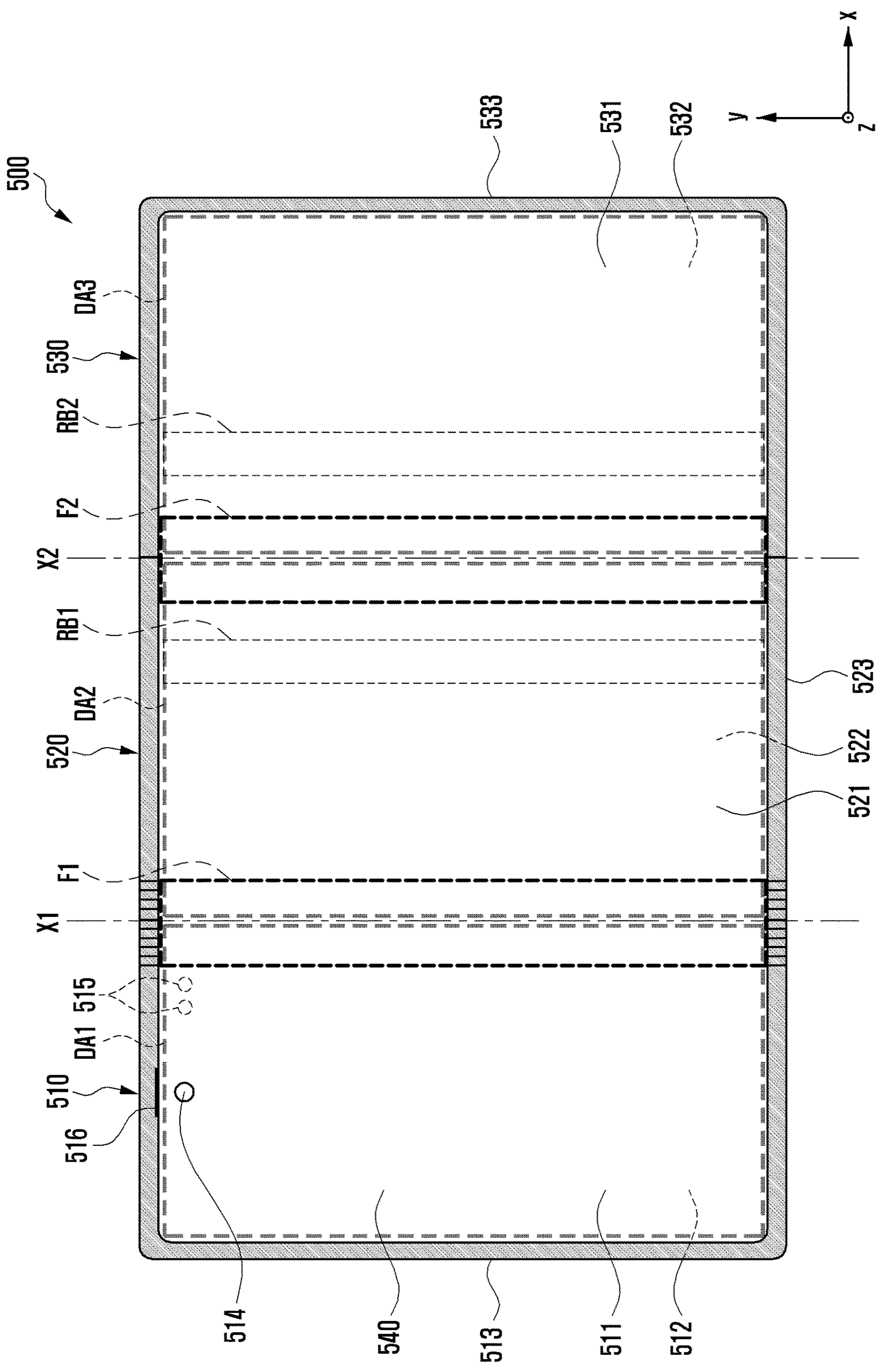
FIG. 13A is a top plan view of an electronic device in an unfolded state according to an embodiment of the disclosure.
Figure 13B:
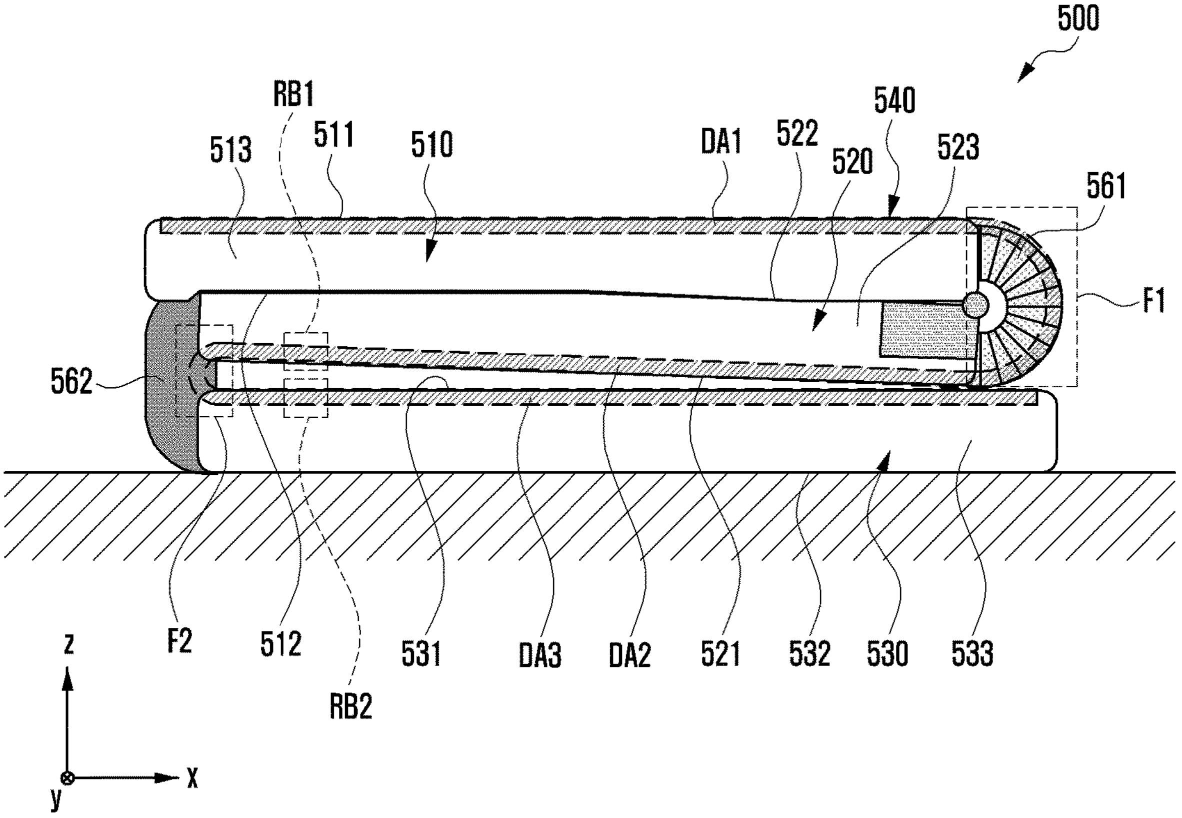
FIG. 13B is a view schematically illustrating a folded state of an electronic device in FIG. 13A according to an embodiment of the disclosure.

FIG. 13A is a top plan view of an electronic device in an unfolded state according to an embodiment of the disclosure. FIG. 13B is a view schematically illustrating a folded state of an electronic device in FIG. 13A according to an embodiment of the disclosure.

Referring to FIGS. 13A and 13B, an electronic device 500 may include a first housing 510, a second housing 520, and a third housing 530 disposed to be foldable with respect to one another. In the embodiment, the first housing 510 may include a first surface 511, a second surface 512 directed in a direction opposite to the first surface 511, and a first lateral member 513 disposed to surround a space between the first surface 511 and the second surface 512. In the embodiment, the second housing 520 may include a third surface 521, a fourth surface 522 directed in a direction opposite to the third surface 521, and a second lateral member 523 disposed to surround a space between the third surface 521 and the fourth surface 522. In the embodiment, the third housing 530 may include a fifth surface 531, a sixth surface 532 directed in a direction opposite to the fifth surface 511, and a third lateral member 533 disposed to surround a space between the fifth surface 531 and the sixth surface 532. In the embodiment, the electronic device 500 may include a flexible display 540 disposed to be supported by the first housing 510, the second housing 520, and the third housing 530. In the embodiment, the first housing 510 and the second housing 520 may be connected to be rotatable relative to each other about a first folding axis X1 by means of a first hinge device 561. In the embodiment, the second housing 520 and the third housing 530 may be connected to be rotatable relative to each other about a second folding axis X2 by means of a second hinge device 562. In the embodiment, the first housing 510 and the second housing 520 may operate in a first folding manner (e.g., an out-folding manner) by means of the first hinge device 561. For example, in the folded state, the first housing 510 and the second housing 520 may be disposed to be directed in opposite directions so that display areas facing the housings 510 and 520 may be visually visible from the outside. In this case, the first surface 511 of the first housing 510 and the third surface 521 of the second housing 520 may be disposed to be directed in the opposite directions.

According to various embodiments, the second housing 520 and the third housing 530 may operate in a second folding manner (e.g., an in-folding manner) by means of the second hinge device 562. For example, in the folded state, the second housing 520 and the third housing 530 may be disposed to face each other so that the display areas facing the housings 520 and 530 are not visually visible from the outside. In this case, the third surface 521 of the second housing 520 and the fifth surface 531 of the third housing 530 may be disposed to face each other. In the embodiment, the electronic device 500 may operate in a state in which the first housing 510, the second housing 520, and the third housing 530 are fully unfolded. In the embodiment, the electronic device 500 may operate in a state in which only the first housing 510 and the second housing 520 are folded. In the embodiment, the electronic device 500 may operate in a state in which only the second housing 520 and the third housing 530 are folded. In the embodiment, the electronic device 500 may operate in a state in which all the first housing 510, the second housing 520, and the third housing 530 are folded.

According to various embodiments, the flexible display 540 may include a first display area DA1 corresponding to the first housing 510, a second display area DA2 corresponding to the second housing 520, and a third display area DA3 corresponding to the third housing 530. In the embodiment, the flexible display 540 may include a first folding area F1 including a part of the first display area DA1 and a part of the second display area DA2 and corresponding to the first hinge device 561. In the embodiment, the flexible display 540 may include a second folding area F2 including a part of the second display area DA2 and a part of the third display area DA3 and corresponding to the second hinge device 562. In the embodiment, the second display area DA2 and the third display area DA3, which are folded in the second folding manner (e.g., the in-folding manner), may include a first bending area RB1 (e.g., the first bending area 130*d*) and a second bending area RB2 (e.g., the second bending area 130*e*) disposed at left and right sides based on a second folding axis F2.

According to various embodiments, the first display area DA1 may be disposed toward the outside 516 of the electronic device 500 so that the electronic device 500 may be visible to a user in the fully folded state. In this case, a camera module 514 (or a camera device) and a sensor module 515 may be disposed to detect an external environment through the first display area DA1. In any embodiment, the camera module 514 and/or the sensor module 515 may be disposed below the flexible display 540 and disposed to be visually invisible from the outside.

According to an embodiment of the disclosure, the flexible display 540 may have substantially the same configuration as the reinforcement plates (e.g., any one of the reinforcement plates in FIGS. 7A, 7B, 7C, 7D, 7E, 8A, 8B, 9, 10A to 10H, 11A to 11I, and 12A to 12D) disposed in the area, which corresponds to at least a part of the second housing 520, and the area corresponding to at least a part of the third housing 530. With this configuration, the reinforcement plates are bent together in the second folding area F2, which may assist in slimming down the electronic device 500. The buffer members (e.g., the first buffer member 481 and the second buffer member 482 in FIG. 7A) may improve the flexibility in the first bending area RB1 and the second bending area RB2 of the flexible display 540, and the improvement on the durability (e.g., impact resistance) against an external impact may assist in improving the surface quality of the flexible display 540.

Figure 14A:
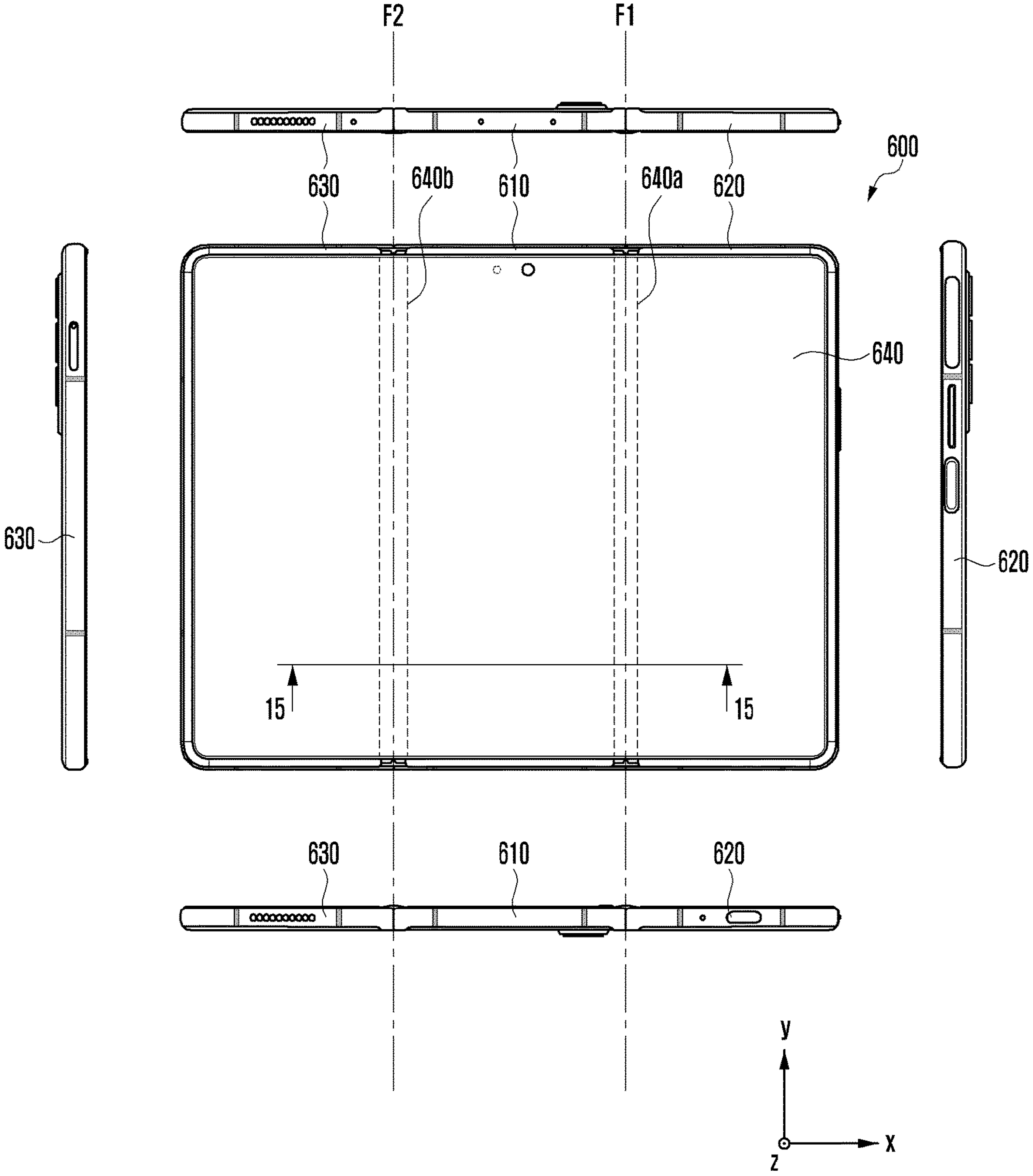
FIG. 14A is a top plan view of an electronic device in an unfolded state according to an embodiment of the disclosure.
Figure 14B:
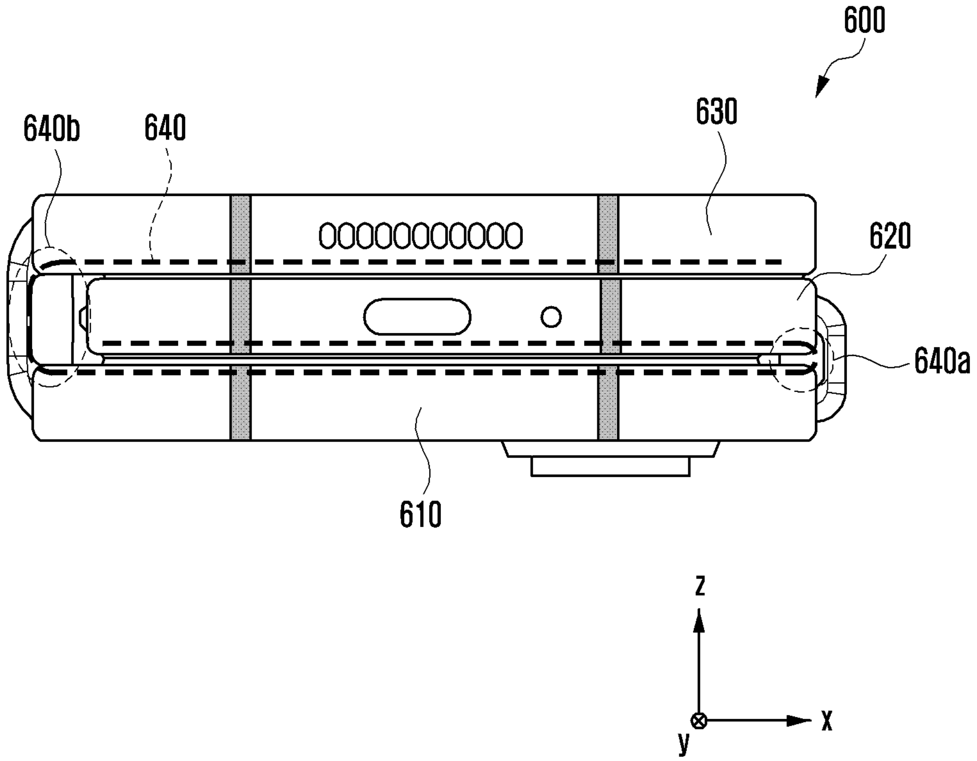
FIG. 14B is a side view of an electronic device in a folded state according to an embodiment of the disclosure.

FIG. 14A is a top plan view of an electronic device in an unfolded state according to an embodiment of the disclosure. FIG. 14B is a side view of an electronic device in a folded state according to an embodiment of the disclosure.

Referring to FIGS. 14A and 14B, an electronic device 600 may include a first housing 610, a second housing 620 connected to the first housing 610 and configured to be foldable about a first folding axis F1 by means of the first hinge device (not illustrated) at one side of the first housing 610, and a third housing 630 connected to the first housing 610 and configured to be foldable about the second folding axis F2 by means of the second hinge device (not illustrated) at the other side of the first housing 610. In the embodiment, the electronic device 600 may include a flexible display 640 extending from at least a part of the second housing 620 to at least a part of the third housing 630 while traversing the first housing 610. In the embodiment, the flexible display 640 may be disposed to be supported by the first, second, and third housings 610, 620, and 630.

According to various embodiments, in the folded state (fully folded state), the electronic device 600 may operate such that the first housing 610 faces the second housing 620 and the third housing 630 faces the second housing 620. For example, in the folded state, the electronic device 600 may operate such that first, second, and third housings 610, 620, and 630 at least partially overlap one another when the first housing 610 is viewed from above. In the embodiment, in the folded state, the electronic device 600 may operate such that the second housing 620 is stacked on the first housing 610 and the third housing 630 is sequentially stacked on the second housing 620. In the embodiment, in the folded state, the flexible display 640 may be bent in a manner (e.g., the in-folding manner) in which the areas corresponding to the first housing 610 and the second housing 620 face each other. In the embodiment, the flexible display 640 may be bent in a manner (e.g., the in-folding manner) in which the areas corresponding to the first housing 610 and the third housing 630 face each other. In this case, in the folded state, the flexible display 640 may include a first folding area 640*a* formed by folding the first housing 610 and the second housing 620, and a second folding area 640*b* formed by folding the first housing 610 and the third housing 630. In the embodiment, in the folded state, a curvature of the first folding area 640*a* may be greater than a curvature of the second folding area 640*b*. In the embodiment, in the folded state, a radius of curvature of the first folding area 640*a* may be smaller than a radius of curvature of the second folding area 640*b*.

Figure 15:
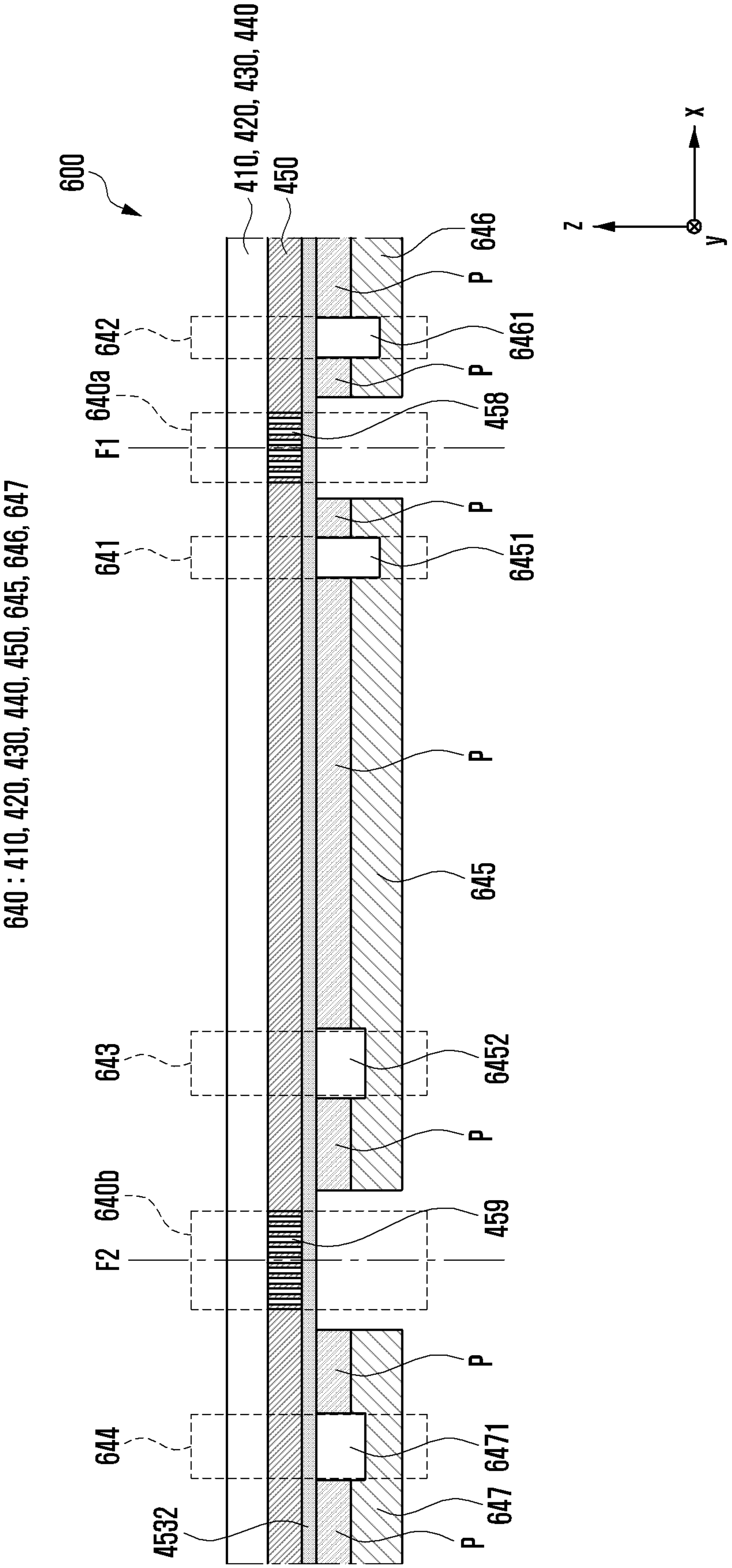
FIG. 15 is a partially cross-sectional view of an electronic device taken along line 15-15 in FIG. 14A according to an embodiment of the disclosure.

FIG. 15 is a partially cross-sectional view of an electronic device taken along line 15-15 in FIG. 14A according to an embodiment of the disclosure.

To describe an electronic device 600 in FIG. 15, the constituent elements, which are substantially the same as the constituent elements of the electronic device 100 in FIG. 7A, will be designated by the same reference numerals, and a detailed description thereof will be omitted.

Referring to FIG. 15, the flexible display 640 may include the plurality of layers 410, 420, 430 and 440 including the window layer (e.g., the window layer 410 in FIG. 7A), the polarizing layer (e.g., the polarizing layer 420 in FIG. 7A), the display panel (e.g., the display panel 430 in FIG. 7A), and the polymer layer (e.g., the polymer layer 440 in FIG. 7A), and the support plate 450 (e.g., the support plate 450 in FIG. 7A) and at least one reinforcement plate 645, 646, or 647 sequentially disposed below the plurality of layers 410, 420, 430, and 440. In the embodiment, the flexible display 640 may include a first bending area 641 (e.g., a first reverse bending section) positioned in an area corresponding to the first housing 610 with the first folding area 640*a* interposed therebetween, and a second bending area 642 (e.g., a second reverse bending section) positioned in an area corresponding to the second housing 620. In the embodiment, the flexible display 640 may include a third bending area 643 (e.g., a third reverse bending section) positioned in the area corresponding to the first housing 610 with the second folding area 640*b* interposed therebetween, and a fourth bending area 644 (e.g., a fourth reverse bending section) positioned in an area corresponding to the third housing 630. In the embodiment, in order to improve the flexibility of the flexible display 640, the support plate 450 may include a first pattern 458 (e.g., at least one opening or recess) disposed in an area corresponding to the first folding area 640*a*, and a second pattern 459 (e.g., at least one opening and/or recess) disposed in an area corresponding to the second folding area 640*b*. In the embodiment, the first folding area 640*a* and the second folding area 640*b* may be required to have different types of flexibility. In the embodiment, because a curvature of the first folding area 640*a* needs to be greater than a curvature of the second folding area 640*b*, the first folding area 640*a* may be required to have better flexibility than the second folding area 640*b*. The difference in flexibility may be implemented by changing shapes of the first and second patterns 458 and 459. In the embodiment, the flexible display may include the blocking member 4532 disposed by being attached to the rear surface of the support plate.

According to various embodiments, at least one of the reinforcement plates 645, 646, and 647 may be disposed by being attached to at least a part of each of the first, second, and third housings 610, 620, and 630 by means of a bonding member P. In any embodiment, at least one of the reinforcement plates 645, 646, and 647 may be disposed by being attached to at least a part of each of the first, second, and third housings 610, 620, and 630 and at least a part of the support plate. In the embodiment, at least one of the reinforcement plates 645, 646, and 647 may include a first reinforcement plate 645 disposed below the support plate 450 and disposed in an area corresponding to at least a part of the first housing 610, a second reinforcement plate 646 disposed in an area corresponding to at least a part of the second housing 620, and a third reinforcement plate 647 disposed in an area corresponding to at least a part of the third housing 630. In the embodiment, the first reinforcement plate 645 may include a first recess 6451 formed to improve the flexibility of the first bending area 641. In the embodiment, the second reinforcement plate 646 may include a second recess 6461 formed to improve the flexibility of the second bending area 642. In the embodiment, the first reinforcement plate 645 may include a third recess 6452 formed to improve the flexibility of the third bending area 643. In the embodiment, the third reinforcement plate 467 may include a fourth recess 6471 formed to improve the flexibility of the fourth bending area 644. In the embodiment, the first and second recesses 6451 and 6461 may have the same shape. In the embodiment, the third and fourth recesses 6452 and 6471 may have the same shape. In the embodiment, the first and second recesses 6451 and 6461 and the third and fourth recesses 6452 and 6471 may have different shapes. For example, the first and second recesses 6451 and 6461 and the third and fourth recesses 6452 and 6471 may have different widths or depths.

According to various embodiments, because the first folding area 640*a* of the flexible display 640 is required to have relatively better flexibility than the second folding area 640*b*, the first and second bending areas 641 and 642 may also be required to have relatively better flexibility than the third and fourth bending portions 643 and 644. Therefore, in order to improve relatively excellent flexibility, the first and second recesses 6451 and 6461 may be formed to have narrower widths and greater depths than the third and fourth recesses 6452 and 6471.

In any embodiment, the flexible display 640 may include the buffer member (e.g., the first buffer member 481 and/or the second buffer member 482 in FIG. 7A) disposed to fill the first and second recesses 6451 and 6461 and/or the third and fourth recesses 6452 and 6471.

Figure 16A:
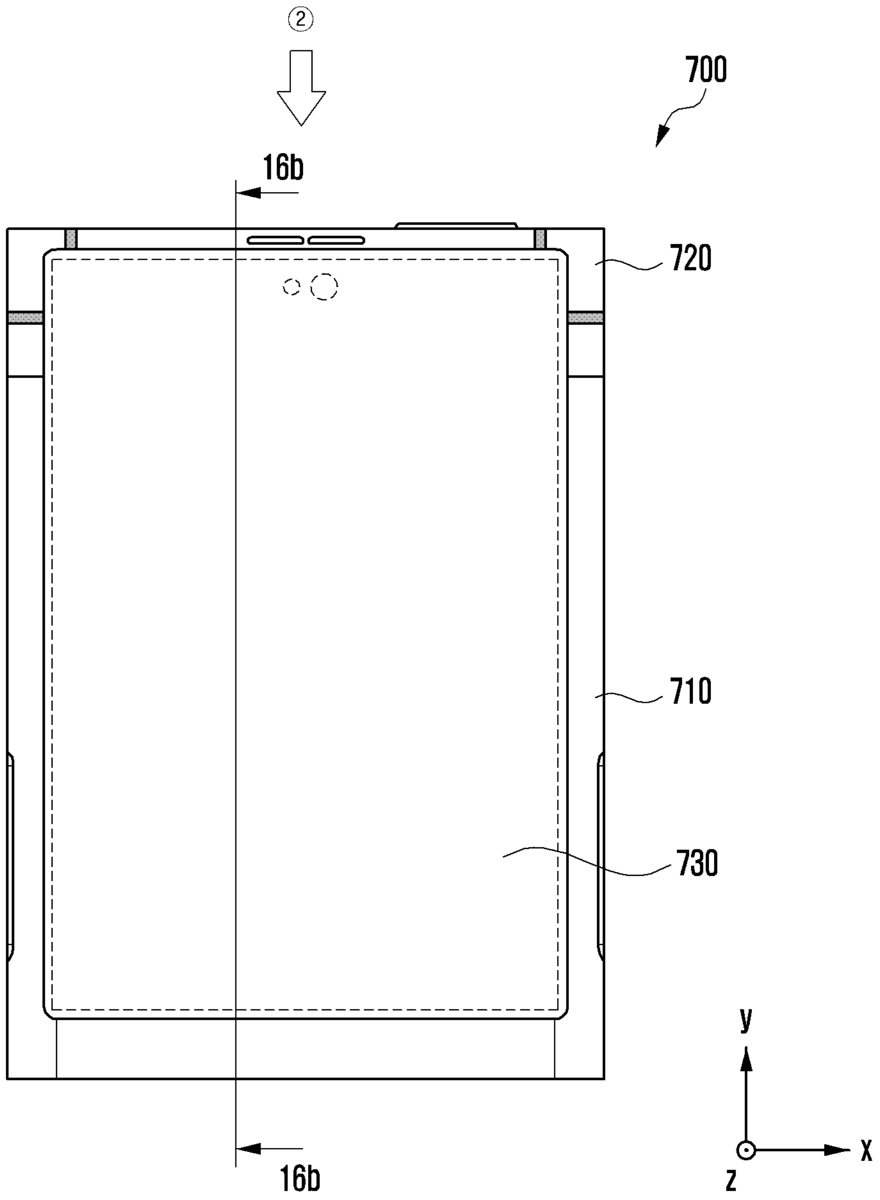
FIG. 16A is a top plan view of an electronic device in a slide-in state according to an embodiment of the disclosure.
Figure 16B:
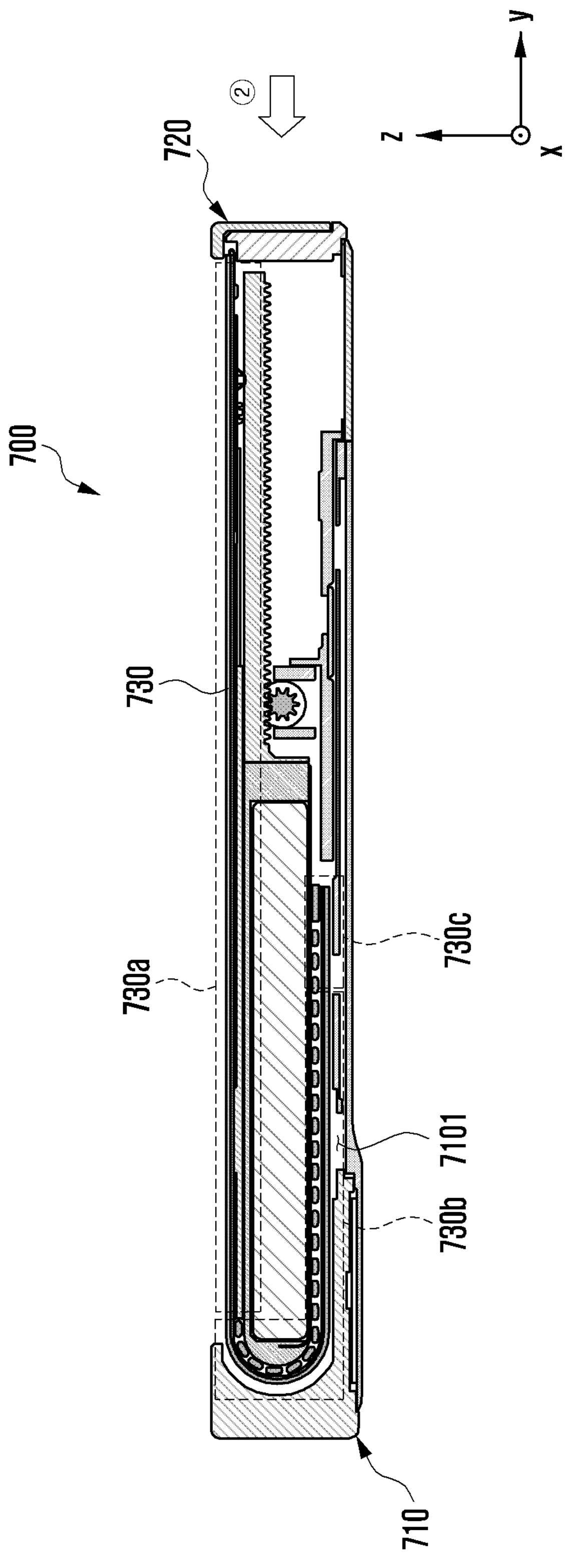
FIG. 16B is a cross-sectional view of an electronic device taken along line 16*b*-16*b* in FIG. 16A according to an embodiment of the disclosure.

FIG. 16A is a top plan view of an electronic device in a slide-in state according to an embodiment of the disclosure. FIG. 16B is a cross-sectional view of an electronic device taken along line 16*b*-16*b* in FIG. 16A according to an embodiment of the disclosure.

Figure 16C:
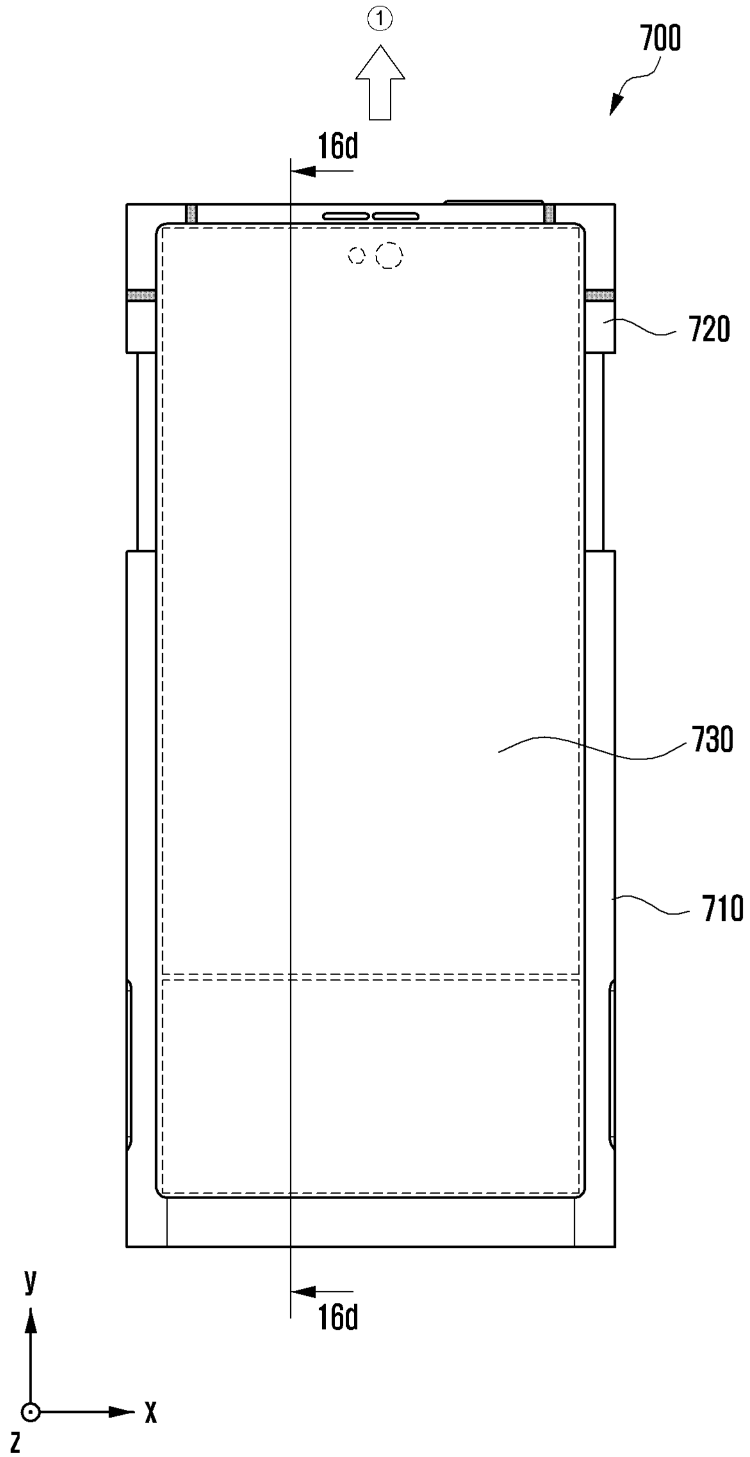
FIG. 16C is a top plan view of an electronic device in a slide-out state according to an embodiment of the disclosure.
Figure 16D:
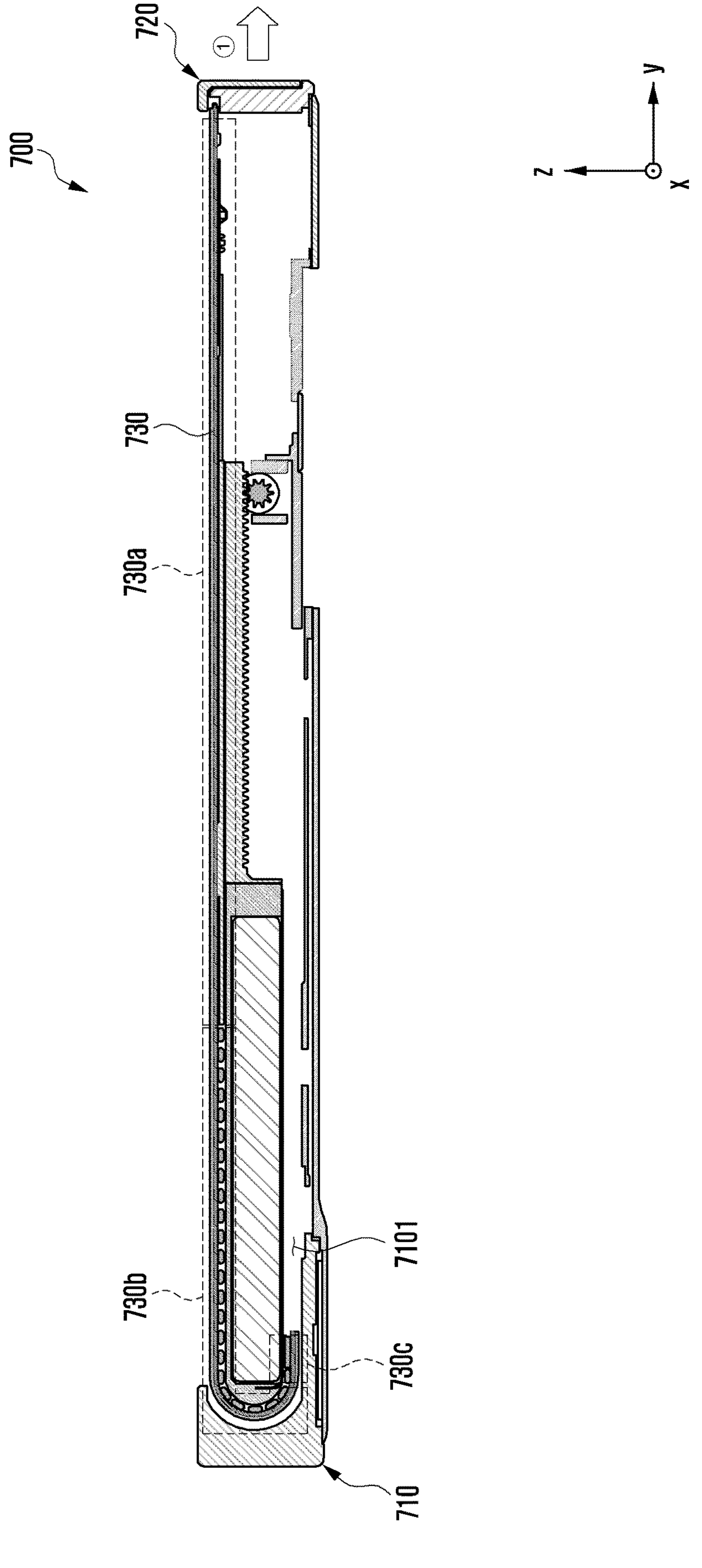
FIG. 16D is a cross-sectional view of an electronic device taken along line 16*d*-16*d* in FIG. 16C according to an embodiment of the disclosure.

FIG. 16C is a top plan view of an electronic device in a slide-out state according to an embodiment of the disclosure. FIG. 16D is a cross-sectional view of an electronic device taken along line 16*d*-16*d* in FIG. 16C according to an embodiment of the disclosure.

Referring to FIGS. 16A, 16B, 16C, and 16D, an electronic device 700 may include a first housing 710, and a second housing 720 coupled to be slidable by a designated reciprocation distance in a designated direction from the first housing 710. In the embodiment, the electronic device 700 may include a flexible display 730 fixed to at least a part of the second housing 720 and configured to change a display area by being slid into or out of an internal space 7101 of the first housing 710 in accordance with a sliding operation of the second housing 720. For example, the flexible display 730 may have a first display area in a state in which the second housing 720 is slid out of the first housing 710 in a first direction (e.g., direction ①). In the embodiment, the flexible display 730 may have a second display area, which is smaller than the first display area, in a state in which the second housing 720 is slid inward in a second direction (e.g., direction ②) opposite to the first direction (e.g., direction ①).

According to various embodiments, the flexible display 730 may include a first planar portion 730*a* fixed to the second housing 720, a bending portion 730*b* extending from the first planar portion 730*a* and configured such that the bending portion 730*b* is exposed to be visible from the outside in the slide-out state, and the bending portion 730*b* is invisible from the outside by being slid into the internal space 7101 of the first housing 710 by a bending operation in the slide-in state, and a second planar portion 730*c* extending from the bending portion 730*b* and positioned in the internal space 7101 of the first housing 710 without being exposed always. In the embodiment, the bending portion 730*b* of the flexible display 730 needs to have durability capable of accommodating the user's pressing force while maintaining the surface quality in the slide-out state, and the bending portion 730*b* of the flexible display 730 needs to have excellent flexibility in the slide-in state so that the bending portion 730*b* is flexibly bent into the internal space 7101 of the first housing 710.

Figure 17:
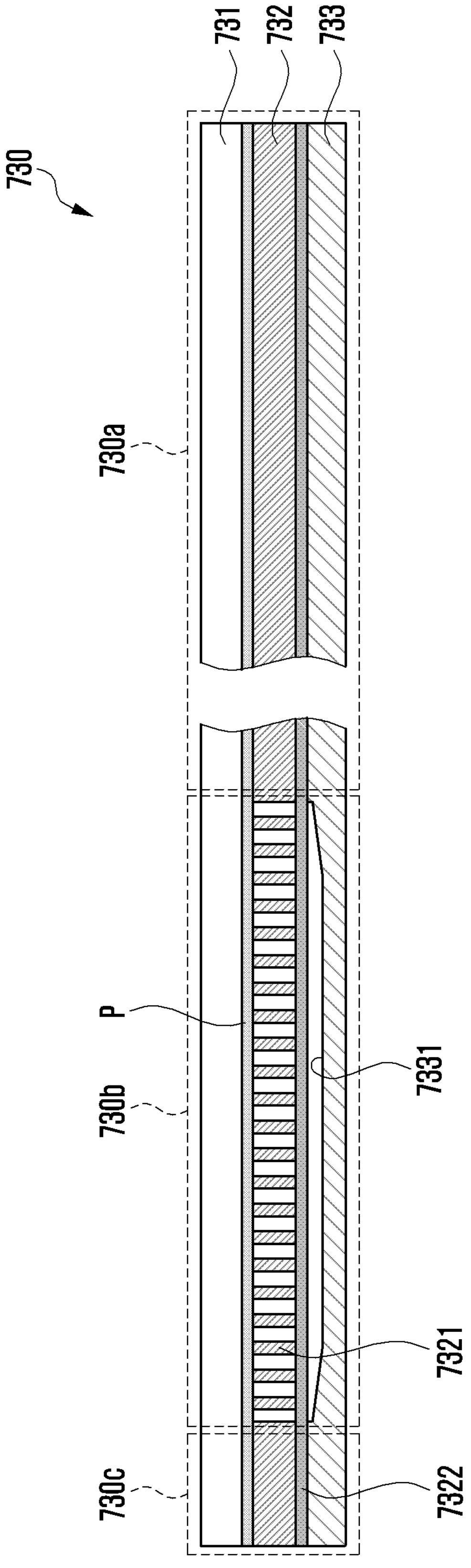
FIG. 17 is a cross-sectional view of a flexible display in FIGS. 16A to 16D according to an embodiment of the disclosure.

FIG. 17 is a cross-sectional view of a flexible display in FIGS. 16A to 16D according to an embodiment of the disclosure.

Referring to FIG. 17, the flexible display 730 may include a plurality of layers 731, and a support plate 732 (e.g., the support plate 450 in FIG. 7A) and a reinforcement plate 733 sequentially disposed below the plurality of layers 731. In the embodiment, the support plate 732 may be attached to lower portions of the plurality of layers 731 by means of the bonding member P. In the embodiment, the plurality of layers 731 may include the window layer (e.g., the window layer 410 in FIG. 7A) and the polarizing layer (e.g., the polarizing layer 420 in FIG. 7A), the display panel (e.g., the display panel 430 in FIG. 7A), and the polymer layer (e.g., the polymer layer 440 in FIG. 7A) sequentially disposed below the window layer. In the embodiment, the support plate 732 may include a pattern 7321 (e.g., at least one opening and/or recess) formed in an area corresponding to the bending portion 730*b* and configured to provide flexibility to the flexible display 730 during the bending process. In the embodiment, the flexible display 730 may include a blocking member 7322 disposed between the support plate 732 and the reinforcement plate 733 and attached to a lower portion of the support plate 732.

According to various embodiments, the reinforcement plate 733 may be disposed below the support plate 732 and provide rigidity to the flexible display 730. In the embodiment, the reinforcement plate 733 may include a recess 7331 disposed in an area corresponding to the bending portion 730*b* and formed to improve the flexibility of the bending portion 730*b* of the flexible display 730. In the embodiment, the recess 7331 may be formed in various shapes in accordance with bending properties for each area of the bending portion 730*b*. For example, the bending portion 730*b* may be required to have flexibility that increases toward the center thereof from a boundary area with the first planar portion 730*a* (or a bending portion area in the vicinity of the boundary area) and a boundary area with the second planar portion 730*c* (or a bending portion area in the vicinity of the boundary area). Therefore, the recess 7331 may be formed such that a depth thereof gradually increases to a designated position from the boundary area with the first planar portion 730*a* and the boundary area with the second planar portion 730*c*. In any embodiment, the recess 7331 may include a plurality of recesses, and the shapes or arrangement densities of the recesses may be configured to be different in accordance with bending properties for each area of the bending portion.

In any embodiment, the support plate 732 may be excluded, and only the reinforcement plate 733 may be disposed by being attached to the lower portions of the plurality of layers 731.

In any embodiment, the flexible display 730 may also include the buffer member (e.g., the first buffer member 481 and/or the second buffer member 482 in FIG. 7A) disposed to fill the recesses 7331.

Figure 18A:
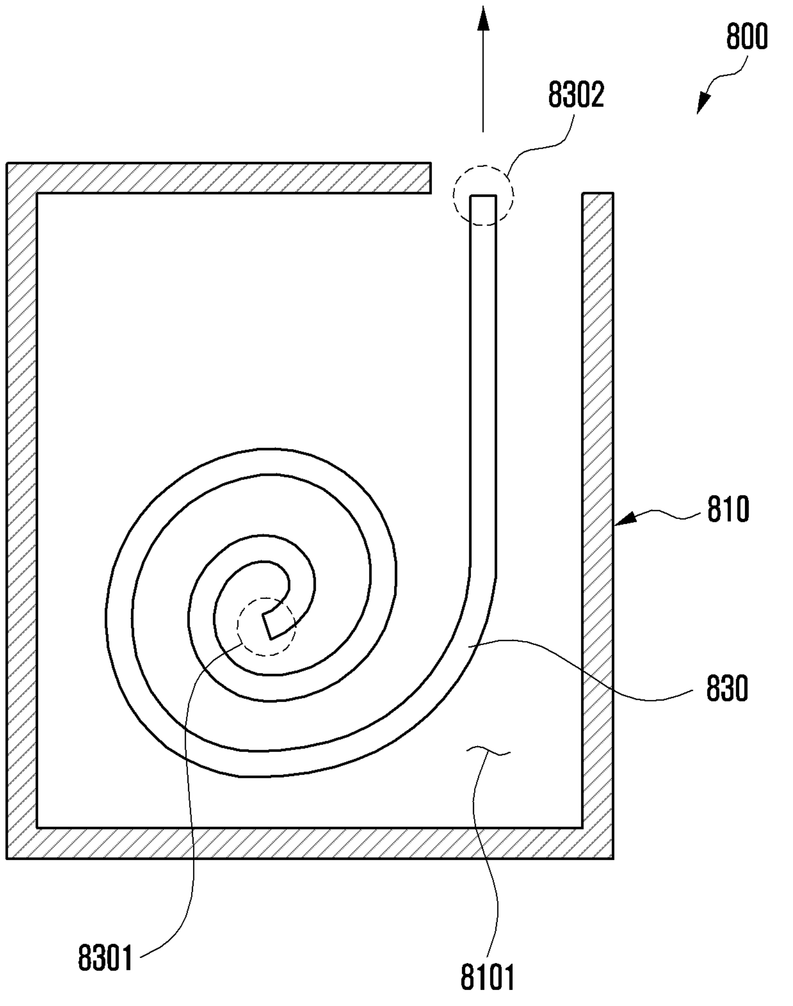
FIG. 18A is a schematic configuration view of an electronic device according to an embodiment of the disclosure.
Figure 18B:
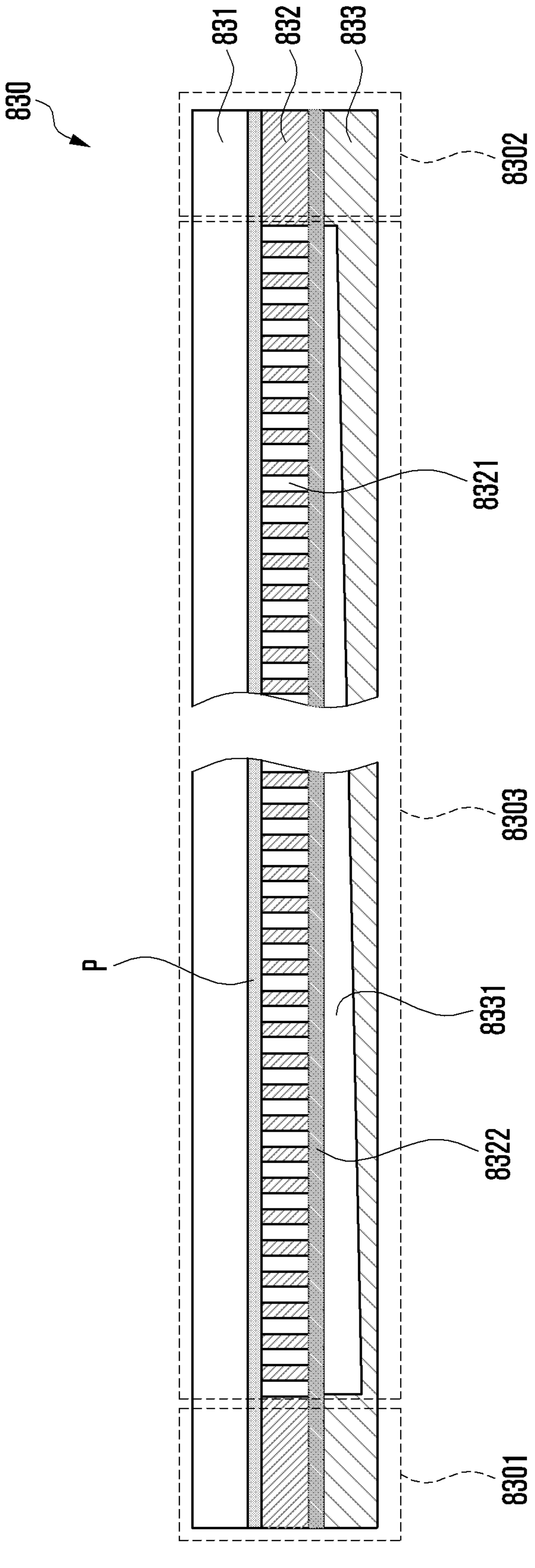
FIG. 18B is a cross-sectional view of a flexible display in FIG. 18A according to an embodiment of the disclosure.

FIG. 18A is a schematic configuration view of an electronic device according to an embodiment of the disclosure. FIG. 18B is a cross-sectional view of a flexible display in FIG. 18A according to an embodiment of the disclosure.

Referring to FIGS. 18A and 18B, an electronic device 800 may include a housing 810, and a flexible display 830 accommodated in an internal space 8101 of the housing 810 while being rolled. In the embodiment, when the flexible display 830 is used, the flexible display 830 may be deformed in a planar shape while being exposed to the outside of the housing 810. When the flexible display 830 is not used, the flexible display 830 may be rolled and accommodated in the internal space 8101 of the housing 810.

According to various embodiments, the flexible display 830 may include a first planar portion 8301 disposed in the internal space of the housing 810, a rolling portion 8303 extending from the first planar portion 8301 and configured to be accommodated in the housing 810 while being rolled, and a second planar portion 8302 extending from the rolling portion 8303 and configured to be exposed to the outside of the housing 810 when the electronic device 800 is used. In the embodiment, because the flexible display 830 is rolled and accommodated in the internal space of the housing 810, a curvature in the rolled state may increase in a direction from the second planar portion 8302 to the first planar portion 8301. This may mean that better bending properties may be required for the portion close to the first planar portion 8301.

According to various embodiments, the flexible display 830 may include a plurality of layers 831, and a support plate 832 and a reinforcement plate 833 sequentially disposed below the plurality of layers 831. In the embodiment, the support plate 832 may be attached to lower portions of the plurality of layers 831 by means of the bonding member P. In the embodiment, the plurality of layers 831 may include the window layer (e.g., the window layer 410 in FIG. 7A) and the polarizing layer (e.g., the polarizing layer 420 in FIG. 7A), the display panel (e.g., the display panel 430 in FIG. 7A), and the polymer layer (e.g., the polymer layer 440 in FIG. 7A) sequentially disposed below the window layer. In the embodiment, the support plate 832 may include a pattern 8321 (e.g., at least one opening and/or recess) formed in an area corresponding to the rolling portion 8303 and configured to provide flexibility to the flexible display 830 during the bending process. In the embodiment, the flexible display 830 may include a blocking member 8322 disposed between the support plate 832 and the reinforcement plate 833 and attached to a lower portion of the support plate 832.

According to various embodiments, the reinforcement plate 833 may be disposed below the support plate 832 and provide rigidity to the flexible display 830. In the embodiment, the reinforcement plate 833 may include a recess 8331 disposed in an area corresponding to the rolling portion 8303 and formed to improve rolling properties of the rolling portion 8303 of the flexible display 830. In the embodiment, based on the fact that the recess 8331 is required to have better bending properties for the portion close to the first planar portion 8301, the recess 8331 may be formed in the rolling portion 8303 so as to be inclined so that a depth thereof gradually increases in a direction from the second planar portion 8302 to the first planar portion 8301. In any embodiment, the recess 8331 may be substituted with a plurality of recesses, and the shapes or arrangement densities of the recesses may be configured to be different in accordance with bending properties for each area of the rolling portion 8303.

In any embodiment, the support plate 832 may be excluded, and only the reinforcement plate 833 may be disposed by being attached to the lower portions of the plurality of layers 831.

In any embodiment, the flexible display 830 may also include the buffer member (e.g., the first buffer member 481 and/or the second buffer member 482 in FIG. 7A) disposed to fill the recesses 8331.

According to various embodiments, an electronic device may include a foldable housing including a first housing (e.g., the first housing 110 in FIG. 7A), a second housing (e.g., the second housing 120 in FIG. 7A), and a hinge device (e.g., the hinge device 320 in FIG. 5) configured to connect the first housing and the second housing, and a flexible display (e.g., the flexible display 130 in FIG. 7A) disposed to be supported by the foldable housing and including a folding area (e.g., the folding area 130*c* in FIG. 7A), a first bending area (e.g., the first bending area 130*d* in FIG. 7A) positioned at one side of the folding area, and a second bending area (e.g., the second bending area 130*e* in FIG. 7A) positioned at the other side of the folding area, the flexible display being configured such that the folding area, the first bending area, and the second bending area are bent when the electronic device is folded, in which the flexible display includes a display panel (e.g., the display panel 430 in FIG. 7A), a support plate (e.g., the support plate 450 in FIG. 7A) disposed below the display panel and including patterns (e.g., the first pattern 4531, the first recess 455*a*, and the second recess 455*b* in FIG. 7A) for bending disposed in the folding area, the first bending area, and the second bending area, and a first reinforcement plate (e.g., the first reinforcement plate 461 in FIG. 7A) and a second reinforcement plate (e.g., the second reinforcement plate 462 in FIG. 7A) disposed between the foldable housing and the support plate, in which the first reinforcement plate includes a first part (e.g., the first part 461*a* in FIG. 7A) having a first thickness and at least extending from the folding area to the first bending area, a second part (e.g., the second part 461*b* in FIG. 7A) having a second thickness greater than the first thickness and extending from the first part, and a first buffer member (e.g., the first buffer member 481 in FIG. 7A) disposed on the first part, and in which the first part may be bent together with the support plate by means of at least a part of the hinge device while the electronic device changes from an unfolded state to a folded state.

According to various embodiments, the first buffer member may include a layer (e.g., the first layer 4811 in FIG. 7A) including a non-Newtonian material.

According to various embodiments, the first reinforcement plate may include a first plate (e.g., the first plate 4611 in FIG. 7B) extending from the first part to the second part and having the first thickness, and a second plate (e.g., the second plate 4612 in FIG. 7B) having a third thickness and stacked on the first plate to form the second part.

According to various embodiments, a thickness made by summing up the first thickness and a thickness of the first buffer member may be substantially equal to the second thickness.

According to various embodiments, the first part may extend from a first edge (e.g., the first edge E1 in FIG. 7A), which is close to a folding axis (e.g., the folding axis F in FIG. 7A) of the foldable housing, to a position corresponding to the first bending area.

According to various embodiments, the first buffer member may include a first layer (e.g., the first layer 4811 in FIG. 7A) including the non-Newtonian material, a second layer (e.g., the second layer 4812 in FIG. 7A) disposed between the first layer and the first part, and a third layer (e.g., the third layer 4813 in FIG. 7A) disposed between the first layer and the support plate.

According to various embodiments, the first buffer member may include a layer (e.g., the second layer 4812 in FIG. 7A) including a bonding material.

According to various embodiments, the first buffer member may include a protective layer (e.g., the third layer 4813 in FIG. 7A) as an upper layer.

According to various embodiments, the upper layer of the first buffer member may be coated.

According to various embodiments, the coating layer may include a hard coating layer or a Teflon coating layer.

According to various embodiments, the first thickness (e.g., the thickness t1 in FIG. 7A) may be 100 μm or less.

According to various embodiments, the patterns of the support plate may include a first recess (e.g., the first recess 455*a* in FIG. 7A) disposed in the first bending area and directed toward the first reinforcement plate, and a first elastic member (e.g., the first elastic member 455 in FIG. 7A) accommodated in the first recess.

According to various embodiments, the first elastic member may include a non-Newtonian material.

According to various embodiments, the first elastic member may not be attached to the first reinforcement plate.

According to various embodiments, a thickness of the support plate corresponding to the recess may be 10 μm or more.

According to various embodiments, the foldable electronic device may include a third part (e.g., the third part 462*a* in FIG. 7A) having the first thickness and at least extending from the folding area to the second bending area, a fourth part (e.g., the fourth part 462*b* in FIG. 7A) having the second thickness and extending from the third part, and a second buffer member (e.g., the second buffer member 482 in FIG. 7A) disposed on the third part.

According to various embodiments, in the folded state, the third part may be bent together with the support plate by means of at least a part of the hinge device.

According to various embodiments, the first bending area and the second bending area may include reverse bending sections configured to be bent in a direction opposite to the bending direction of the folding area while having a curvature greater than a curvature of the folding area in the folded state of the electronic device.

According to various embodiments, the hinge device may include a first hinge plate (e.g., the first hinge plate 311 in FIG. 5) coupled to at least a part of the first housing, a second hinge plate (e.g., the second hinge plate 312 in FIG. 5) coupled to at least a part of the second housing, and a center plate (e.g., the center plate 313 in FIG. 5) disposed between the first hinge plate and the second hinge plate, and the first hinge plate, the second hinge plate, and the center plate may define the same plane as the first housing and the second housing when the electronic device is in the unfolded state.

According to various embodiments, in the folded state of the electronic device, at least a part of the first part of the first reinforcement plate may be disposed to be supported by the center plate.

According to various embodiments, an electronic device may include a foldable housing including a first housing (e.g., the first housing 110 in FIG. 7A), a second housing (e.g., the second housing 120 in FIG. 7A), and a hinge device (e.g., the hinge device 320 in FIG. 5) configured to connect the first housing and the second housing, and a flexible display (e.g., the flexible display 130 in FIG. 7A) disposed to be supported by the foldable housing and including a folding area (e.g., the folding area 130*c* in FIG. 7A), a first bending area (e.g., the first bending area 130*d* in FIG. 7A) positioned at one side of the folding area, and a second bending area (e.g., the second bending area 130*e* in FIG. 7A) positioned at the other side of the folding area, the flexible display (e.g., the flexible display 130 in FIG. 7A) being configured such that the folding area, the first bending area, and the second bending area are bent when the electronic device is folded, in which the flexible display includes a display panel (e.g., the display panel 430 in FIG. 7A), a support plate (e.g., the support plate 450 in FIG. 7A) disposed below the display panel and including patterns (e.g., the first pattern 4531, the first recess 455*a*, and the second recess 455*b* in FIG. 7A) for bending disposed in the folding area, the first bending area, and the second bending area, and a first reinforcement plate (e.g., the first reinforcement plate 461 in FIG. 7A) and a second reinforcement plate (e.g., the second reinforcement plate 462 in FIG. 7A) disposed between the foldable housing and the support plate, in which the first reinforcement plate includes a first part (e.g., the first part 461*a* in FIG. 7A) having a first thickness and at least extending from the folding area to the first bending area and a second part (e.g., the second part 461*b* in FIG. 7A) having a second thickness greater than the first thickness and extending from the first part, and in which the first part may be bent together with the support plate by means of at least a part of the hinge device while the electronic device changes from an unfolded state to a folded state.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:

a foldable housing comprising a first housing, a second housing, and a hinge device configured to connect the first housing and the second housing; and a flexible display disposed to be supported by the foldable housing and comprising a folding area, a first bending area positioned at one side of the folding area, and a second bending area positioned at another side of the folding area, the flexible display being configured such that the folding area, the first bending area, and the second bending area are bent when the foldable electronic device is folded, wherein the flexible display comprises:

a display panel, a support plate disposed below the display panel and comprising patterns for bending disposed in the folding area, a first recess formed at a position corresponding to the first bending area, and a second recess formed at a position corresponding to the second bending area, and a first reinforcement plate and a second reinforcement plate disposed between the foldable housing and the support plate, wherein the first reinforcement plate comprises:

a first part having a first thickness and at least extending from the folding area to the first bending area, a second part having a second thickness greater than the first thickness and extending from the first part, and a first buffer member disposed on the first part, and wherein the first part is bent together with the support plate by means of at least a part of the hinge device while the foldable electronic device changes from an unfolded state to a folded state.

2. The foldable electronic device of claim 1, wherein the first buffer member comprises a layer including a non-Newtonian material.

3. The foldable electronic device of claim 2, wherein the first reinforcement plate comprises:

a first plate extending from the first part to the second part and having the first thickness; and a second plate having a third thickness and stacked on the first plate to form the second part.

4. The foldable electronic device of claim 1, wherein a thickness made by summing up the first thickness and a thickness of the first buffer member is substantially equal to the second thickness.

5. The foldable electronic device of claim 1, wherein the first part extends from a first edge (E1), which is close to a folding axis (F) of the foldable housing, to a position corresponding to the first bending area.

6. The foldable electronic device of claim 2, wherein the first buffer member comprises:

a first layer including the non-Newtonian material;

a second layer disposed between the first layer and the first part; and a third layer disposed between the first layer and the support plate.

7. The foldable electronic device of claim 1, wherein the first buffer member comprises a layer including a bonding material.

8. The foldable electronic device of claim 1, wherein the first buffer member comprises a protective layer as an upper layer.

9. The foldable electronic device of claim 1, wherein an upper layer of the first buffer member is coated.

10. The foldable electronic device of claim 9, wherein the coated upper layer comprises a hard coating layer or a Teflon coating layer.

11. The foldable electronic device of claim 1, wherein the first thickness (t1) is 100 μm or less.

12. The foldable electronic device of claim 1, wherein the first recess is directed toward the first reinforcement plate; and wherein the foldable electronic device further comprises a first elastic member accommodated in the first recess.

13. The foldable electronic device of claim 12, wherein the first elastic member includes a non-Newtonian material.

14. The foldable electronic device of claim 13, wherein the first elastic member is not attached to the first reinforcement plate.

15. The foldable electronic device of claim 12, wherein a thickness of the support plate corresponding to the first recess is 10 μm or more.

16. The foldable electronic device of claim 1, further comprising:

a third part having the first thickness and extending from the folding area to the second bending area;

a fourth part having the second thickness and extending from the third part; and a second buffer member disposed on the third part.

17. The foldable electronic device of claim 16, wherein in the folded state, the third part is bent together with the support plate by means of at least a part of the hinge device.

18. The foldable electronic device of claim 1, wherein the first bending area and the second bending area include reverse bending sections configured to be bent in a direction opposite to a bending direction of the folding area while having a curvature greater than a curvature of the folding area in the folded state of the electronic device.

19. The foldable electronic device of claim 1, wherein the hinge device comprises:

a first hinge plate coupled to at least a part of the first housing;

a second hinge plate coupled to at least a part of the second housing; and a center plate disposed between the first hinge plate and the second hinge plate, wherein the first hinge plate, the second hinge plate, and the center plate is configured to form the same plane as the first housing and the second housing when the electronic device is in the unfolded state.

20. The foldable electronic device of claim 19, in the folded state of the electronic device, at least a part of the first part of the first reinforcement plate is configured to be supported by the center plate.

* * * * *